United States Patent [19]

Higashio et al.

[11] Patent Number: 5,945,982
[45] Date of Patent: Aug. 31, 1999

[54] DATA ADMINISTRATION APPARATUS THAT CAN SEARCH FOR DESIRED IMAGE DATA USING MAPS

[75] Inventors: Kimihiko Higashio; Takahiro Fujii; Shuji Nakao, all of Kobe; Kagumi Moriwaki, Itami; Masako Inoue, Sakai; Miyuki Ono, Akashi; Shuhei Taguchi, Katano; Tetsuji Abe, Neyagawa; Takuma Masuda, Ikeda; Masayuki Mukai, Toyonaka; Kinya Hasegawa, Hirakata; Akira Murakawa, Kobe; Shinichi Ban, Kobe; Takao Shudo, Kobe, all of Japan

[73] Assignees: Minolta Co., Ltd., Osaka; Matsushita Electric Industrial Co., Ltd., Kadoma, both of Japan

[21] Appl. No.: 08/654,868

[22] Filed: May 29, 1996

[30] Foreign Application Priority Data

| May 30, 1995 | [JP] | Japan | 7-132379 |
| May 30, 1995 | [JP] | Japan | 7-132380 |
| May 30, 1995 | [JP] | Japan | 7-132381 |
| May 30, 1995 | [JP] | Japan | 7-132382 |
| May 30, 1995 | [JP] | Japan | 7-132383 |

[51] Int. Cl.⁶ .................................................. G09G 5/00
[52] U.S. Cl. .................................... 345/203; 707/3; 707/4
[58] Field of Search ................................. 345/133, 127, 345/203, 326, 123, 348, 355; 707/1–5, 103, 200, 522, 100, 104; 395/61

[56] References Cited

U.S. PATENT DOCUMENTS

| 4,999,790 | 3/1991 | Murayama et al. | 707/3 |
| 5,220,625 | 6/1993 | Hatakeyama et al. | 345/347 |
| 5,369,742 | 11/1994 | Kurosu et al. | 707/522 |
| 5,519,865 | 5/1996 | Kondo et al. | 707/1 |
| 5,537,132 | 7/1996 | Teraoka et al. | 345/133 |
| 5,546,529 | 8/1996 | Bowers et al. | 345/348 |
| 5,586,316 | 12/1996 | Tanaka et al. | 707/4 |
| 5,761,655 | 6/1998 | Hoffman | 707/4 |

FOREIGN PATENT DOCUMENTS

| 5-89176 | 4/1993 | Japan . |
| 5-120358 | 5/1993 | Japan . |
| 5-282375 | 10/1993 | Japan . |

*Primary Examiner*—Richard A. Hjerpe
*Assistant Examiner*—Francis N. Nguyen
*Attorney, Agent, or Firm*—Burns, Doane, Swecker & Mathis, LLP

[57] ABSTRACT

In image data retrieval, image data that becomes the base of search is specified. When the search is to be carried out according to the distance from the image data on an image map, an automatic setting process of retrieval information is carried out. Here, a keyword, icon, chromaticity and the like of that image data are automatically set as retrieval information. The position of that image data on the image map becomes the center of a range when the ambiguity is set. By setting the ambiguity of the image map, keyword, icon, chromaticity, and the like in this state, the range of ambiguity is displayed, and image data within that range is automatically retrieved. As a result, analogous image data can be searched for according to subtle and ambiguous information or information that cannot be quantified.

36 Claims, 62 Drawing Sheets

DATA ADMINISTRATION APPARATUS THAT CAN SEARCH FOR DESIRED IMAGE DATA USING MAPS

BACKGROUND OF THE INVENTION

1. Field of the Invention

The present invention relates to a data administration apparatus.

2. Description of the Related Art

Various data administration apparatuses have been conventionally proposed. For example, an apparatus is proposed in Japanese Patent Laying-Open No. 5-282375 that sets the items of hue and saturation as additional information to an image to search for a desired image with the additional information as a retrieval condition. However, there is no disclosure of how to set the additional information in Japanese Patent Laying-Open No. 5-292375.

Another apparatus is proposed in Japanese Patent Laying-Open No. 5-89176 that applies a keyword to an image to specify a relevant keyword which is additional information for searching for an image associated with that keyword. In this apparatus, correlation is provided between two keywords. In a searching process for an image, this correlation is referred to. However, the applied correlation defines only the relationship between two keywords. The usability thereof was not sufficient.

In conventional art, the set up of a retrieval condition in searching for an image was not easy.

SUMMARY OF THE INVENTION

An object of the present invention is to provide a data administration apparatus that can apply additional information of high usability to data.

Another object of the present invention is to provide a data administration apparatus that can easily apply additional information to data.

A further object of the present invention is to provide a data administration apparatus that can facilitate setting of a retrieval condition in carrying out data retrieval.

Still another object of the present invention is to provide a data administration apparatus that can easily extract data correlated with particular data.

A still further object of the present invention is to provide a data administration apparatus that can have the relationship between additional information set automatically.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings.

Figure 1:
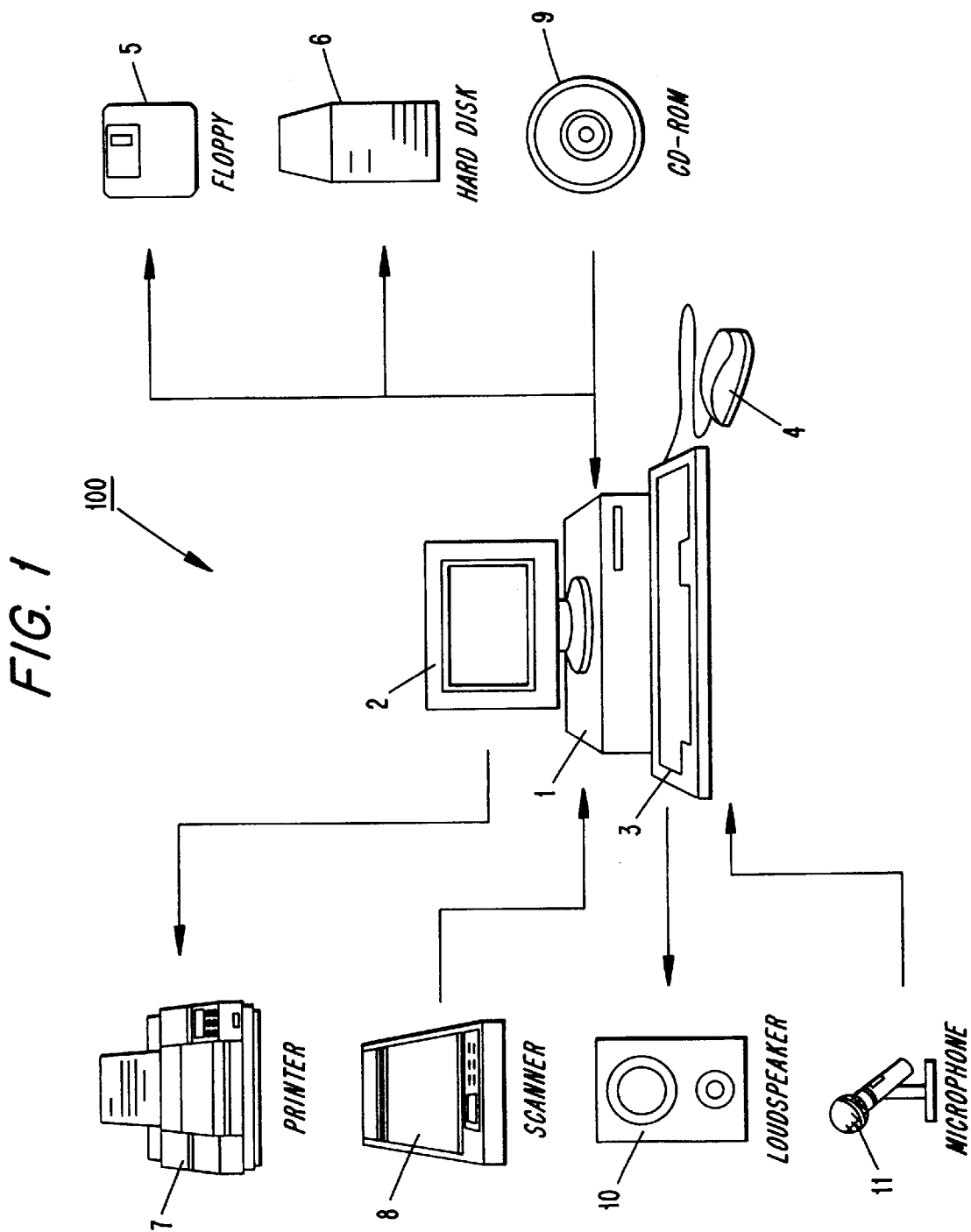
FIG. 1 is a schematic diagram showing a structure of an information processor applied in the present invention.

FIG. 1 is a schematic perspective view showing a structure of an image processing system applied in an image retrieval apparatus (/design aiding system) (referred to as "system" hereinafter) according to the present invention. A system 100 includes a control device 1 for controlling the entire system formed mainly of a CPU, a display 2 for showing an image, text, or the like, and providing various displays for manipulation, a keyboard 3 and a mouse 4 for effecting various inputs and instructions, a floppy disk 5 and a hard disk 6 which are data storage media, a printer 7 for output of graphical figures and the like generated by image data or image organization, a scanner 8 and a CD-ROM device 9 for extracting image data, a loudspeaker 10 for audio output, and a microphone 11 for audio input. In the drawings, the arrow indicates the direction of data flow.

Figure 2:
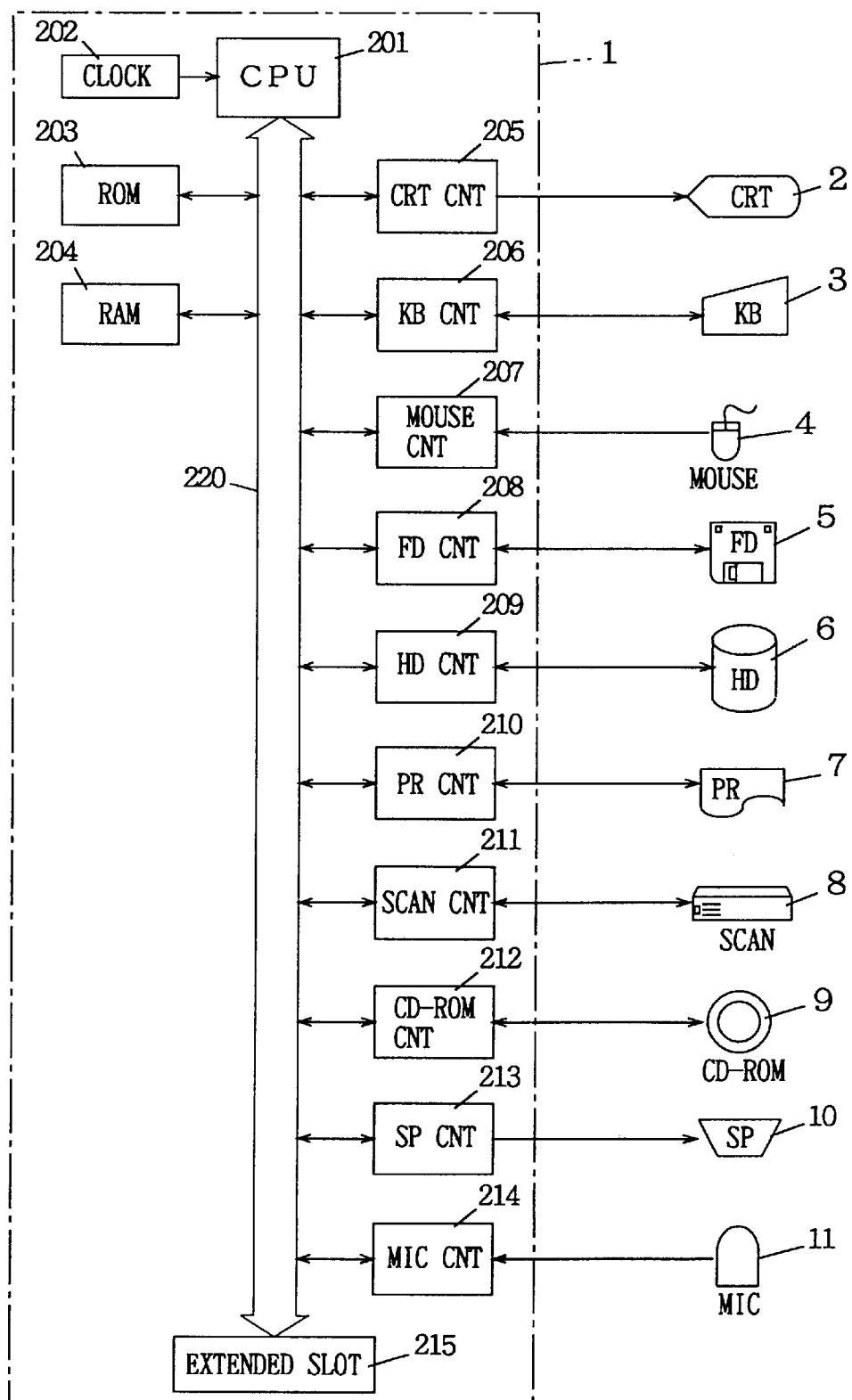
FIG. 2 is a block diagram showing the connection of the main parts of a control device that provides control of the entire system.

FIG. 2 is a block diagram mainly of control device 1 shown in FIG. 1. Referring to FIG. 2, control device 1 is mainly formed of a CPU 201 such as i80486DX of Intel Corporation. A ROM 203 in which programs and the like for controlling system 100 is stored, a RAM 204 for storing data and program, a display control circuit 205 for providing image or text display on display 2, a keyboard control circuit 206 for providing transfer control of input from keyboard 3, a mouse control circuit 207 for providing transfer control of input from mouse 4, a floppy disk control circuit 208 for providing control of floppy disk 5, a hard disk control circuit 209 for providing control of hard disk 6, a printer control circuit 210 for providing control of output towards printer 7, a scanner control circuit 211 for providing control of scanner 8, a CD-ROM control circuit 212 for providing control of CD-ROM device 9, a speaker control circuit 213 for providing control of loudspeaker 10, and a microphone control circuit 214 for providing control of microphone 11 are connected to CPU 201 via a data bus 220.

A clock 202 for generating a reference clock required to operate the present system, and also an extended slot 215 for connecting various extended boards via data bus 220 are connected to CPU 201. A SCSI board can be connected to extended slot 215 to provide connection of floppy disk 5, hard disk 6, scanner 8, and CD-ROM device 9.

Although floppy disk 5 and hard disk 6 are used as the image data storage medium in the above system, other information storage devices such as MO (magneto-optical disk) may be used. Also, the image data input device is not limited to scanner 8 and CD-ROM device 9, and other input devices such as a still video camera can be used. Furthermore, the output device is not limited to printer 7, and other output devices such as a digital copier may be used.

In the present embodiment, the program for controlling the system is stored in ROM 203. However, the program associated with the present invention can be read and executed by a device such as a personal computer.

Program

Figure 3:
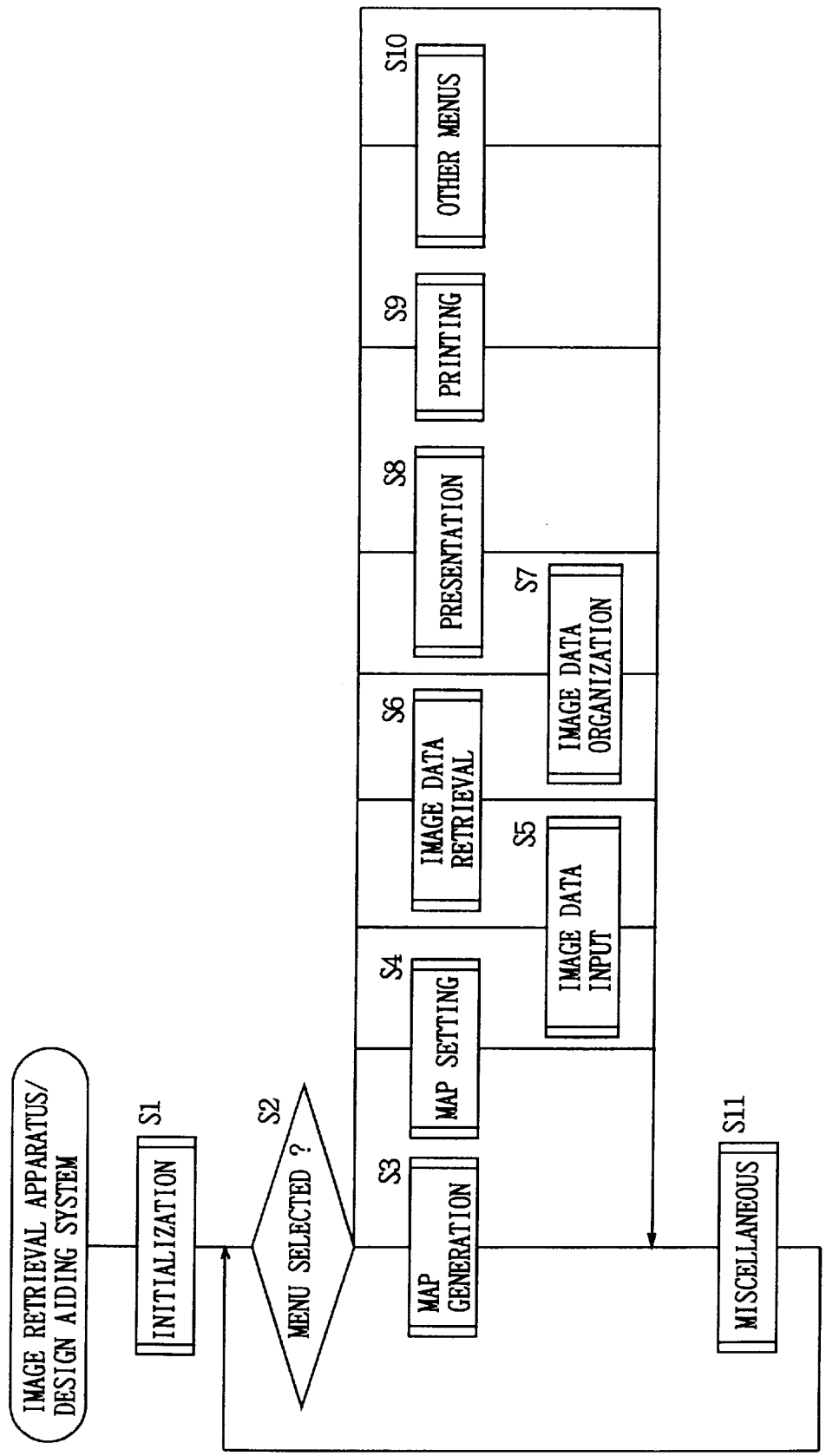
FIG. 3 is a flow chart of a main routine of an image information retrieval apparatus program.

FIG. 3 is a flow chart showing the main routine of a program of an image information retrieval apparatus (/design aiding system) of the present invention using system 100 of FIGS. 1 and 2.

When a program is actuated, initialization of flags and the like required in subsequent processes and initialization for an initial screen display are carried out at step S1 ("step" omitted hereinafter). A menu screen is provided on display 2, and determination is made whether an item is selected from that menu (S2). If map generation is selected at S2, the program proceeds to a map generation process (S3) for generating various maps used for retrieval. If MAP SET- TING is selected, the control proceeds to a map set up process (S4) for selecting and setting a map used in retrieval. If IMAGE DATA INPUT is selected, the control proceeds to an image data input process (S5) to enter an image from an image input device such as scanner 8. If IMAGE DATA RETRIEVAL is selected, the control proceeds to an image data retrieval process (S6) to search a data base stored in hard disk 6 for a desired image. If IMAGE DATA ORGANIZATION is selected, the control proceeds to an image data organization process (S7) for grouping image data and generating a collage panel. If PRESENTATION is selected, the control proceeds to a presentation process (S8) for carrying a process for the presentation of image data. If PRINTING is selected, the control proceeds to a print process (S9) for printing out image data. If OTHER MENUS is selected, the control proceeds to another menu process (S10). If no selection is carried out on the menu screen, the program proceeds to a miscellaneous process (S11). The details of steps S3–S9 will be described afterwards.

When all the processes are completed, the program returns to step S2 to repeat similar processes. The other menu process S10 and the miscellaneous process (S11) are basically similar to those of a conventional retrieval system, and are not otherwise described herein since they are not directly related to the present invention.

Figure 4:
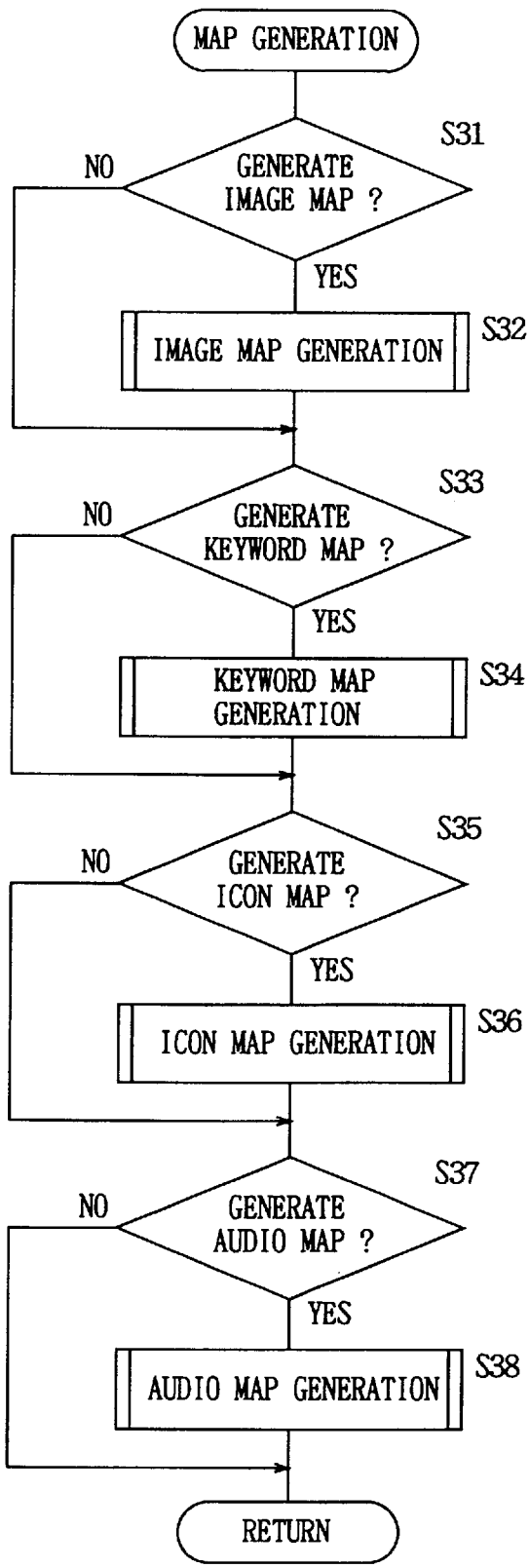
FIG. 4 is a flow chart showing contents of a map generation process.

FIG. 4 is a flow chart showing in detail the map generation process of FIG. 3. Upon entering a map generation process, determination is made whether an image map is to be produced (S31). When YES, the program proceeds to an image map generation process (S32). If NO, this process is skipped. Then, determination is made whether a keyword map is to be generated (S33). If YES, the program proceeds to a keyword map generation process (S34). If NO, this process is skipped. Next, determination is made whether an icon map is to be generated. If YES, the program proceeds to an icon map generation process (S36), otherwise this process is skipped. Finally, determination is made whether an audio map is to be generated (S32). If YES, the program proceeds to an audio map generation process (S38), otherwise this process is skipped to proceed to RETURN.

Details of the image map generation process of S32, the keyword map generation process of S34, the icon map generation process of S36, and the audio map generation process of S38 will be described afterwards.

Figure 5:
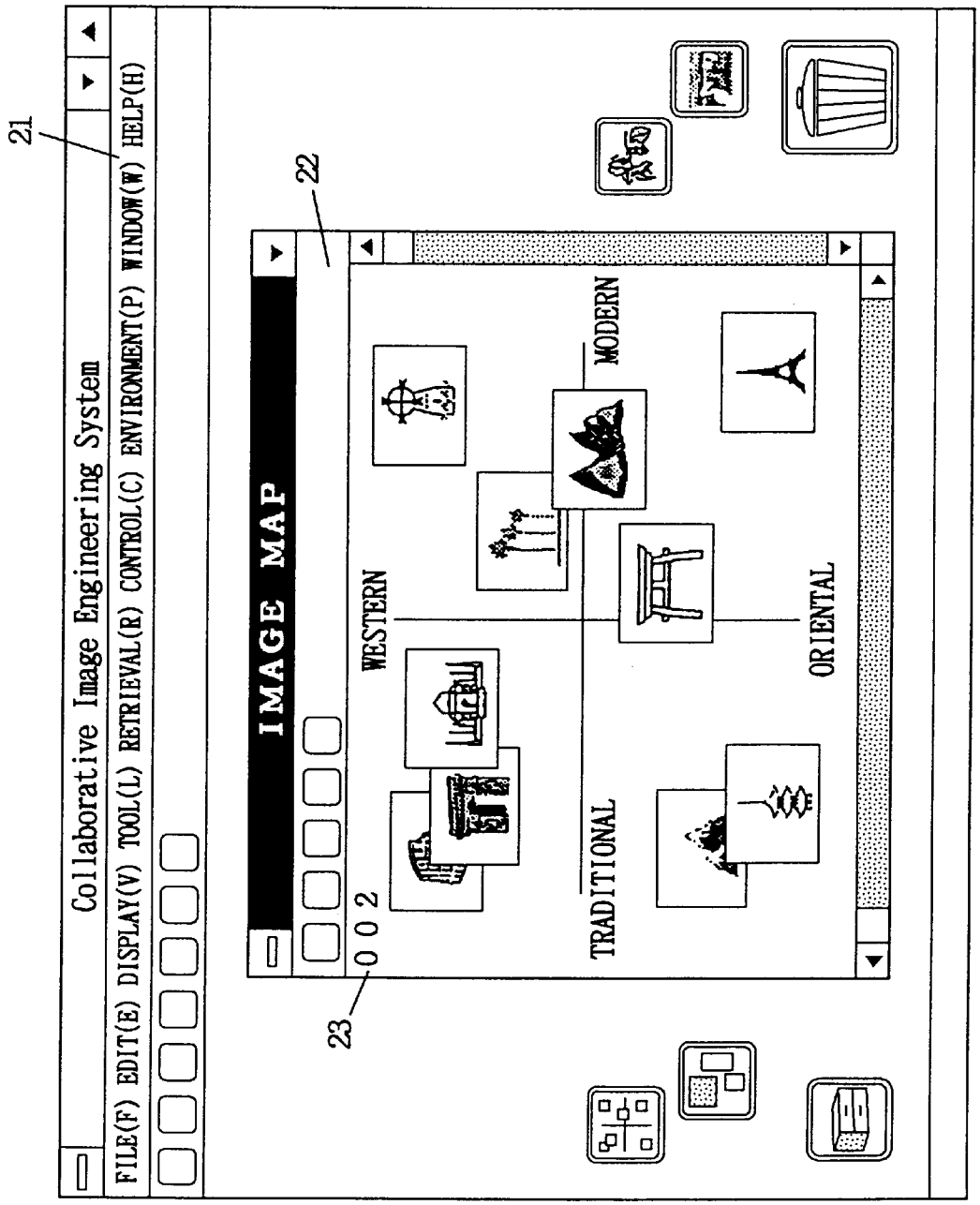
FIG. 5 shows an example of an image map.
Figure 6:
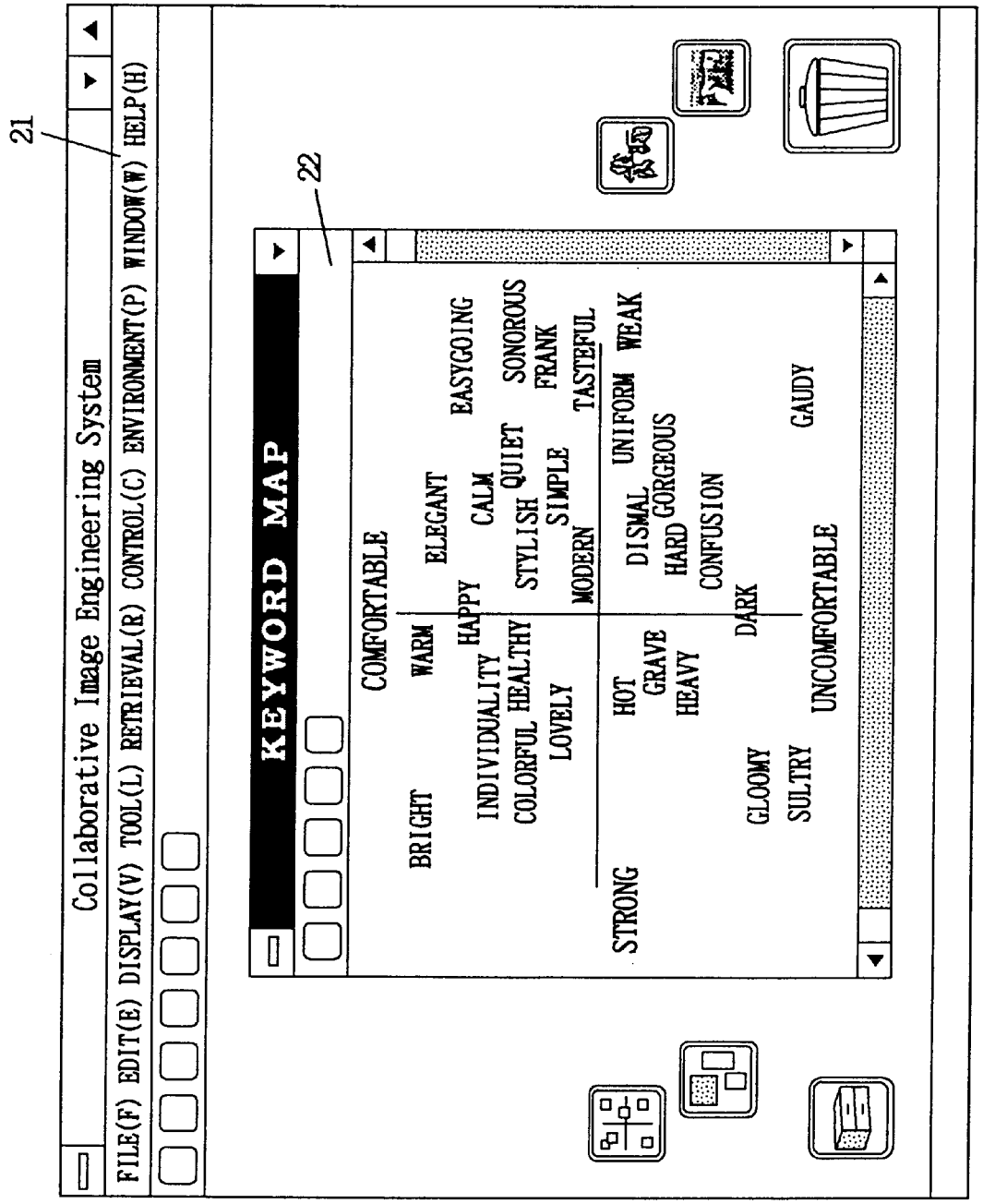
FIG. 6 shows an example of a keyword map.
Figure 7:
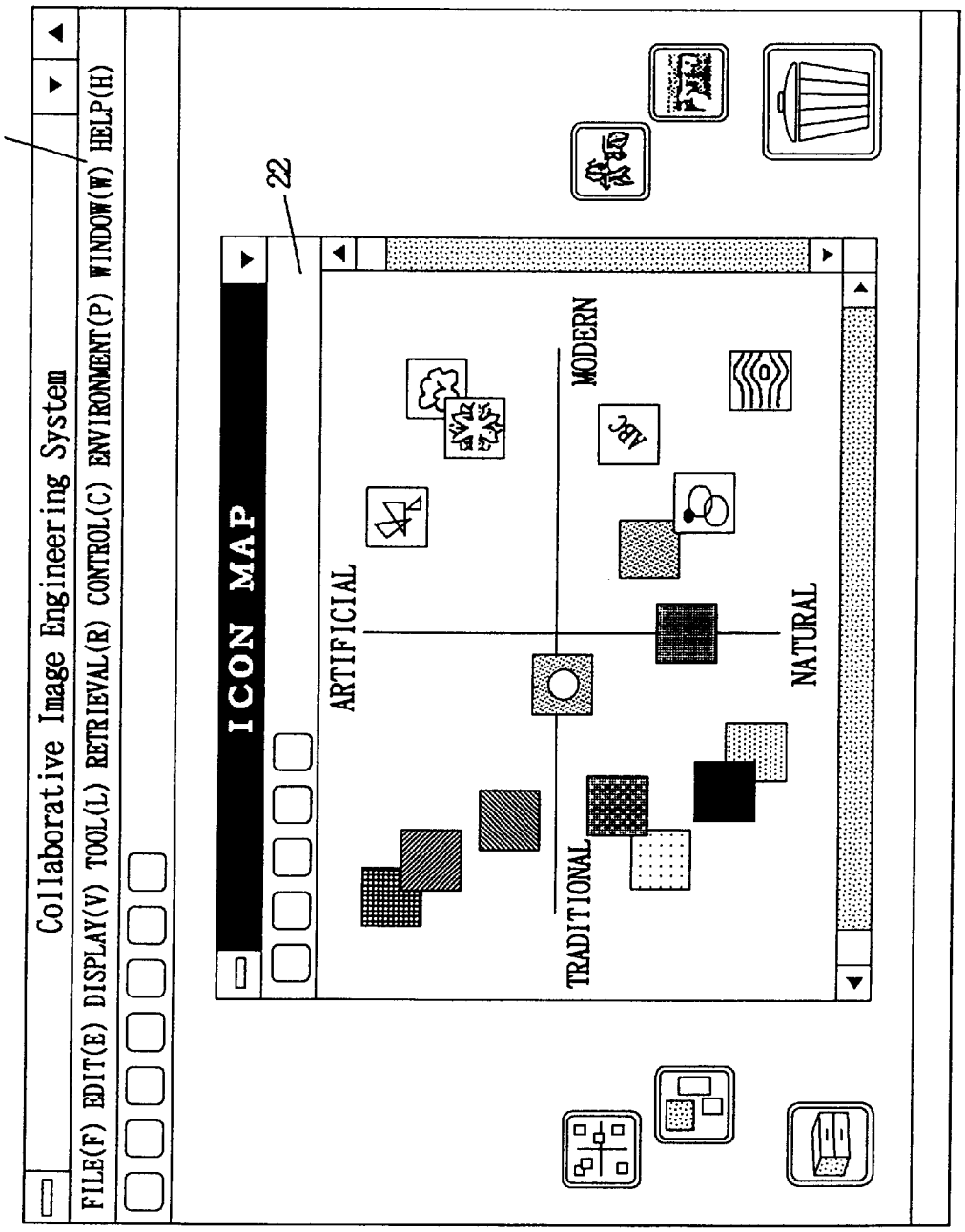
FIG. 7 shows an example of an icon map.

Examples of various maps generated according to the flow chart of FIG. 4 are shown in FIGS. 5–7. More specifically, an image map, a keyword map and an icon map on display 2 are shown in FIGS. 5–7, respectively. Each map has a two-dimensional axis, and an image, a keyword or an icon are arranged on the axis. Referring to FIGS. 5–7, a menu bar 21 for selecting various tasks is shown on the screen of display 2. A tool bar 22 for selecting a tool to be used in the task on the map and a current layer name 23 indicating the layer of the display map are shown in each map.

Figure 8:
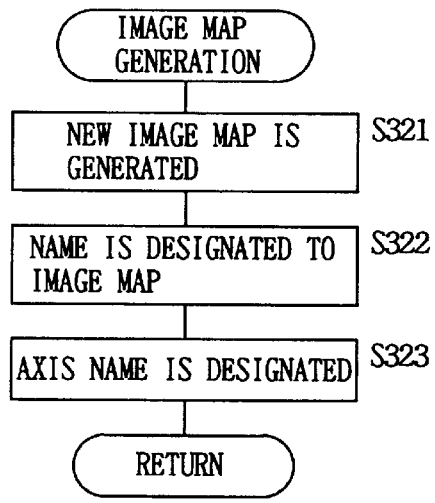
FIG. 8 is a flow chart showing contents of an image map generation process.

FIG. 8 is a flow chart showing in detail the image map generation process of FIG. 4. Here, an image map for registering the position of each image data is created. Referring to FIG. 8, a new image map is generated (S321), a name is designated to the image map (S322), and a name for the axis of the map is designated (S323).

Here, terms in symmetrical form are selected as a map axis name, such as a "traditional-modern" axis or a "western-oriental" axis as shown in FIG. 5.

Figure 9:
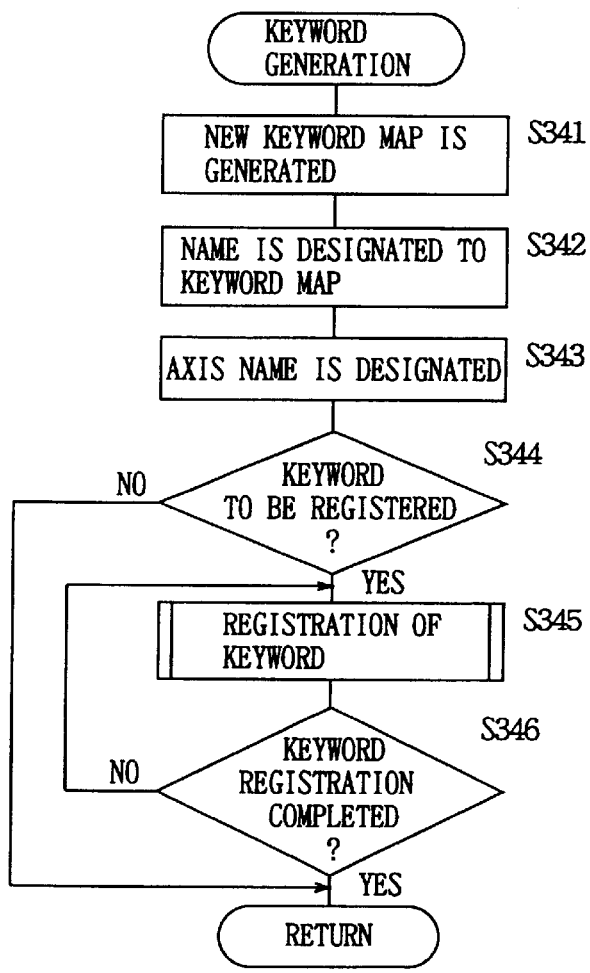
FIG. 9 is a flow chart showing contents of a keyword map generation process.

FIG. 9 is a flow chart showing in detail the keyword map generation process of FIG. 4. Here, a keyword map for registering the position of a keyword added to each image data is generated. Referring to FIG. 9, a new keyword map is generated (S341), a name is designated to the keyword map (S342), and map axis names (for example, strong-weak axis and comfortable-uncomfortable axis in FIG. 6) are designated (S343).

Then, determination is made whether a keyword is to be registered (S344). If YES, a keyword registration process is carried out (S345). Details of the keyword registration process will be described afterwards. Then, determination is made whether keyword registration is completed or not (S346). If NO, the program returns to S345 to continue the keyword registration process. If YES, the program proceeds to RETURN. The program directly proceeds to RETURN when NO in S344.

Figure 10:
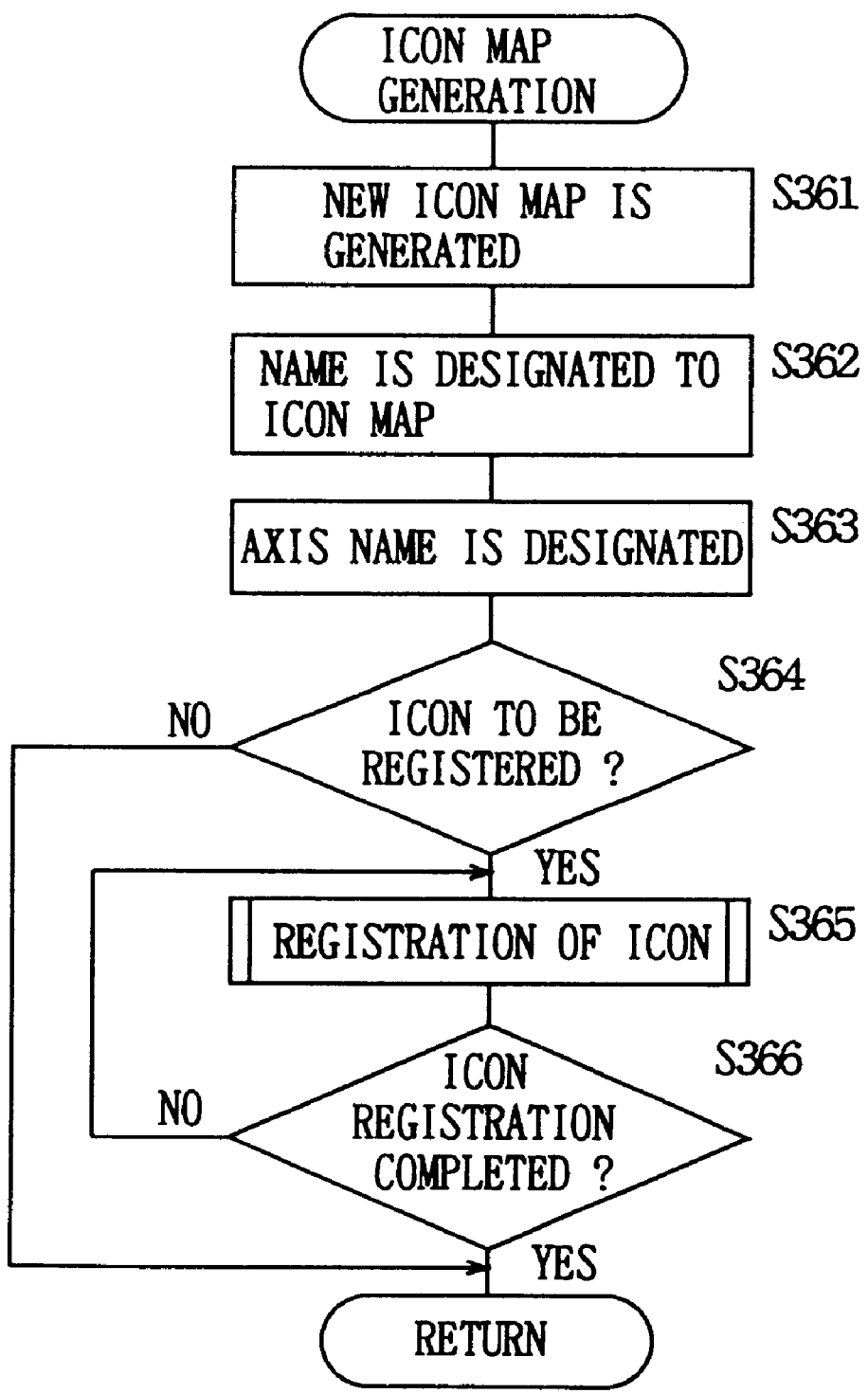
FIG. 10 is a flow chart showing contents of an icon map generation process.

FIG. 10 is a flow chart showing in detail the icon map generation process of FIG. 4. Here, an icon map for registering the position of an icon applied to each image data is generated. First, a new icon map is generated (S361), a name is designated to the icon map (S362), and map axis names (for example, traditional-modern axis, and artificial-natural axis in FIG. 7) are designated (S363). Then, determination is made whether an icon is to be registered (S364). If YES, an icon registration process is carried out (S365). The details of the icon registration process will be described afterwards. Then, determination is-made whether the icon registration process is completed or not (S366). If NO, the program returns to S365 to continue the icon registration process. If YES, the program proceeds to RETURN. The program also proceeds to RETURN when NO in S364.

Figure 11:
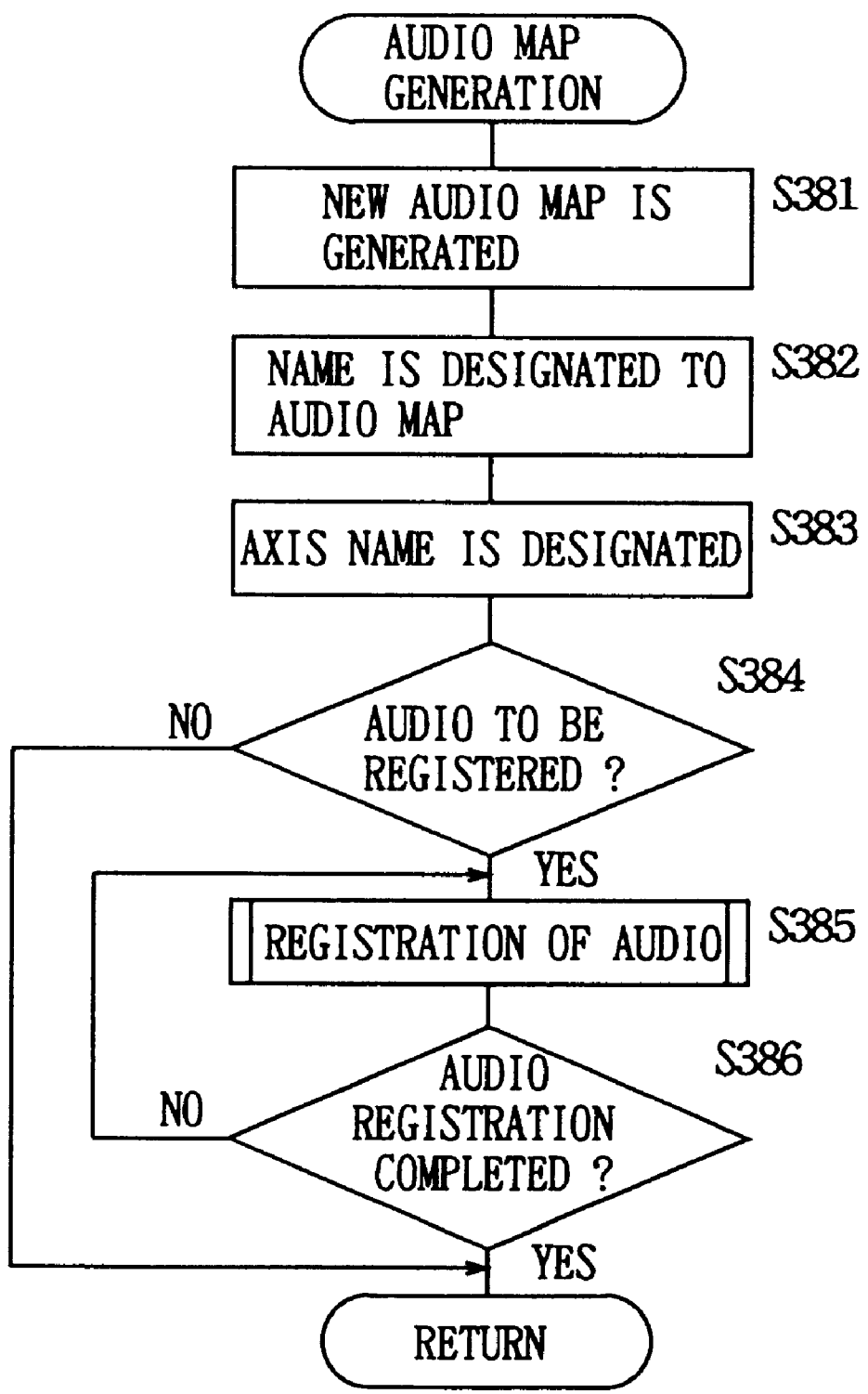
FIG. 11 is a flow chart showing contents of an audio map generation process.

FIG. 11 is a flow chart showing in detail the audio map generation process of FIG. 4. Here, an audio map for registering the position of audio added to each image data is generated. Referring to FIG. 11, a new audio map is generated (S381), a name is designated to the audio map (S382), and the map axis names are designated (S383).

Then determination is made whether the audio is to be registered or not (S384). If YES, an audio registration process is carried out (S385). The details of the audio registration process will be described afterwards. Next, determination is made whether the audio registration process is completed or not (386). If NO, the program returns to S385 to continue the audio registration process. If YES, the program proceeds to RETURN. The program proceeds to RETURN when NO at S384.

Figure 12:
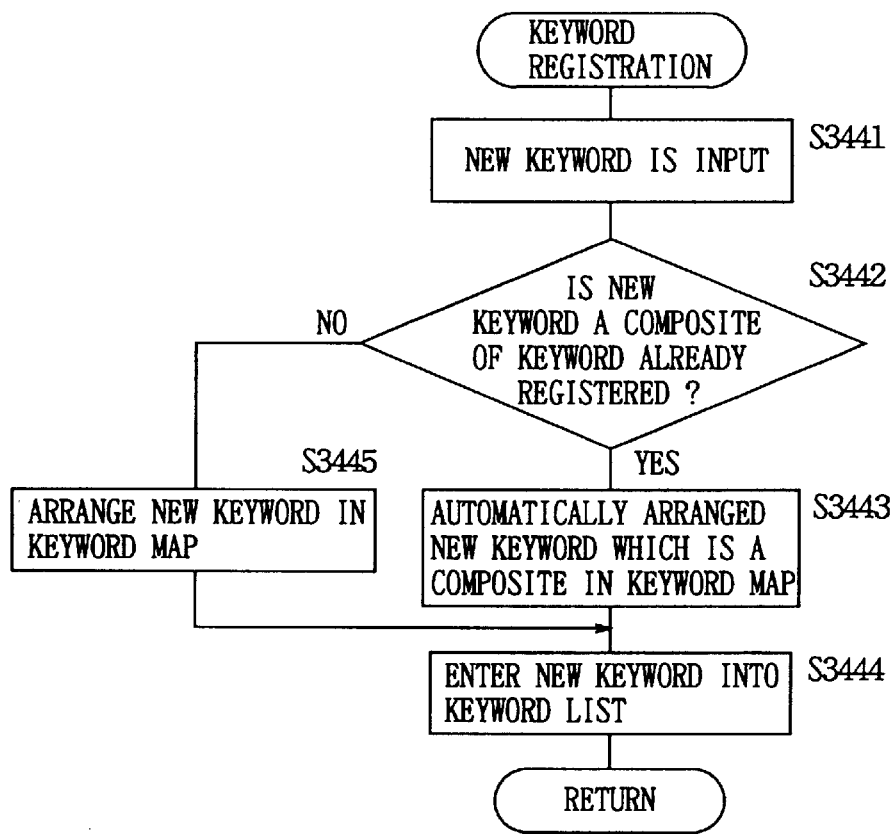
FIG. 12 is a flow chart showing contents of a keyword registration process.

FIG. 12 is a flow chart showing in detail registration of a keyword of FIG. 9. Here, a keyword designated to each image data is input to be registered into a keyword map, and added to a keyword list. Referring to FIG. 12, a new keyword is input in text (S3441). Then, determination is made whether the input keyword is a composite of a keyword that is already registered (S3442). If YES, the position of the new keyword is automatically calculated from the keyword that is already registered, and automatically arranged in the keyword map (S3443). If NO, a process of arranging the new keyword manually in the keyword map is carried out (S3445). The method of calculating the center position of each keyword forming the composite or calculating the barycenter between each keyword forming the composite and the origin of the keyword map can be considered as automatic calculation methods. The newly input keyword is enrolled in the keyword list (S3444), and the program proceeds to RETURN.

Figure 13:
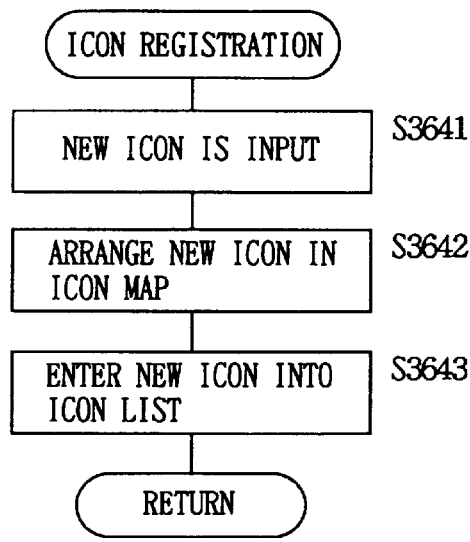
FIG. 13 is a flow chart showing contents of an icon registration process.

FIG. 13 is a flow chart showing the details of the icon registration of FIG. 10. Here, an icon added to each image data is input to be registered in an icon map, and added into the icon list. Referring to FIG. 13, a new icon is generated and input by a draw function or a paint function of system 100 (S3641). Then, the new icon is arranged in the icon map (S3642). The new input icon is enrolled in the icon list (S3643). Then, the program proceeds to RETURN.

Figure 14:
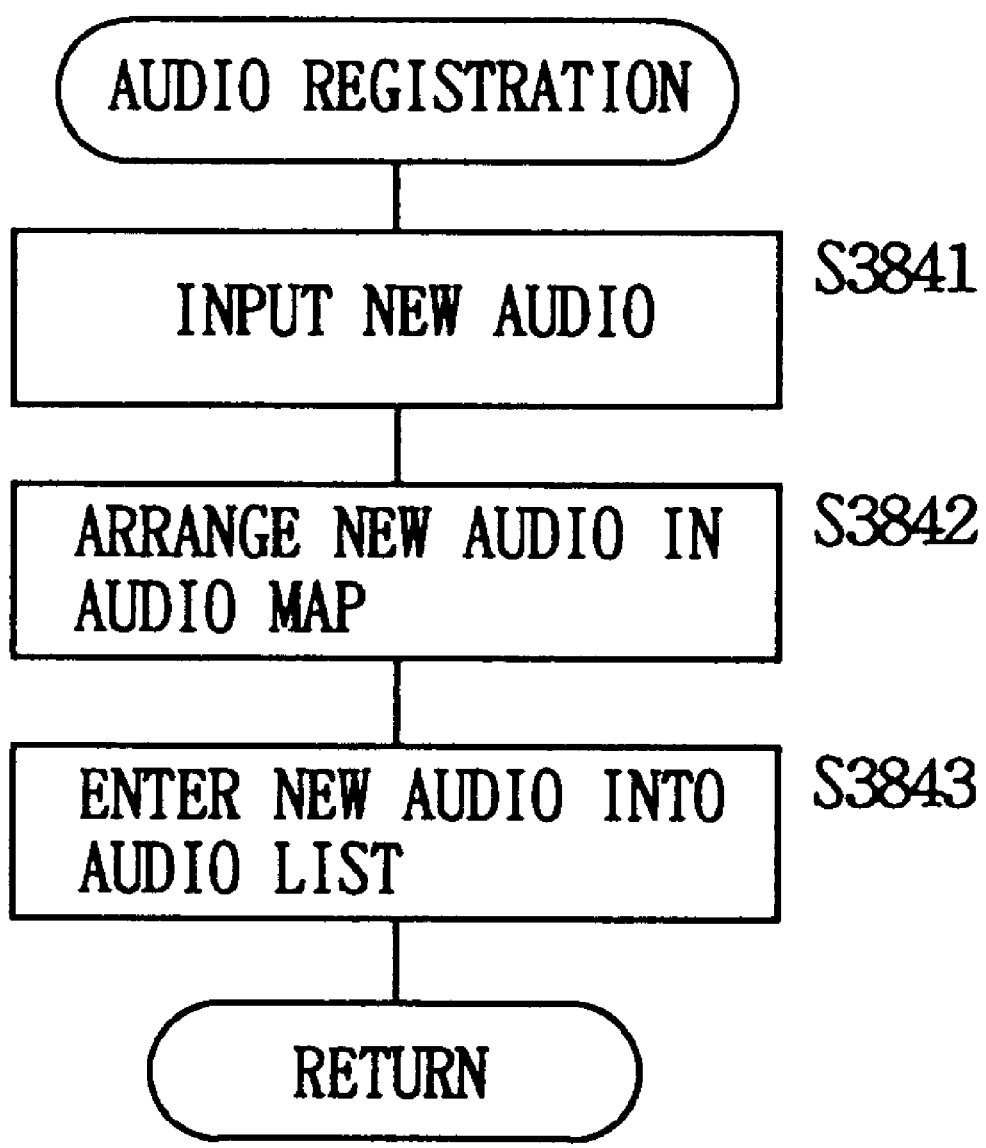
FIG. 14 is a flow chart showing contents of an audio registration process.

FIG. 14 is a flow chart showing the details of the audio registration of FIG. 11. Here, the audio added to each image data is input to be registered into the audio map, and added into an audio list. Referring to FIG. 14, a new audio is input via microphone 11 (S3841). Then, the new audio is arranged (a picture or code is displayed on the screen as a substitute of the audio) in the audio map (S3842). The new input audio is enrolled into an audio list (S3843). Then, the program proceeds to RETURN.

Figure 15:
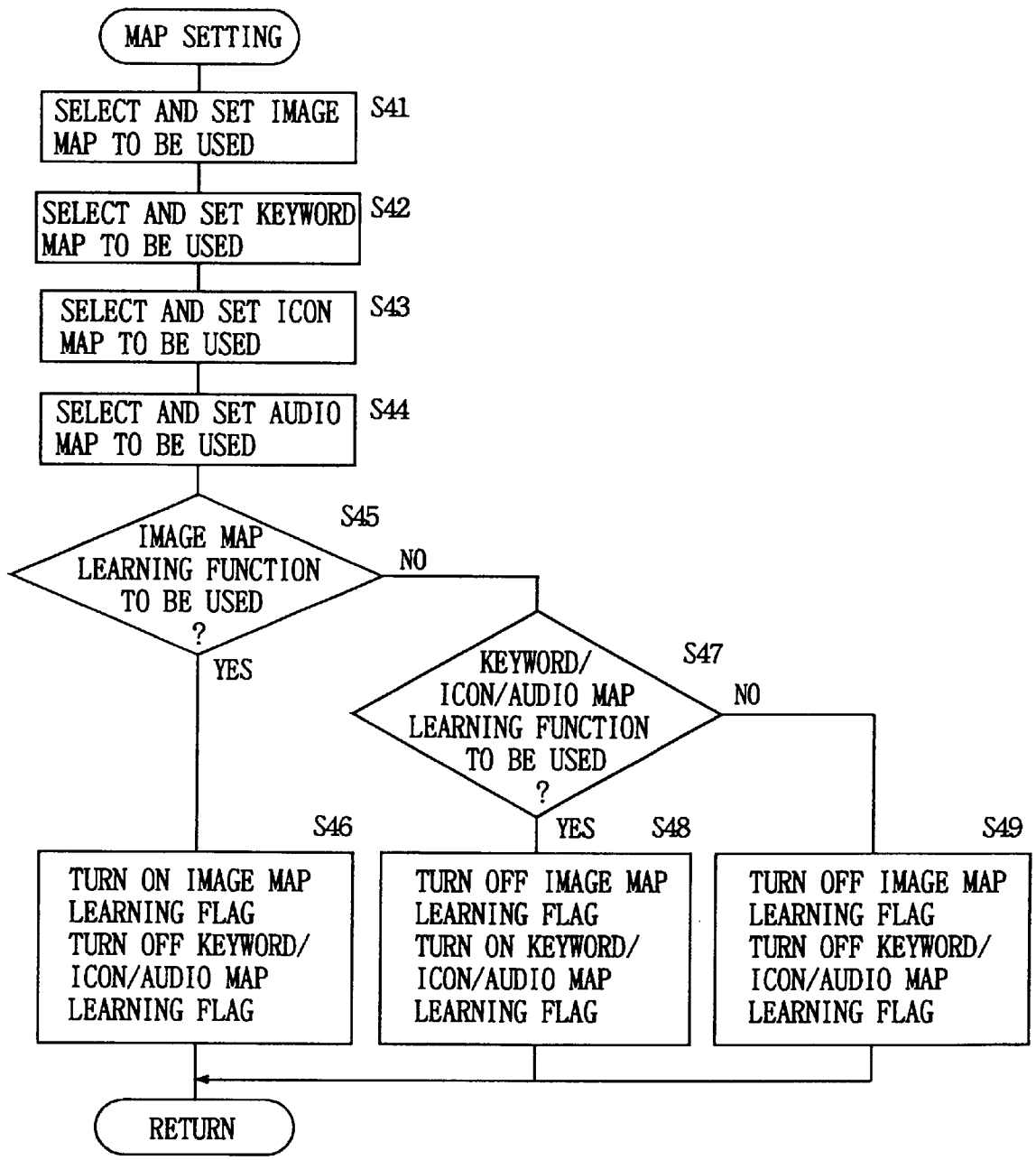
FIG. 15 is a flow chart showing contents of a map setting process.

FIG. 15 is a flow chart showing the details of the map setting process of FIG. 3. Here, an image map to be used is set up, and selection is made of whether to use a map learning function. Referring to FIG. 15, an image map to be used is selected and set (S41) from the image map already generated according to the map generation process (FIG. 3, S3). Then, a keyword map to be used is selected and set (S42) from the keyword map already generated according to the map generation process (S3). An icon map to be used is selected and set (S43) from the icon map already generated according to the map generation process (FIG. 3, S3). Then, an audio map to be used is selected and set (S44) from the audio map already generated according to the map generation process (FIG. 3, S3).

The maps set at steps S41–S44 are used in the image data input process (FIG. 3 S5) and the image data retrieval process (S3, S6).

Determination is made whether an image map learning function is used or not (S45). If YES, the image map learning flag is turned on, and the keyword/icon/audio map learning flag is turned off (S46). Then the program proceeds to RETURN. When NO at S45, determination is made whether the keyword/icon/audio map learning function is to be used (S47). If YES, the image map learning flag is turned off and the keyword/icon/audio map learning flag is turned on (S48). Then, the program proceeds to RETURN. When NO at S47, the image map learning flag is turned off and the keyword/icon/audio map learning flag is turned off (S49). Then, the program proceeds to RETURN. Here, a map learning function refers to a function that automatically sets the position information on the map. Details will be described afterwards.

Image Data Input

Image data input will be described with reference to the flow chart of FIG. 16. First, determination is made whether image data is to be newly input or not (S51). In the case of new data, the image data is entered (S52), otherwise one existing image data is selected (S53). Then, determination is made whether additional information is to be input or not (S54). If YES, an input process of additional information is carried out (S55). When input of additional information is completed, the image data together with the additional information is stored in a memory device such as hard disk 6 (S56). Then the program proceeds to RETURN.

Figure 16:
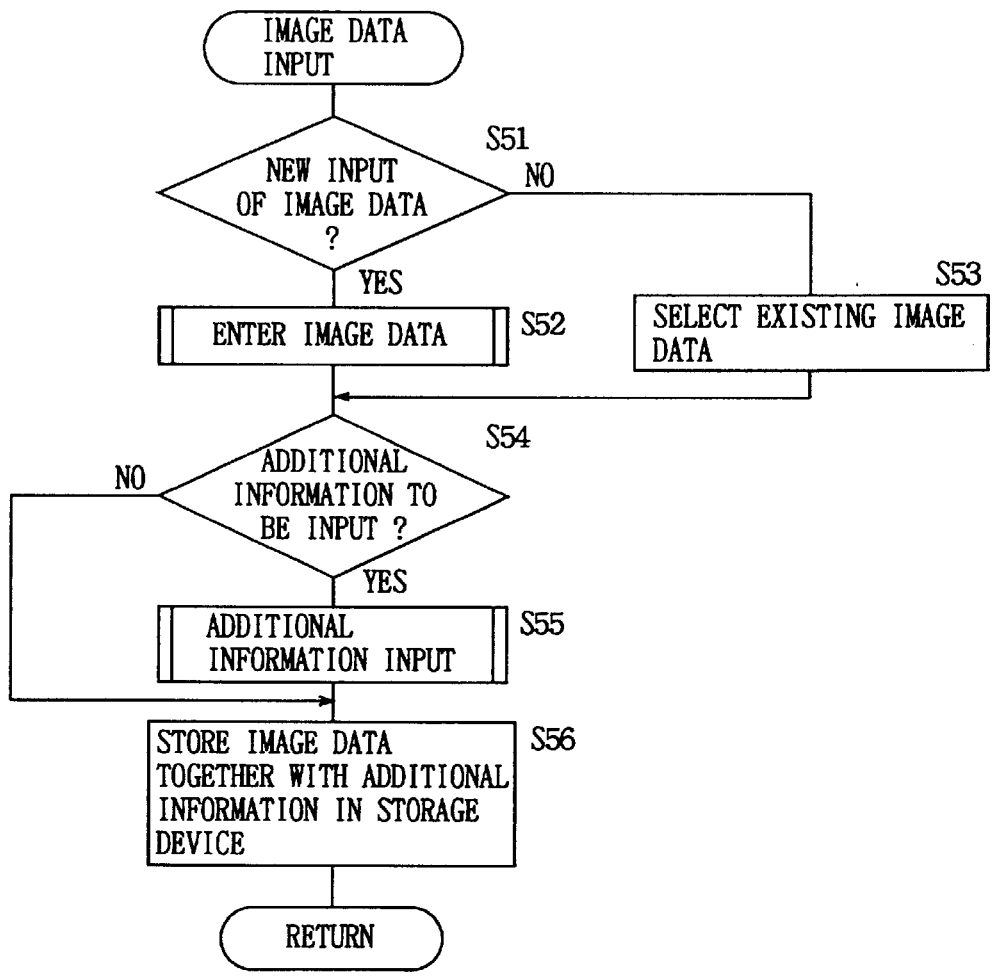
FIG. 16 is a flow chart showing contents of an image data input process.
Figure 17:
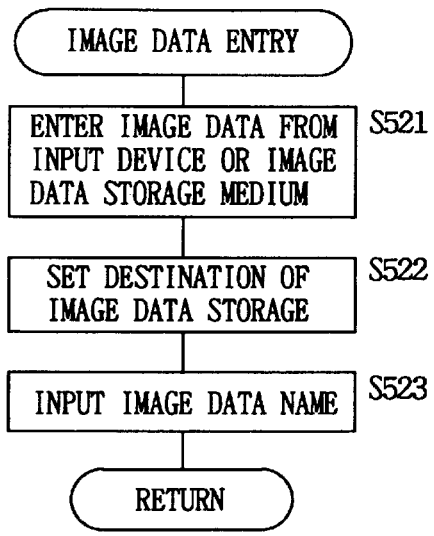
FIG. 17 is a flow chart showing contents of an image data extract process.

FIG. 17 is a flow chart showing the detail of the image data enter process of FIG. 16. First, image data is extracted from an image input device such as scanner 8 or an image data storage medium such as hard disk 6 (S521). Next, destination of the image data storage such as hard disk 6 is set (S522). Then, input of an image data name is effected (S523). Then, the program proceeds to RETURN.

Figure 18:
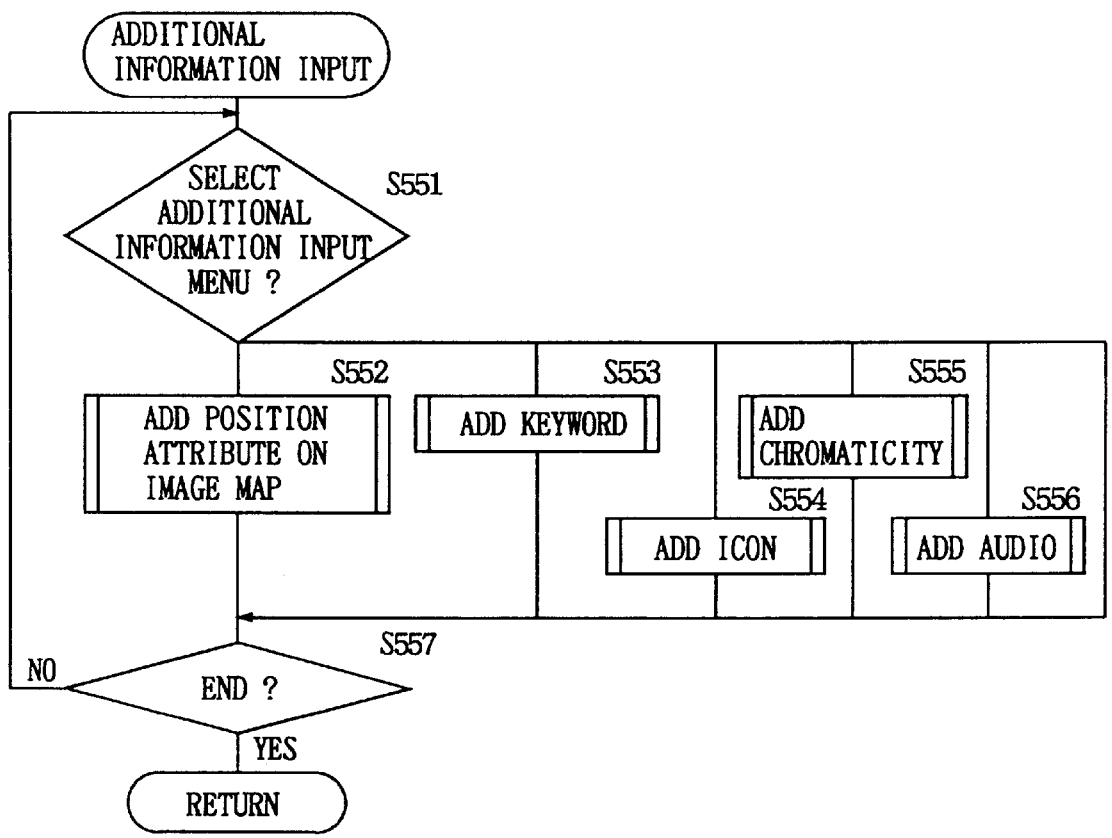
FIG. 18 is a flow chart showing contents of an additional information input process.

FIG. 18 is a flow chart showing the details of the additional information input process of FIG. 16. In this process, a menu screen for an additional information input process appears on the screen of display 2. The menu screen includes the application of the position attribute on the image map, and also the applications of a keyword, an icon, chromaticity, and audio. The user selects a desired item from the menu (S551). Upon selection from the menu, an appropriate process is carried out (S552–S556). When the process is completed, determination is made whether the input process of additional information is completed or not (S557). When completed, the program proceeds to RETURN, otherwise to S551 to repeat an appropriate process.

Figure 19:
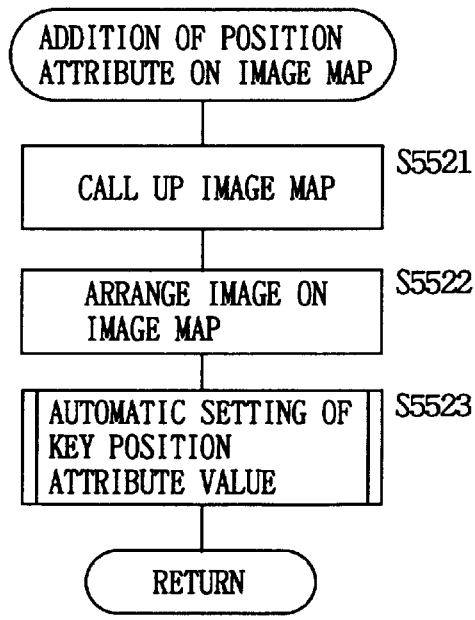
FIG. 19 is a flow chart showing contents of an adding process of a position attribute on an image map.

FIG. 19 is a flow chart showing the details of the adding process of a position attribute on the image map of FIG. 18. Referring to FIG. 19, an image map is called up (S5521). Then, an image is arranged on the image map (S5522). Next, an automatic setting process of the position attribute value of the key is carried out (S5523). Then the program proceeds to RETURN.

Here, "key" refers to the additional information of a keyword, an icon, and the like. The position attribute value represents the X and Y coordinate values on each map. Here, the key position attribute value refers to the X and Y coordinate values on the map of the additional information such as the keyword map, the icon map, and the like.

Figure 20:
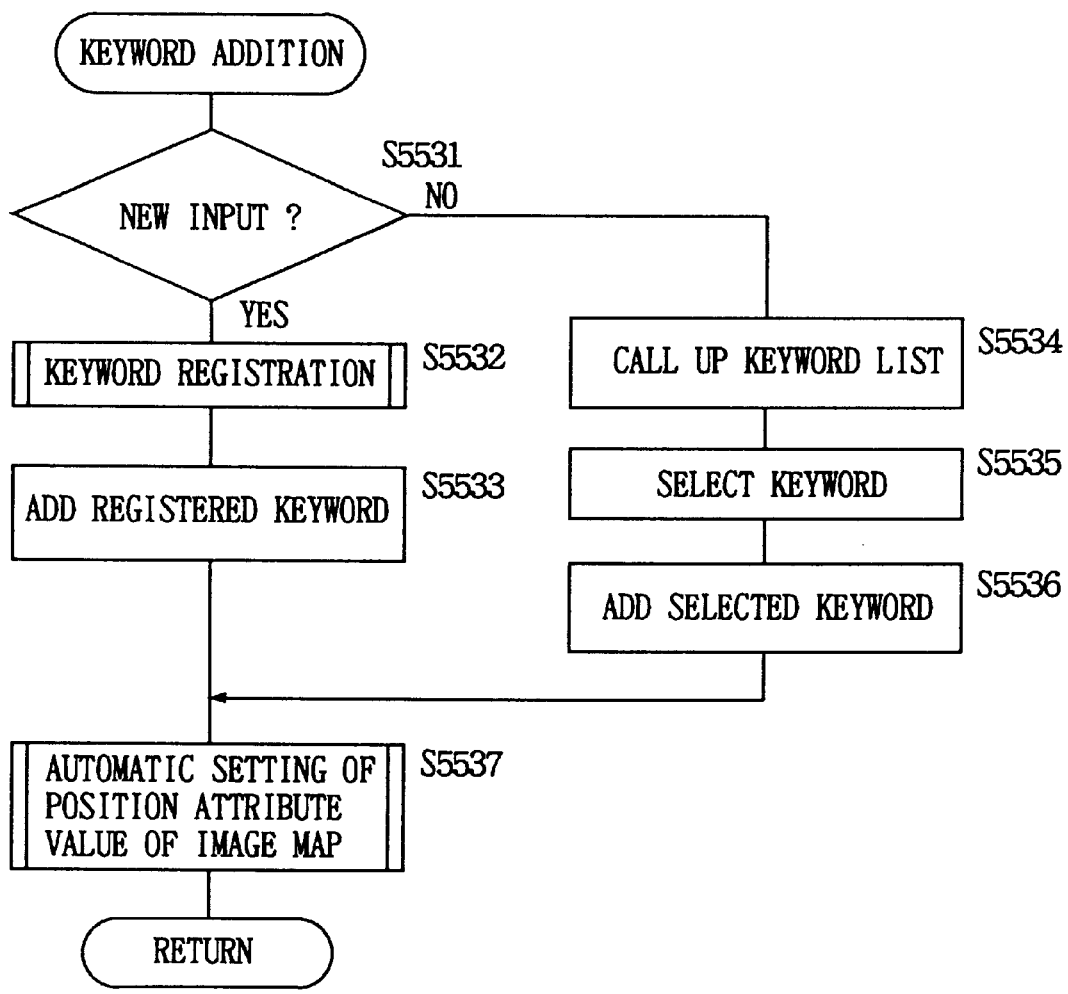
FIG. 20 is a flow chart showing a keyword adding process.

FIG. 20 is a flow chart showing the details of the keyword adding process of FIG. 18. First, determination is made whether a newly input keyword is to be added or a keyword that is already registered is to be added (S5531). In the case of a new keyword, a keyword registration process (5532) is carried out. Upon registration of a keyword, the registered keyword is added as the additional information of the image data (S5533). Automatic setting of the position attribute value of the image map is carried out (S5537). Then, the program proceeds to RETURN. When a keyword that is already registered is to be added (NO at S5531), a keyword list is called up (S5534). A keyword is selected from the keyword list (S5535). The selected keyword is added as the additional information of the image data (S5536). Then, an automatic setting process of the position attribute value of the image map is carried out (S5537). Then, the program proceeds to RETURN.

Figure 21:
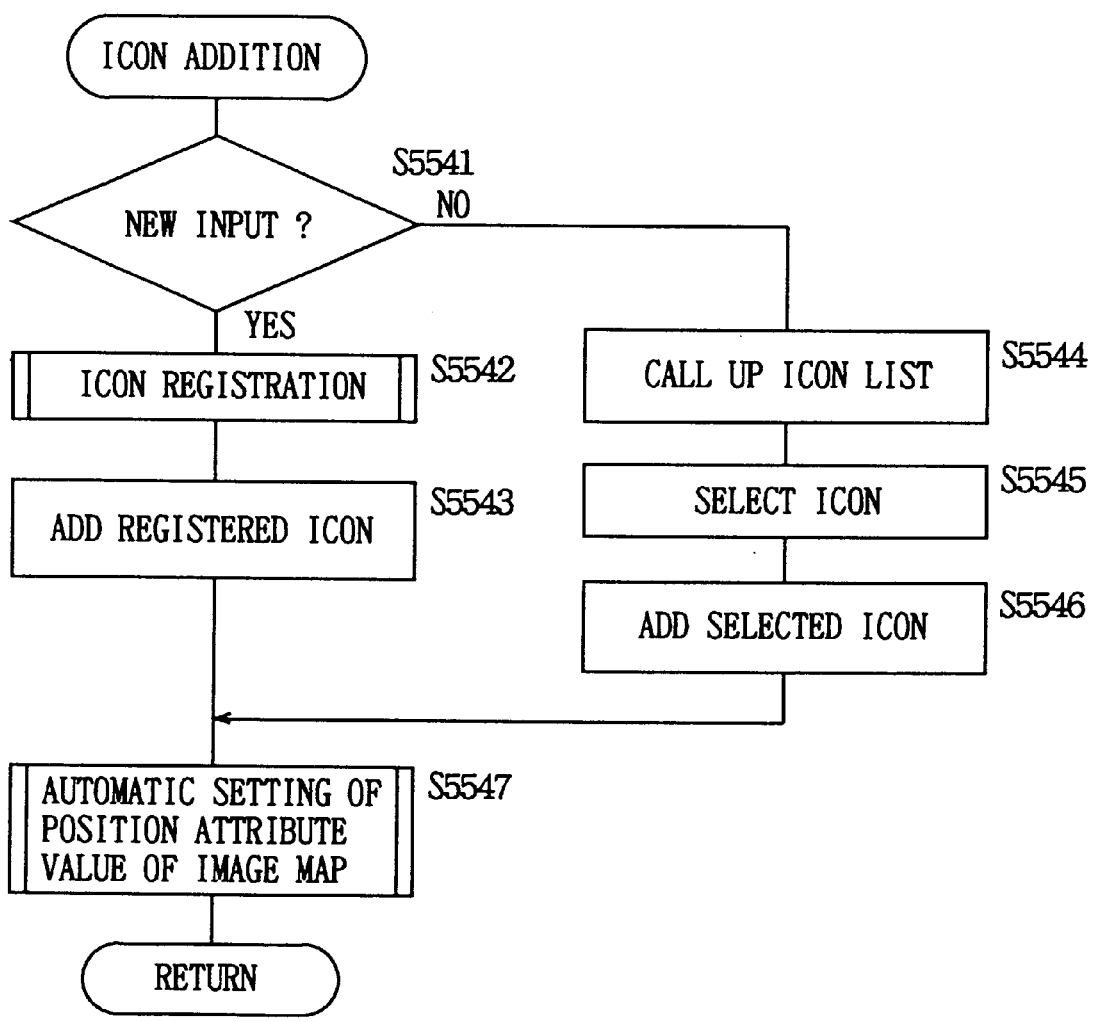
FIG. 21 is a flow chart showing an icon adding process.

FIG. 21 is a flow chart showing the details of the icon adding process of FIG. 18. First, determination is made whether a newly input icon or an icon that is already registered is to be added (S5541). In the case of a new item, an icon registration process (S5542) is carried out. Following registration of an icon, the registered icon is applied as the additional information of the image data (S5543). A position attribute value automatic setting of the image map is carried out (S5547). Then, the program proceeds to RETURN. When an icon that is already registered is to be applied (NO at S5541), the icon list is called up (S5544). An icon is selected from the icon list (S5545), and the selected icon is applied as the additional information of that image data (S5546). Automatic setting of the position attribute value of the image map is carried out (S5447). Then, the program proceeds to RETURN.

Figure 22:
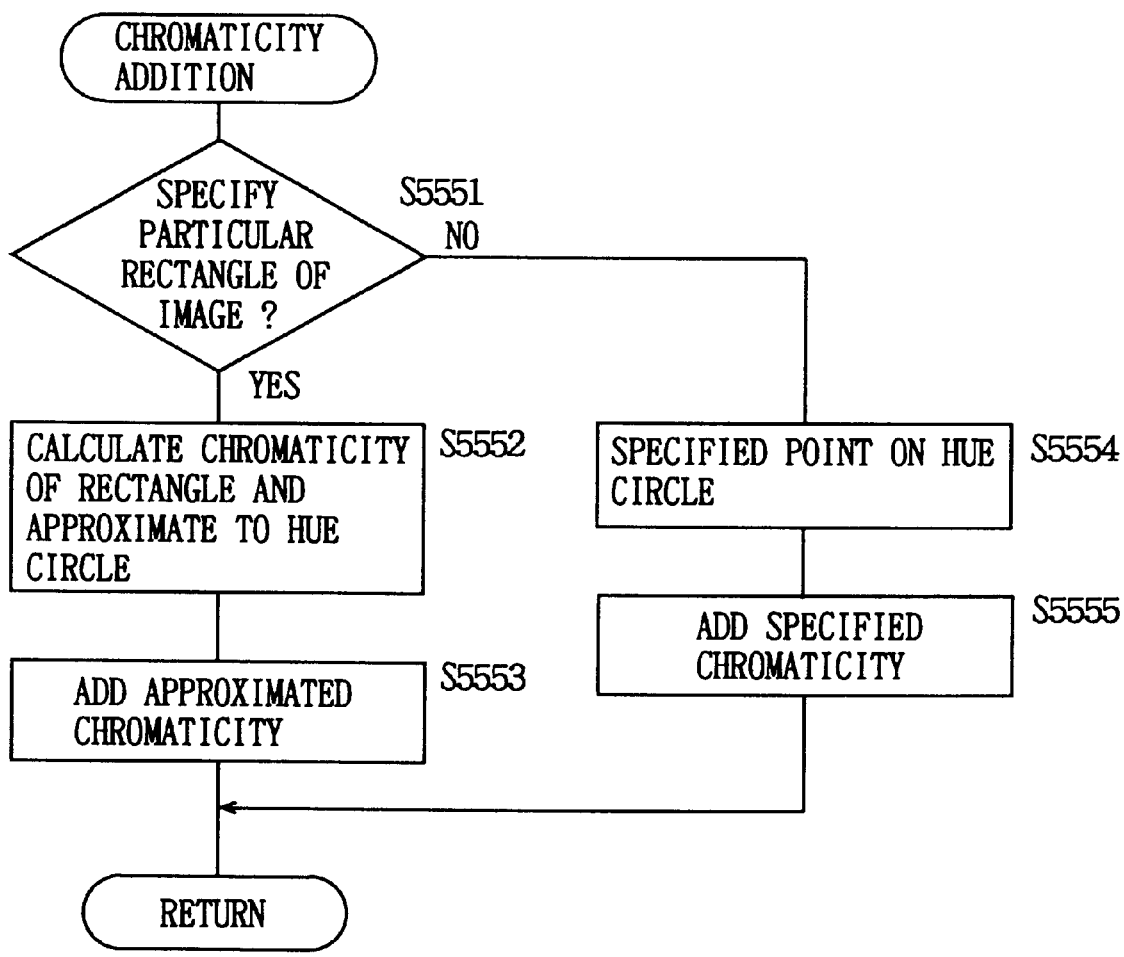
FIG. 22 is a flow chart showing a chromaticity adding process.

FIG. 22 is a flow chart showing the details of the chromaticity applying process of FIG. 18. First, determination is made whether a particular rectangle of an image is to be specified or not (S5551). If YES, the chromaticity of the specified rectangle is calculated, and the obtained value is made to approximate the chromaticity of the closest hue circle (S5552). The calculation of chromaticity may be obtained by the weighted average of color for each bit (pixel) in the rectangle, or the most commonly used color may be taken. The approximated chromaticity is applied as the additional information of the image data (S5553). Then, the program proceeds to RETURN. When a particular rectangular is not specified (NO at S5551), one point on the hue circle is specified (S5554). The chromaticity of the specified point is applied as the additional information of that image data (S5555). Then, the program proceeds to RETURN.

Figure 23:
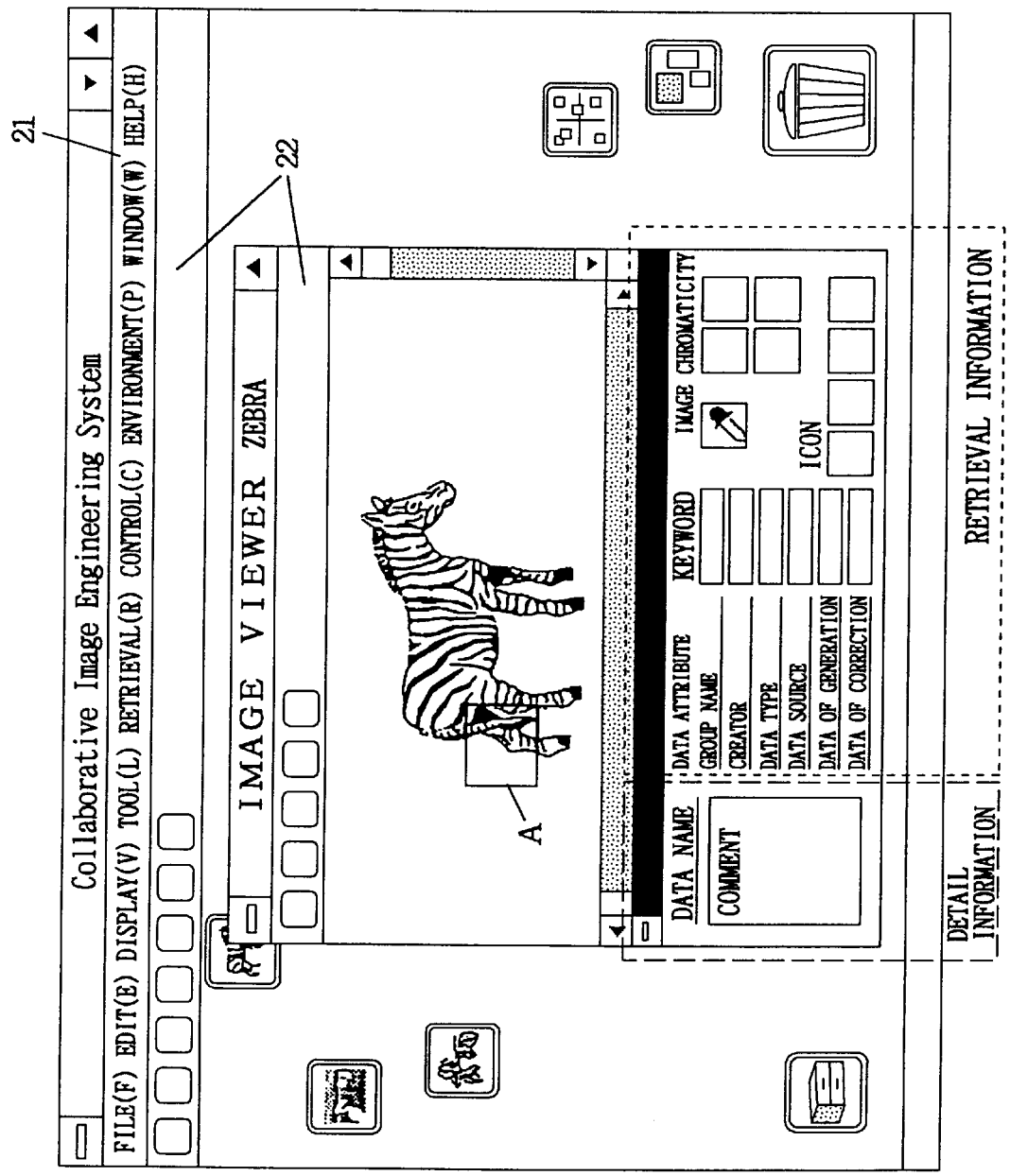
FIG. 23 shows an example of a viewer and additional information display mode.

FIG. 23 shows an example of an image viewer screen that will be described afterwards. The above-mentioned particular rectangle is such a region of a particular portion (portion A in FIG. 23) on the screen.

Figure 24:
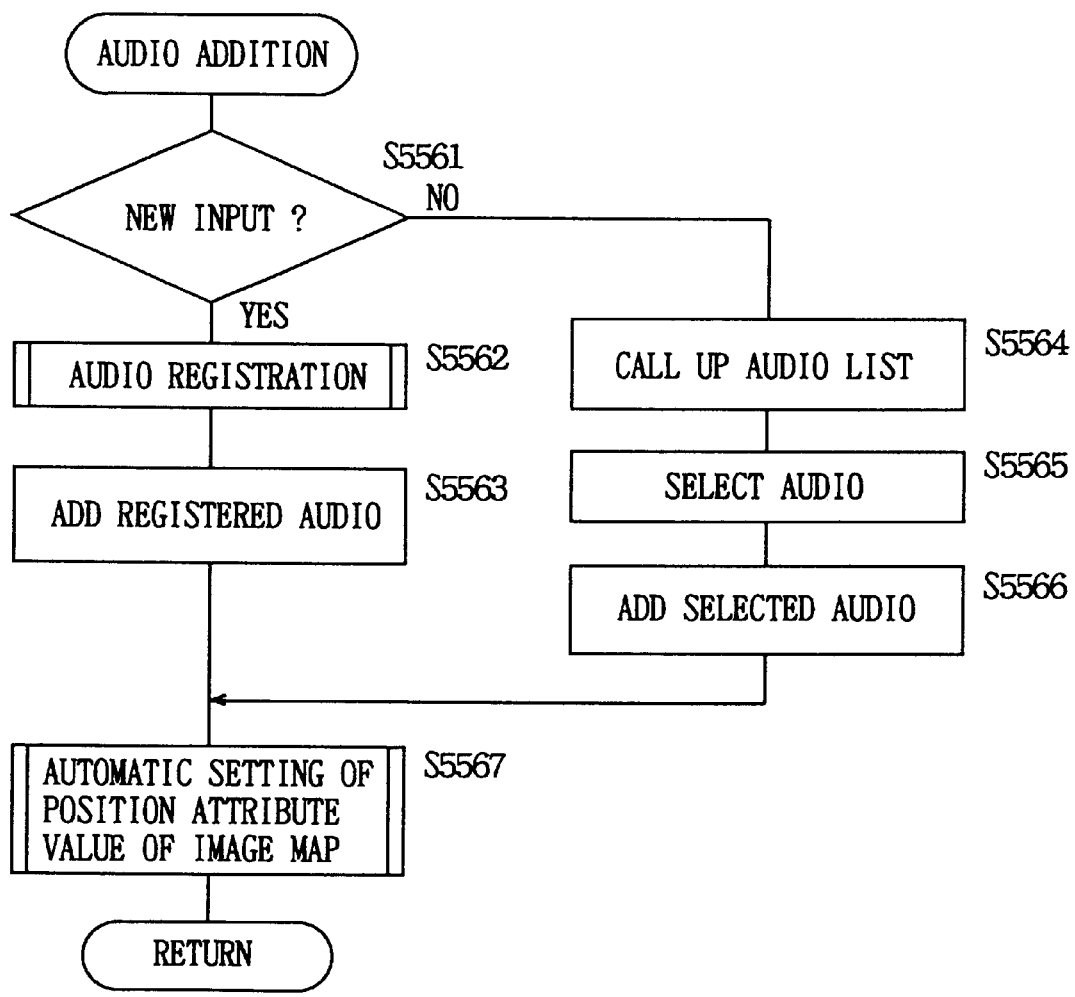
FIG. 24 is a flow chart showing an audio adding process.

FIG. 24 is a flow chart showing the details of the audio applied process of FIG. 18.

First, determination is made whether a newly input audio is to be applied or an audio that is already registered is to be applied (S5561). If YES, an audio registration is carried out (S5562). Following audio registration, the registered audio is applied as the additional information of the image data (S5563). An automatic setting process of the position attribute value of the image map is carried out (S5567). Then, the program proceeds to RETURN. When NO at S5561, an audio list is called up (S5564). An audio is select from the audio list (S5565). The selected audio is applied as the additional information of the image data (S5556). Then, an automatic setting process of the position attribute value of the image map is carried out (S5567). Then, the program proceeds to RETURN. The audio information will be represented as a code or a picture on the map and list.

Figure 25:
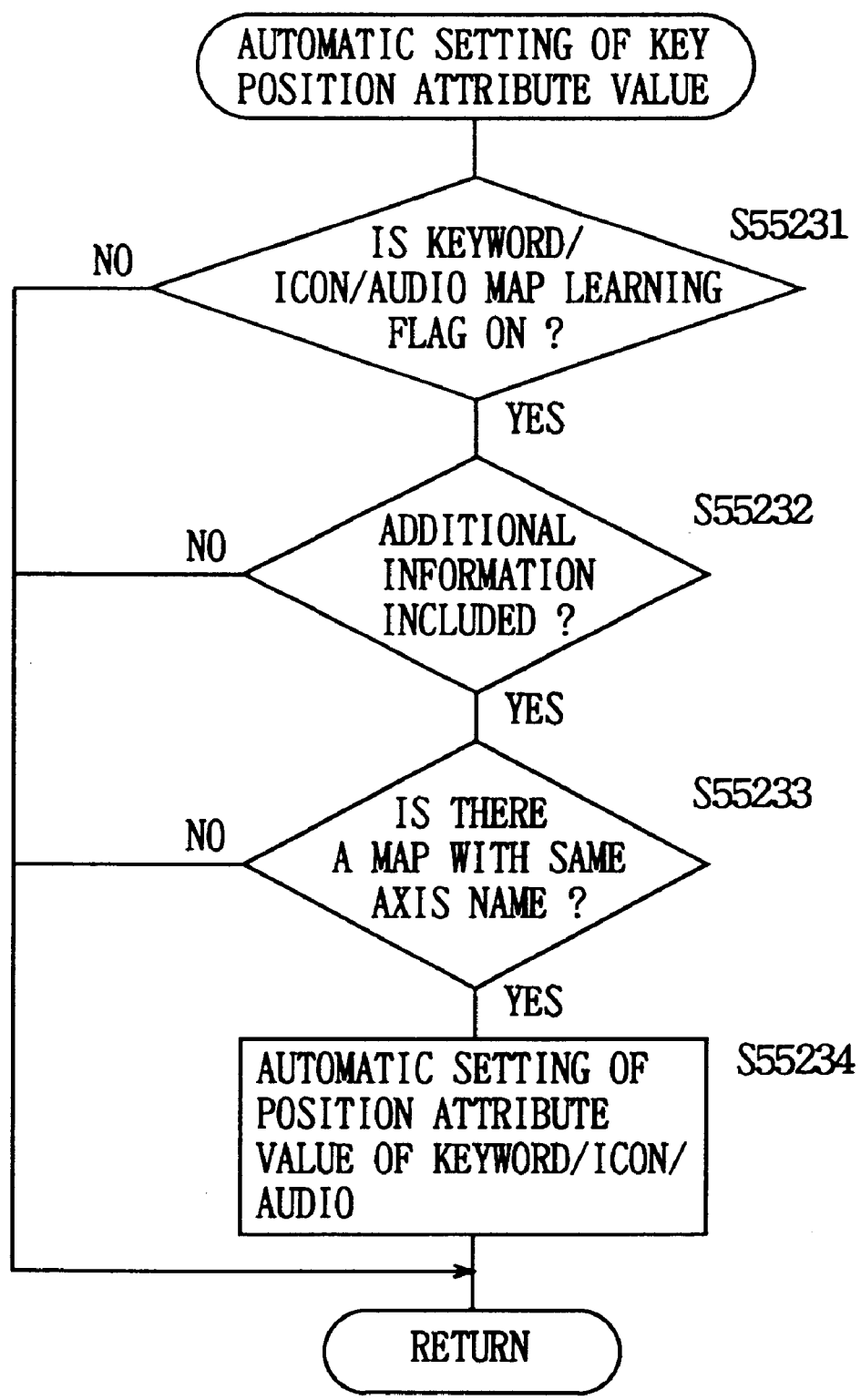
FIG. 25 is a flow chart showing an automatic set up process of a key position attribute value.

FIG. 25 is a flow chart showing the details of the automatic setting process of the key position attribute value shown in FIG. 19. First, determination is made whether the keyword/icon/audio map learning flag is turned on or not (S55231). If ON (YES at S55231), detection is made whether the image data includes additional information of keyword, icon, and audio (S55232). If the image data includes the above additional information, detection is made whether there is the same axis name of the image map that is currently used in the map (keyword map, icon map, audio map) corresponding to the type of the additional information (keyword, icon, audio). If there is the same axis name (YES at S55233), the above-described additional information is arranged on the map and set as the position attribute value on the map (S55234).

It is now assumed that the image data has a plurality of keyword maps with different axis names, and one keyword as the additional information. Also, it is assumed that the keyword is arranged in some of the keyword maps and not arranged in the remaining maps of the plurality of keyword maps. When the keyword/icon/audio map learning flag is ON at the above process of S55231, a keyword map out of the plurality of keyword maps is searched for that matches the axis name of the image map regardless of whether that keyword is arranged or not since the image data includes a keyword as the additional information. More specifically, a keyword map with matching axis names are searched for on the maps shown in FIGS. 5 and 6. If there is a matching keyword map, the relevant keyword is arranged on that keyword map at a position of coordinates identical to that of the image data on the image map. If that keyword is already arranged on the keyword map, it is rearranged so as to be located on the position of coordinates identical to that of the image data on the image map. If the image data of interest has a plurality of additional information and there is a map in which the respective axis names of the plurality of additional information match, setting of the position attribute value for all the matching maps is carried out. If the keyword/icon/audio map learning flag is OFF at S55231, the program proceeds to RETURN.

Figure 26:
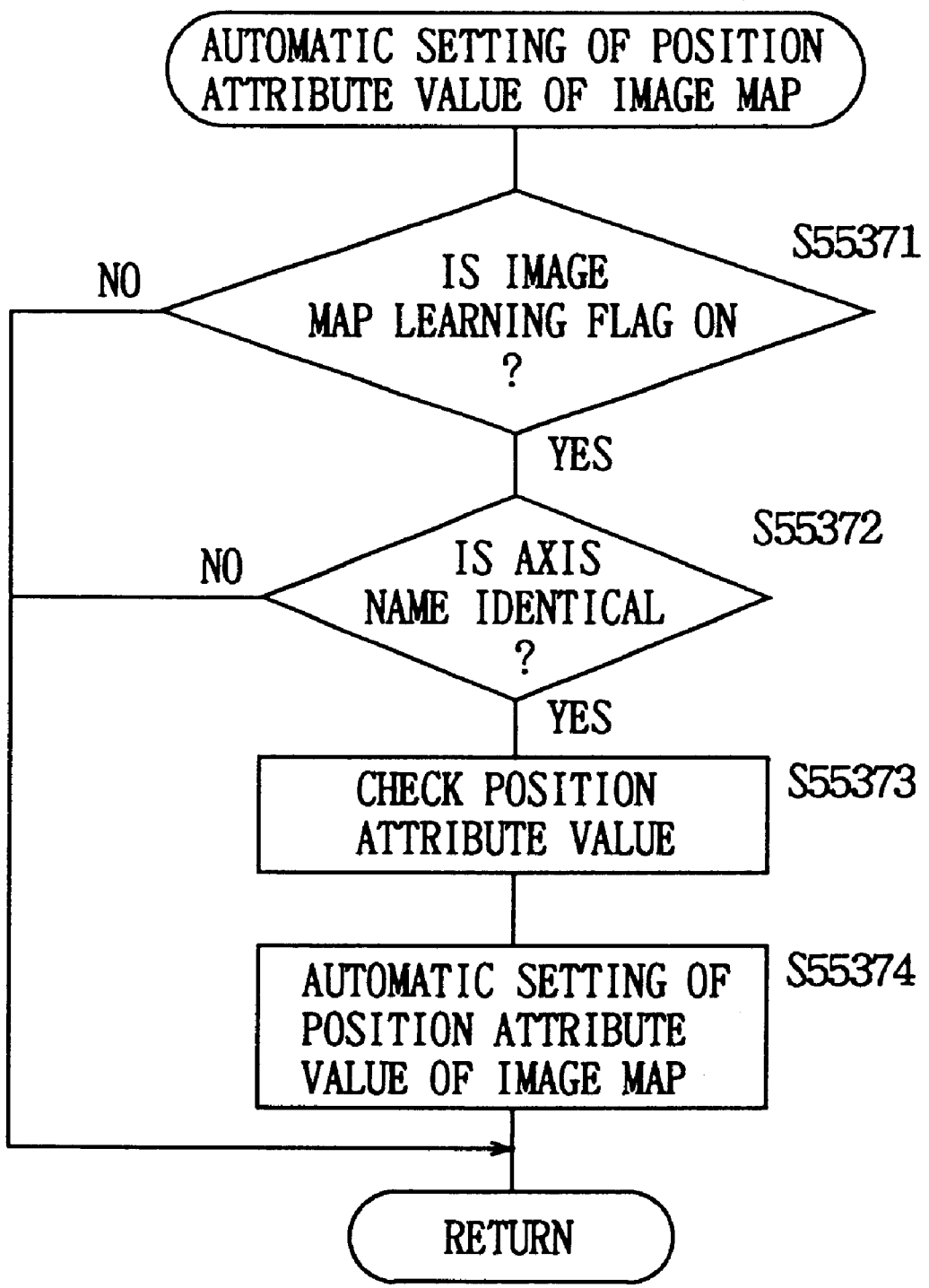
FIG. 26 is a flow chart showing an automatic set up process of a position attribute value of an image map.

FIG. 26 is a flow chart showing the details of the automatic setting process of the position attribute value of the image map shown in FIGS. 20, 21 and 24. First, determination is made whether the image map learning flag is ON or OFF (S55371). If ON (YES at S55371), determination is made whether the axis name of the map in which the additional information is arranged is identical to the axis name of the currently set image map (S55372). If a plurality of the same types of maps (keyword map, icon map, audio map) are produced in the map generation process of S3 (FIG. 3), there are maps of different axis names of the same type in addition to the currently set map. In this case, a search is made for the same axis name in maps that are not set at the process of S55372. If there is one with the same axis name (YES at S55372), the position attribute of the applied additional information (the position of coordinates arranged on the map) is detected (S55373). Then, the image data is arranged on an identical position in the image map, and set as the position attribute value (S55374). Following the completion process, the program proceeds to RETURN. When the image map learning flag is OFF (NO at S55371), or when the axis name differs (NO at S55372), the program proceeds to RETURN.

When the image data has a plurality of additional information, and when the axis name of the map in which the additional information are arranged is identical, the remaining additional information are arranged so as to be located at the same position on respective maps once the position of one additional information is defined on the map.

Here, the following becomes apparent upon referring to the present process (automatic setting of the position attribute value of the image map), the registration process of keywords shown in FIG. 9, and the keyword applying process of FIG. 20. By just applying a keyword to the image data, the keyword is automatically arranged on the keyword map and the image data is also automatically arranged on the image map. In other words, manual operation for arrangement on the map is not required.

It is now assumed that the image map and the keyword are two-dimensional maps including the axis names of "hot-cold" and "far-near", and the keywords of "tropical" and "Hawaii" are already arranged in the keyword map. By just adding the keyword of "tropical Hawaii" to the image that is to be newly input (registered) into the data base, automatic calculation is carried out, whereby "tropical Hawaii" is automatically arranged on the keyword map. This position is obtained by calculation such as taking the center of both keywords or taking the barycenter of the origin and two points. Furthermore, the image to which the keyword of "tropical Hawaii" is added is automatically arranged on the image map to complete the input (registration) of the data base.

Image Data Retrieval

Image data retrieval will be described hereinafter with reference to the flow chart of FIG. 27.

Figure 27:
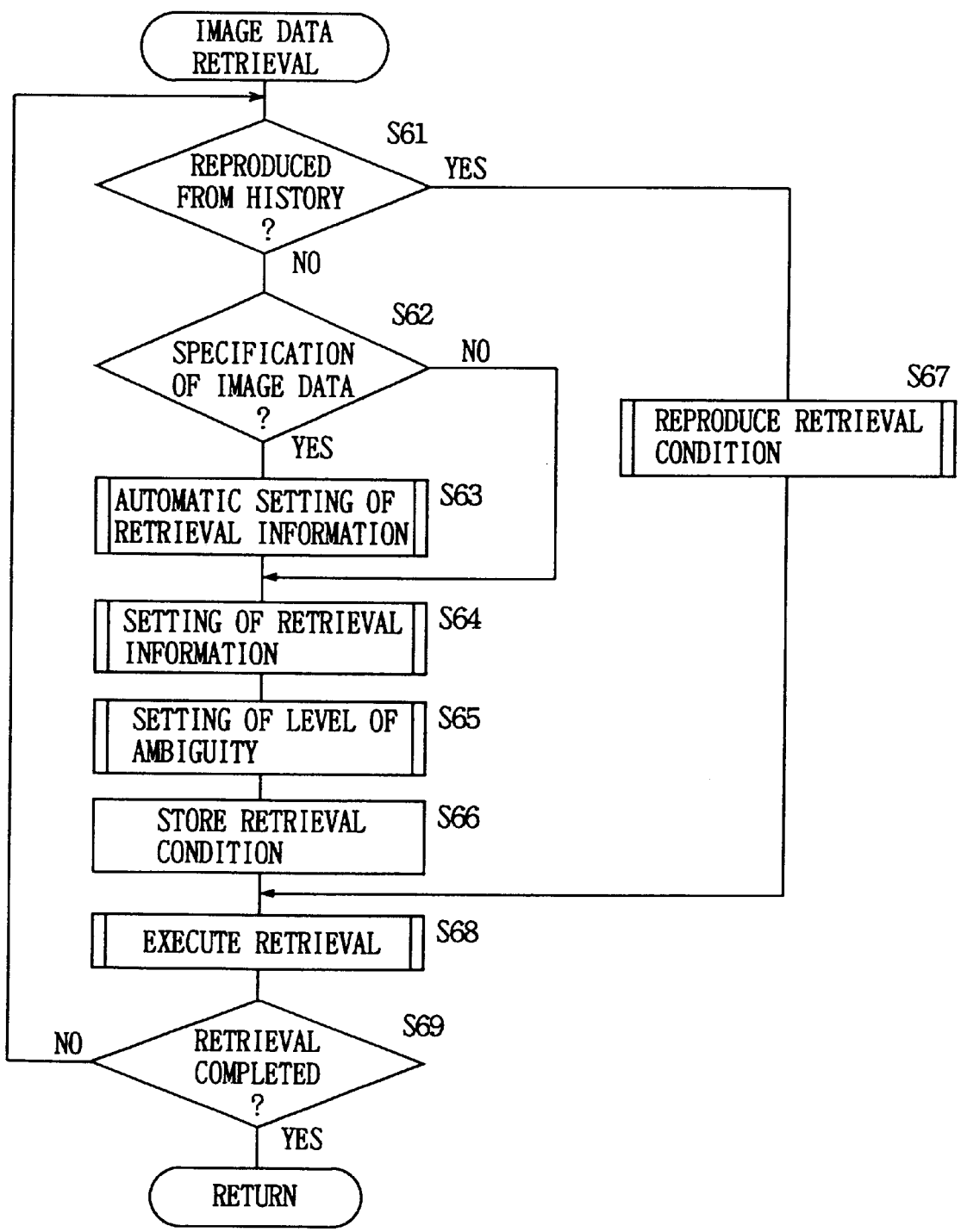
FIG. 27 is a flow chart of an image data retrieval process.

Referring to FIG. 27, determination is made whether the retrieval condition is to be reproduced or not from the history (S61). "History" refers to the course of image data retrieval carried out in the past. "Retrieval Condition" refers to retrieval information and ambiguity (described afterwards). Specific display of the history will be described afterwards. When the history is to be reproduced (YES at S61), a retrieval condition reproduction process is carried out (S67). The retrieval condition reproduction process is to display the past retrieval course to select the retrieval to be reproduced, and displaying the retrieval condition and retrieval result to set a new retrieval condition on the basis of the display. When the history is not to be reproduced (NO at S61), and when image data which becomes the basis of retrieval is specified to carry out retrieval according to the distance from that image data on the image map, a retrieval information automatic setting process is carried out (S63). The distance from the image data refers to the range of the image data near the user's image. This is the level of "ambiguity" that will be described afterwards. Then, a process of setting (modifying) the retrieval information (S64), and the process of setting the ambiguity (S65) is carried out. By setting the ambiguity, a data range close to the user's image is specified as the retrieval range.

The current retrieval condition is stored in the history list (S66). In the storing process, identification of whether the immediate preceding retrieval was carried out according to retrieval condition reproduced from the history or not is also stored. This is required to display the history in a tree structure, as will be described afterwards. Then, the retrieval execution process is carried out (S68). The retrieval result is stored in the history list in correspondence with a retrieval condition. Then, determination is made whether the retrieval is to be ended or not (S69). If NO, the program returns to S61 to repeat a relevant process. If YES, the program proceeds to RETURN.

Figure 28:
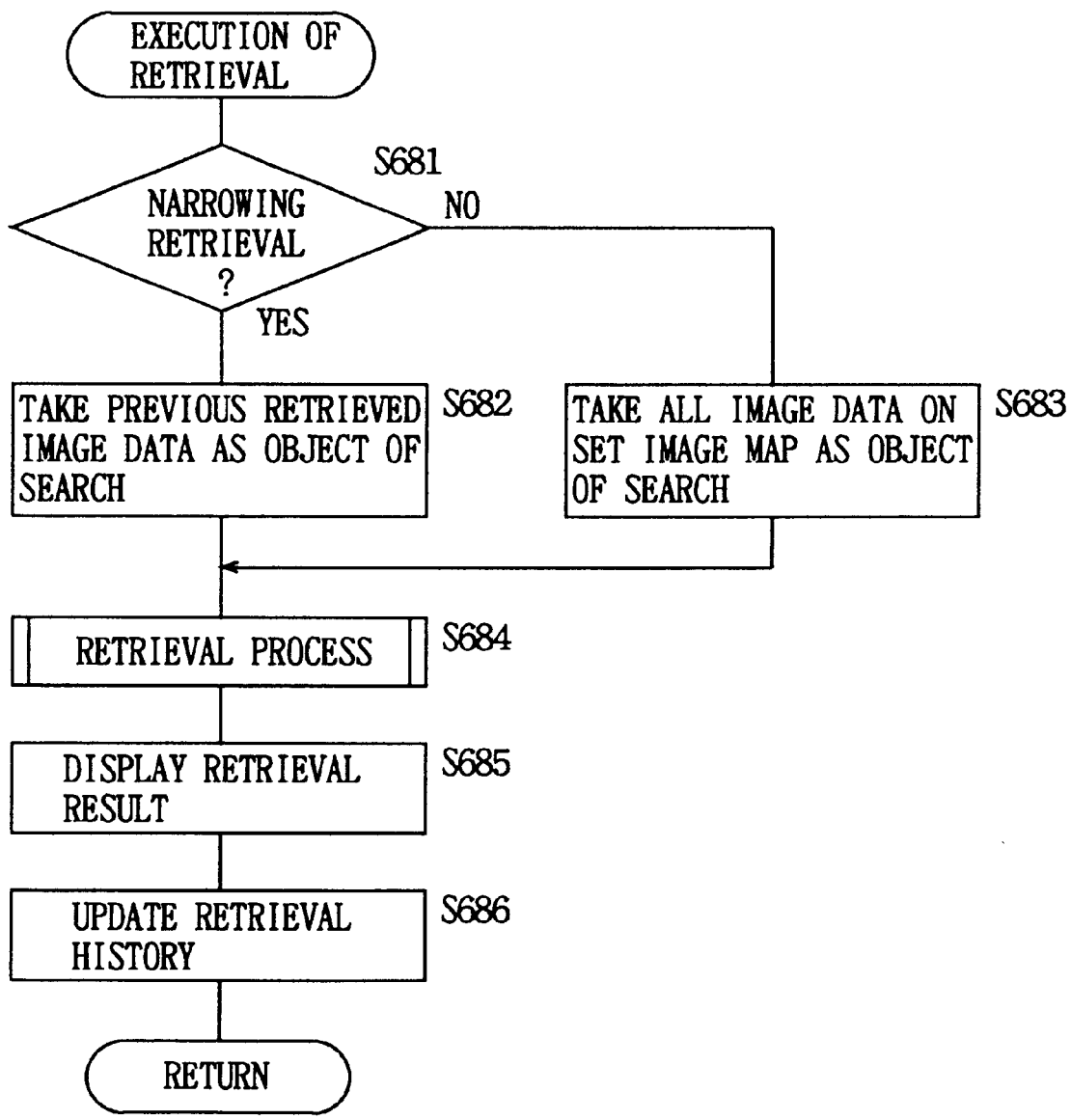
FIG. 28 is a flow chart showing an execution process of retrieval.

FIG. 28 is a flow chart showing the details of the retrieval execution process of FIG. 27. Determination is made whether the present retrieval is a narrowing retrieval or not (S681). This determination is effected by a selection of menu bar 21. If YES at S681, a narrowing retrieval is carried out. In a narrowing retrieval, the image data that is previously retrieved and extracted is set as the object of retrieval (S682). If NO at S681, all the image data on the set image map become the object of retrieval (S683). Then, a retrieval process is carried out (S684). Following execution of a retrieval process, an image of the image data obtained by retrieval is displayed on a retrieval result display region (S685). The display of the retrieval history is updated (S686), and the program proceeds to RETURN.

The retrieval history may be displayed in a list format or in a pictorial format in which the course of retrieval is explicitly shown. An example of the latter is a pictorial display of a tree configuration. More specifically, every one retrieval is indicated with a circle (=node), whereby the circle symbols (=node) are sequentially generated in the course of retrieval. A branch is indicated from a relevant circle (=node) when retrieval information is set and retrieved after returning to a certain time point. A pictorial display of a branching tree configuration can be provided according to the retrieval course.

In this case, it is preferable to provide discrimination by indicating a general retrieval with a big circle and a narrowing retrieval with a small circle. Display of each retrieval is not limited to a circle, and various representation may be provided such as a block display of a text train of a retrieval condition (enclosed by a rectangle). Specific examples of display will be described afterwards.

Figure 29A:
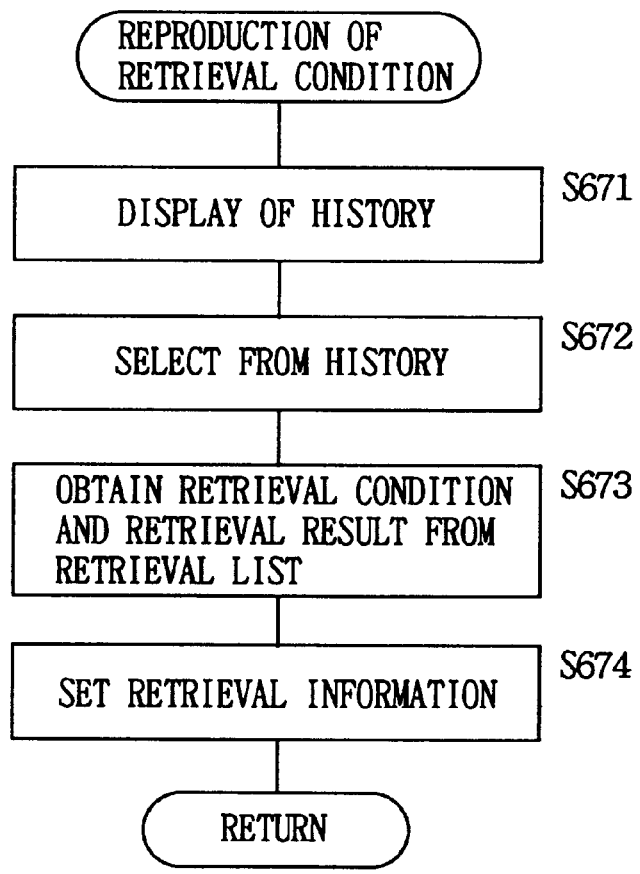
FIGS. 29A and 29B are flow charts showing a reproduction process of retrieval information.

FIG. 29A is a flow chart showing the details of the retrieval condition reproduction process of FIG. 27. Referring to FIG. 29A, the history is displayed (S671). This history is based on the history list stored at S66. One history is selected (S672). Selection of a history can be effected by selecting a portion (for example, a circle) representing one execution information in a list format or in a branching tree format via a mouse or keyboard. Following selection of execution information, the retrieval condition and retrieval result of the selected execution information are obtained to be displayed on the screen (S673). The next retrieval condition is set (or the obtained retrieval conduction is modified) referring to the retrieval condition and retrieval result obtained from the history list (S674). It is to be noted that the previous retrieval condition and the next retrieval condition are independent. Upon completion of a retrieval condition setting, the program proceeds to RETURN.

Figure 29B:
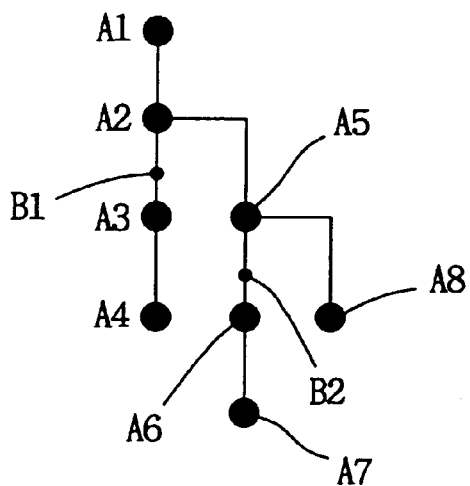

FIG. 29B shows a display screen of the retrieval history of S671 in FIG. 29A. Referring to FIG. 29B, A1–A8 show respective retrieval courses. More specifically, first retrieval A1 is carried out under a certain retrieval condition. Then, retrieval A2 is carried out under another retrieval condition, followed by retrievals A3 and A4 of different retrieval conditions. It is assumed that retrieval is carried out in order from A1 to A4 by enlarging or narrowing the image. The retrieval course from retrieval A1 to retrieval A4 is connected vertically. It is then assumed that a new retrieval condition is conceived, and retrieval A5 is carried out under that retrieval condition. In this case, the retrieval course of retrieval A5 is indicated so as to be branched from retrieval A2 since retrieval A5 is effected with retrieval A2 as the starting point. Similarly, retrievals A6 and A7 are sequentially carried out from retrieval A5. Also, retrieval A8 is carried out with retrieval A5 as the starting point.

When a narrowing retrieval B1 is carried out under a new retrieval condition with the retrieval result (image data) detected under the retrieval condition of A2 (image data) as the object, the retrieval course of B1 is indicated in a manner different from that of a general retrieval course. It is appreciated from FIG. 29B that a narrowing retrieval B2 is carried out under the new retrieval condition with the retrieval result (image data) retrieved under the retrieval condition of retrieval A5 as the object. The course of retrieval and the retrieval history can be identified in detail since the retrieval history can be indicated in different forms according to the way of retrieval. When such a retrieval is carried out, the retrieval history (retrieval condition and retrieval result) is stored in RAM 204 or hard disk 6 in the present invention. Therefore, the advantage of identifying the retrieval course and history can be obtained as well as eliminating the need of entering a previous input retrieval condition again.

Each of the retrieval processes of FIG. 29B shown on display 2 is indicated by icons. The display can return to the retrieval condition and retrieval result of an appropriate time by clicking an appropriate icon.

Figure 30:
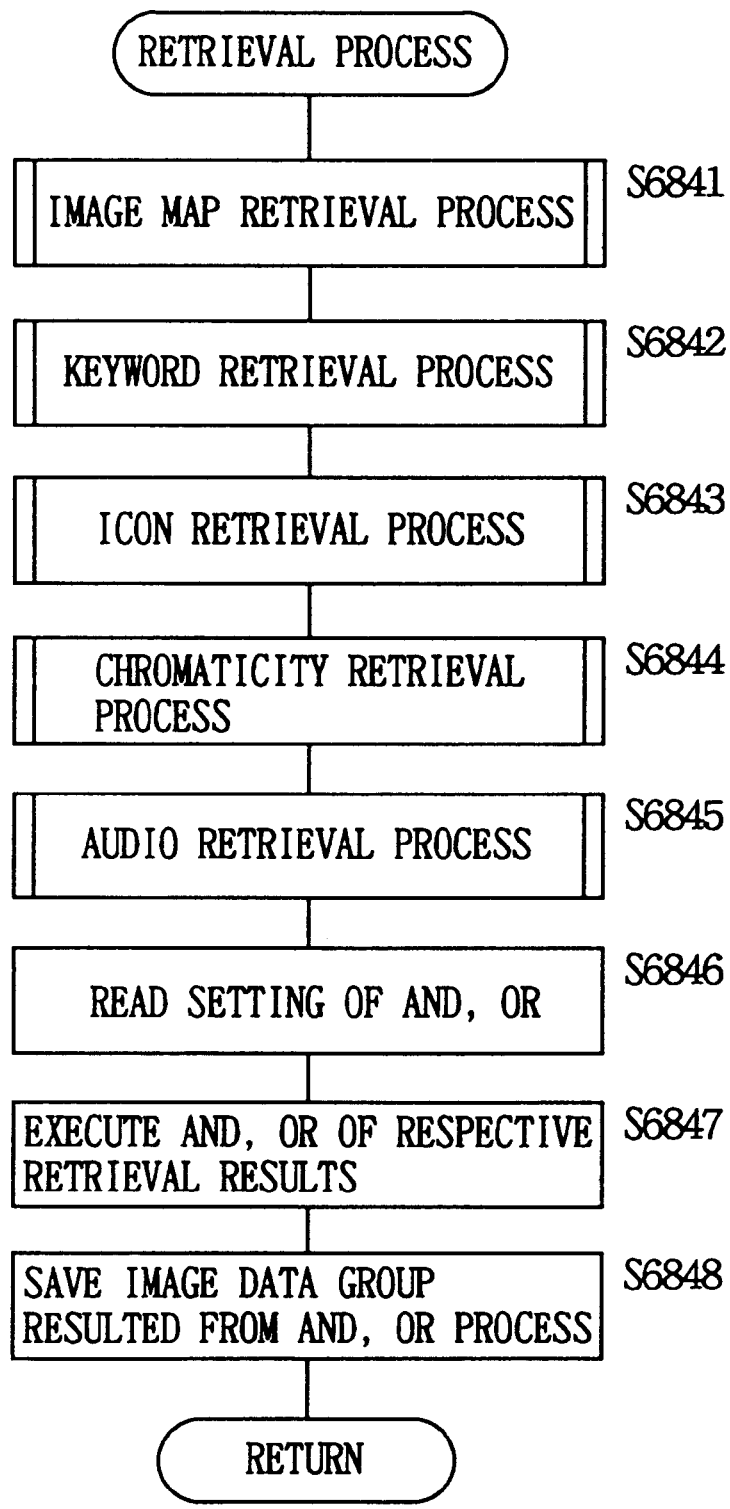
FIG. 30 is a flow chart showing in detail the retrieval process of FIGS. 29A and 29B.

FIG. 30 is a flow chart showing the details of the retrieval process of FIG. 29A. First, an image map retrieval process is carried out (S6841). Then, a keyword retrieval process (S6842), an icon retrieval process (S6843), a chromaticity retrieval process (S6844), and an audio retrieval process (S6845) are carried out. Then, the setting for an AND or OR process is read in (S6846) of the image data group extracted by the retrieval processes of S6841–S6845. An AND or OR process is carried out on the extracted image data group (S6847). Then, the image data group is saved (S6848), and the program proceeds to RETURN.

Figure 31:
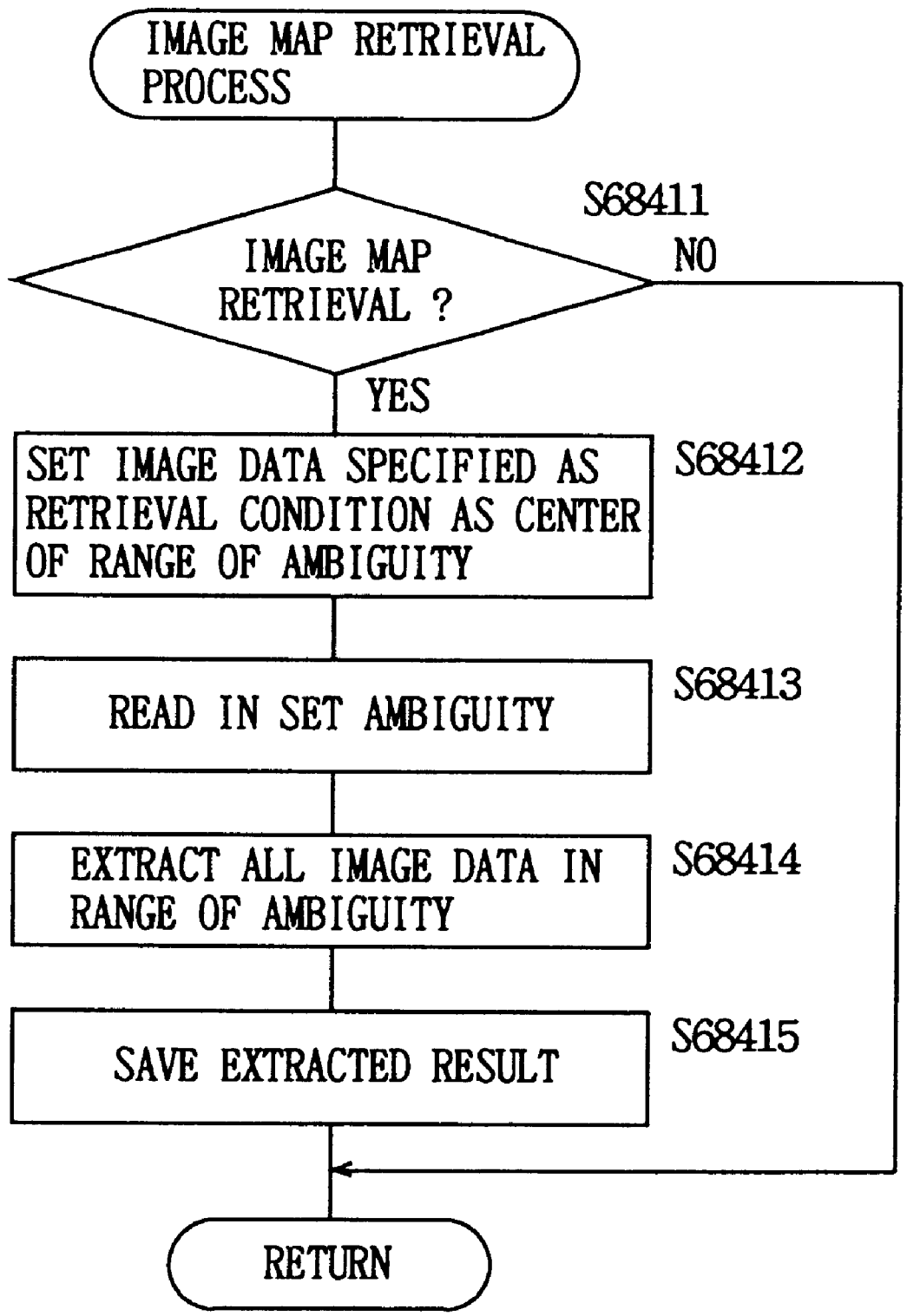
FIG. 31 is a flow chart showing in detail the image map retrieval process of FIG. 30.

FIG. 31 is a flow chart showing the details of the image map retrieval process of FIG. 30. First, determination is made whether image data which is to be the center of the range of ambiguity on the image map is specified as a retrieval condition (S68411). If specified, the image data is set as the center of the range of ambiguity (S68412). If not specified, the program proceeds to RETURN. Then, the set ambiguity is read in (S68413), and all the image data on the image map that is within the range of ambiguity are extracted (S68414). The extracted image data group is saved (S68415), and the program proceeds to RETURN.

Figure 32:
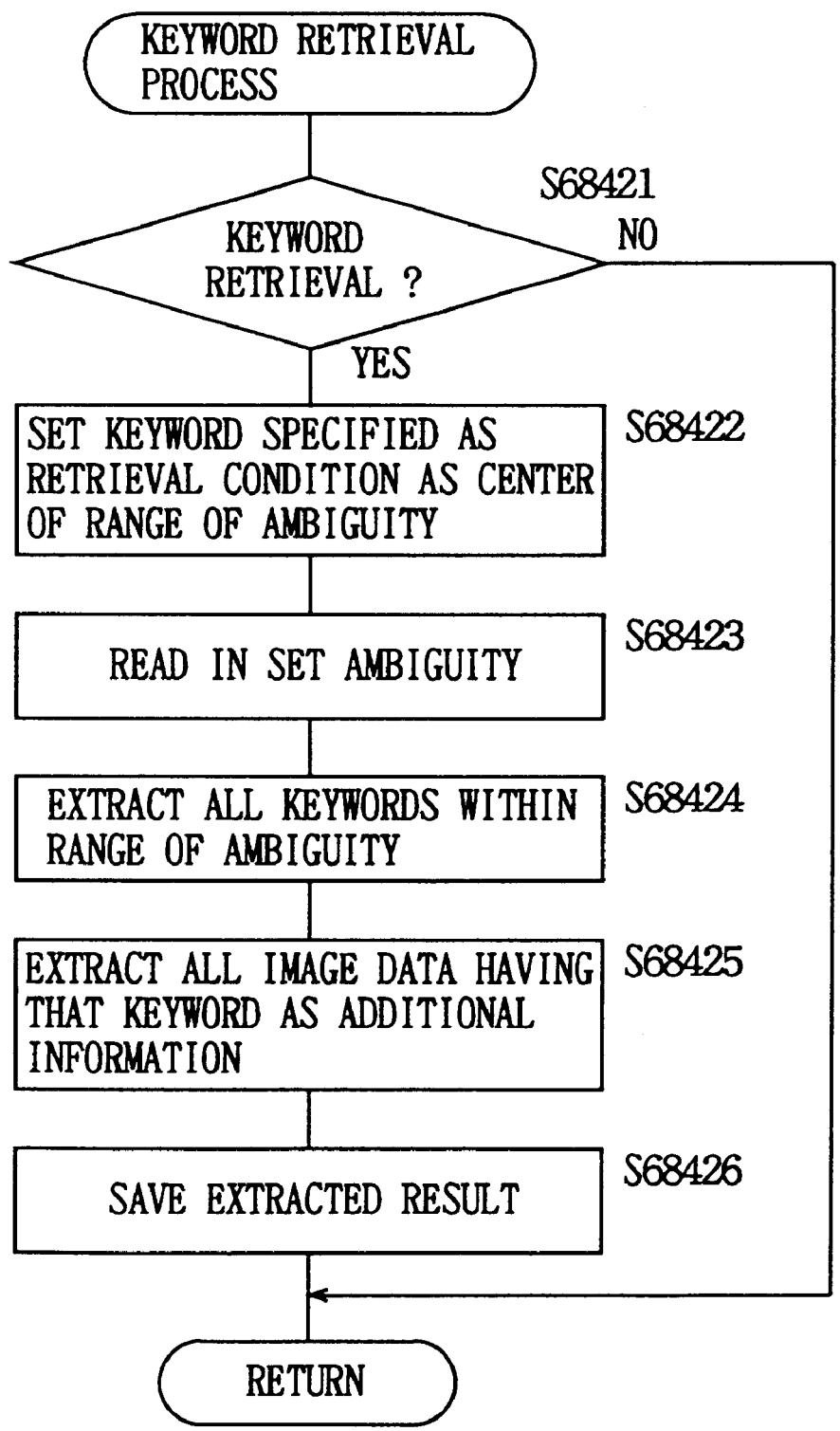
FIG. 32 is a flow chart showing in detail a keyword retrieval process of FIG. 30.

FIG. 32 is a flow chart showing the details of the keyword retrieval process of FIG. 3. First, determination is made whether a keyword that is to be the center of the range of ambiguity on a keyword map is specified as a retrieval condition (S68421). If specified, that keyword is set as the center of the range of ambiguity (S68422). If not specified, the program proceeds to RETURN. The set ambiguity is read in (S68423), and all the keywords on the keyword map that are within the range of ambiguity are extracted (S68424). Image data corresponding to any one of all the keywords are extracted, i.e. image data having a relevant keyword as additional information is extracted (S68425). The extracted image data group is saved (S68426), and the program proceeds to RETURN.

Figure 33:
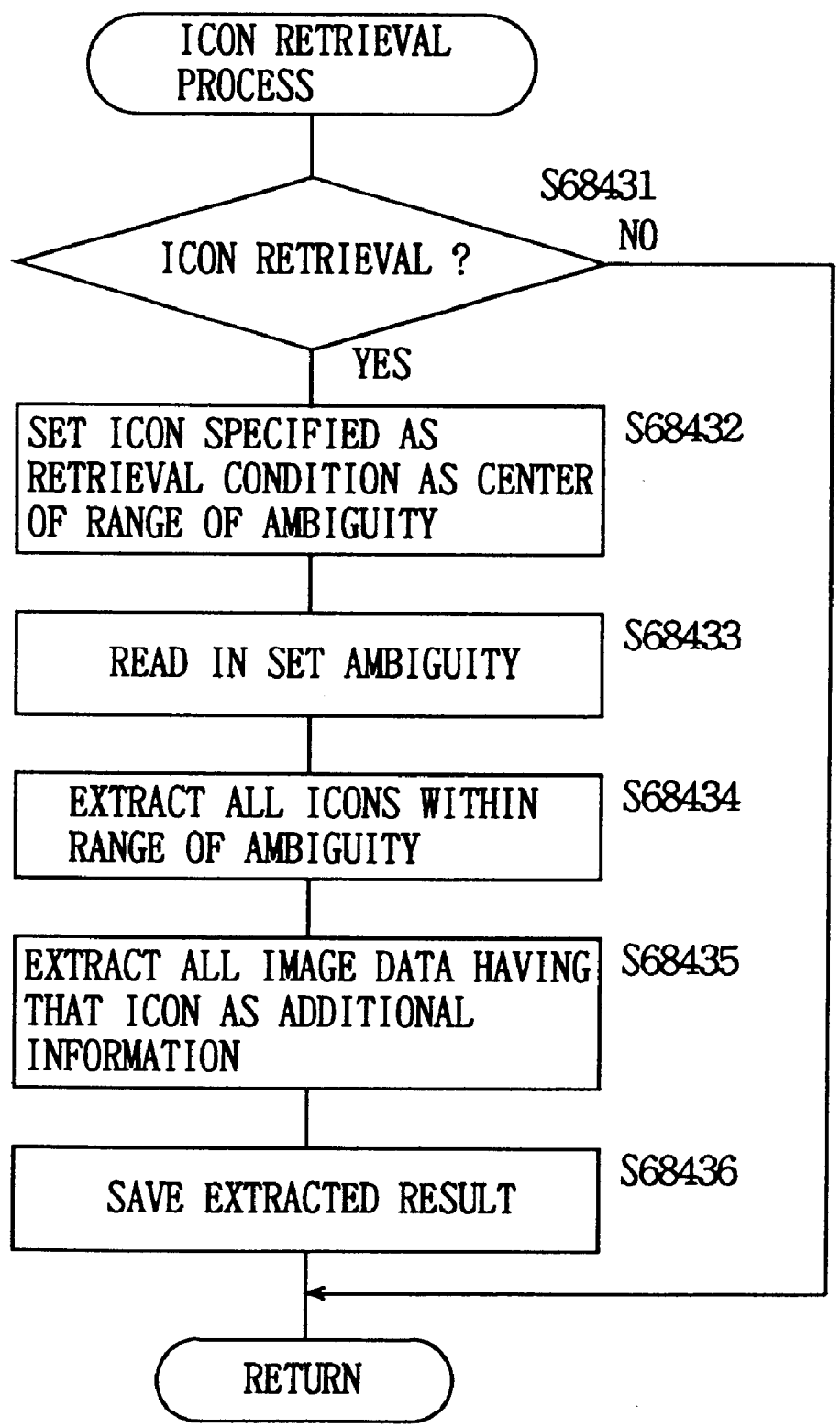
FIG. 33 is a flow chart showing in detail an icon retrieval process of FIG. 30.

FIG. 33 is a flow chart showing the details of the icon retrieval process of FIG. 30. First, determination is made whether an icon that is to be the center of the range of ambiguity on the icon map is specified as a retrieval condition (S68431). If specified, that icon is set as the center of the range of ambiguity (S68432). If not specified, the program proceeds to RETURN. The set ambiguity is read in (S68433), and all the icons on the icon map that are within the range of ambiguity are extracted (S68434). All the image data having an icon in the extracted icon as the additional information are extracted (S68435). Finally, the extracted image data group is saved (S68436), and the program proceeds to RETURN.

Figure 34:
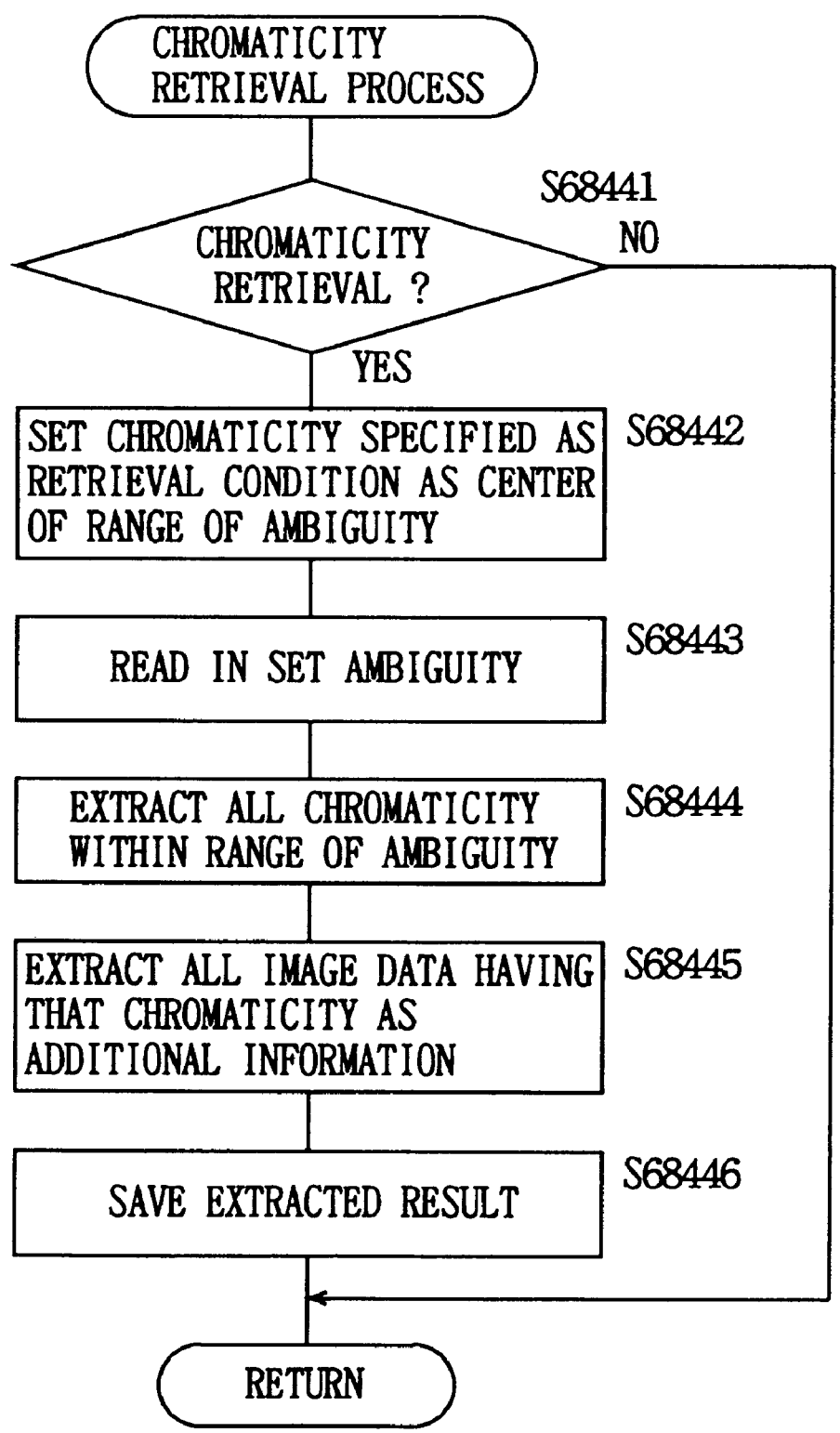
FIG. 34 is a flow chart showing in detail a chromaticity retrieval process of FIG. 30.

FIG. 34 is a flow chart showing the details of the chromaticity retrieval process of FIG. 30. First, determination is made whether the chromaticity that is to be the center of the range of ambiguity on the chromaticity map is specified as the retrieval condition (S68441). If specified, that chromaticity is set as the center of the range of chromaticity (S68442). If not specified, the program proceeds to RETURN. Then, the set ambiguity is read in (S68443), and all the chromaticity on the hue circle that are within the range of chromaticity are extracted (S68444). Image data that has any chromaticity out of the extracted chromaticity as additional information are extracted (S68445). The extracted image data group is saved (S68446), and the program proceeds to RETURN.

Figure 35:
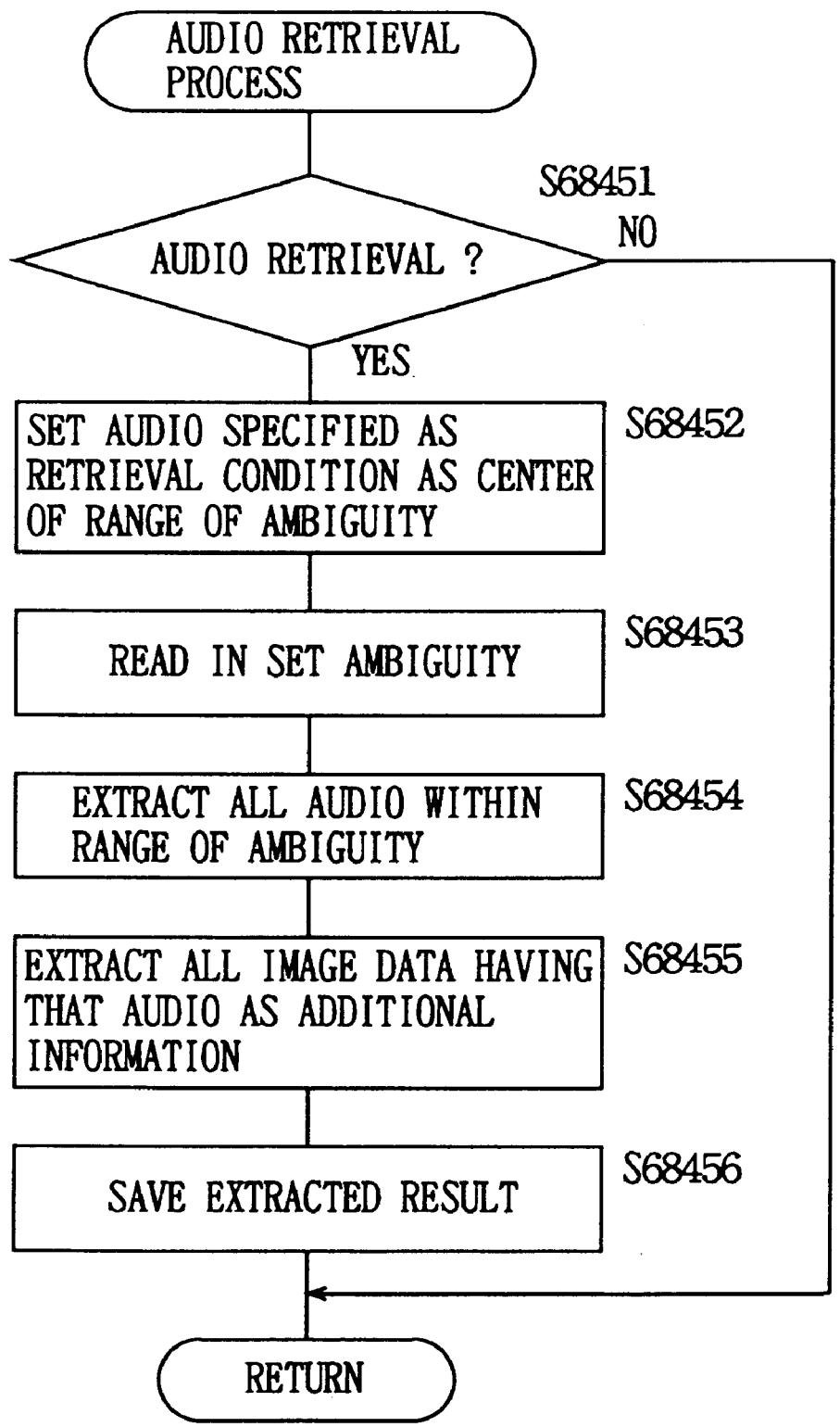
FIG. 35 is a flow chart showing in detail an audio retrieval process of FIG. 30.

FIG. 35 is a flow chart showing the details of the audio retrieval process of FIG. 30. First, determination is made whether the audio that is to be the center of the range of ambiguity on the audio map is set as a retrieval condition (S68451). If specified, that audio is set as the center of the range of ambiguity (S68452). If not specified, the program proceeds to RETURN. The set level of ambiguity is read in (S68453), and all the audio on the audio map that are within the range of ambiguity are extracted (S68454). All the image data having any audio out of the extracted audio as additional information are extracted (S68455). The extracted image data group is saved (S68456), and the program proceeds to RETURN.

Figure 36:
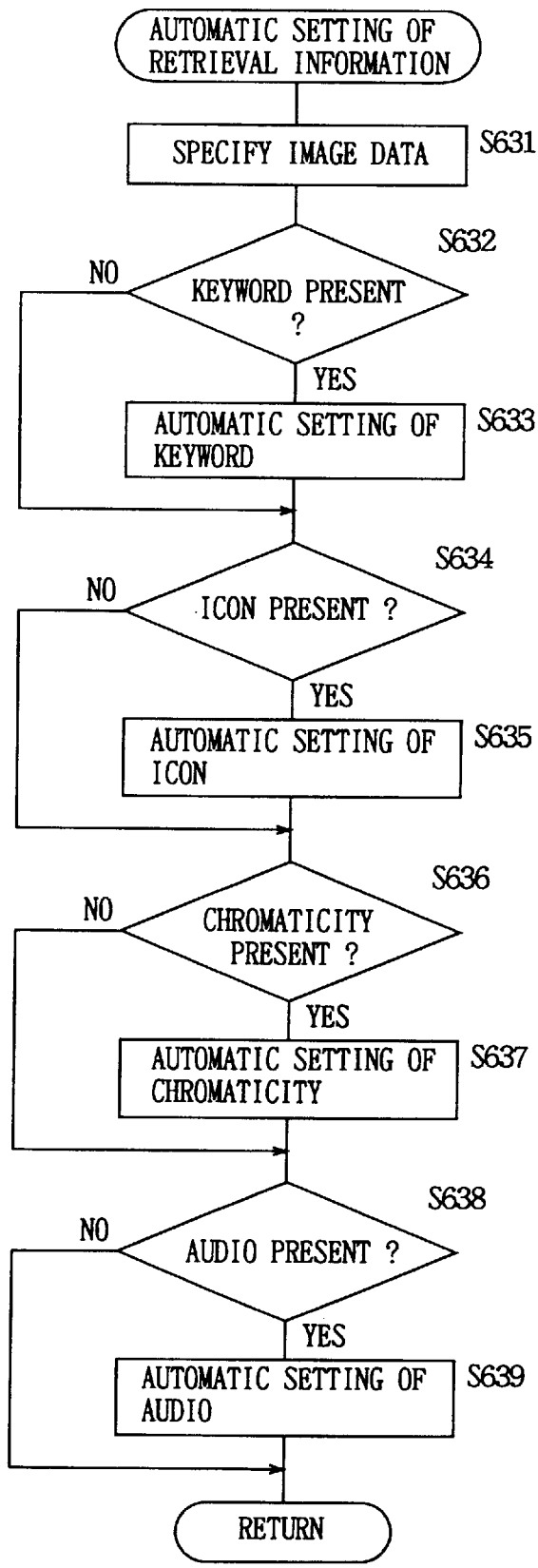
FIG. 36 is a flow chart showing an automatic set up process of retrieval information.

FIG. 36 is a flow chart showing the details of the automatic setting process of retrieval information in FIG. 27. First, image data which becomes the basis of retrieval is specified (S631). The position on the image map of that image data becomes the center of the range when the ambiguity is set. Specification of image data can be carried out by selecting an appropriate image data from the list or selecting an image of the image data on the display. Following specification of image data, detection is made whether that image data includes a keyword as additional information (S632). If that image data includes a keyword (YES at S632), that keyword is automatically set as retrieval information (S633). Then, detection is made whether that image data has an icon as additional information (S634). If the image data has an icon (YES at S634), that icon is automatically set as the retrieval information (S635). Then, detection is made whether that image data includes chromaticity as additional information (S636). If YES at S636, that chromaticity is automatically set as the retrieval information (S637). Then, detection is made whether that image data has audio as additional information (S638). If YES at S638, that audio is automatically set as the retrieval information (S639). When the image data has a plurality of additional information, all are set as retrieval information. When the automatic setting of retrieval information is completed, the program proceeds to RETURN.

Figure 37:
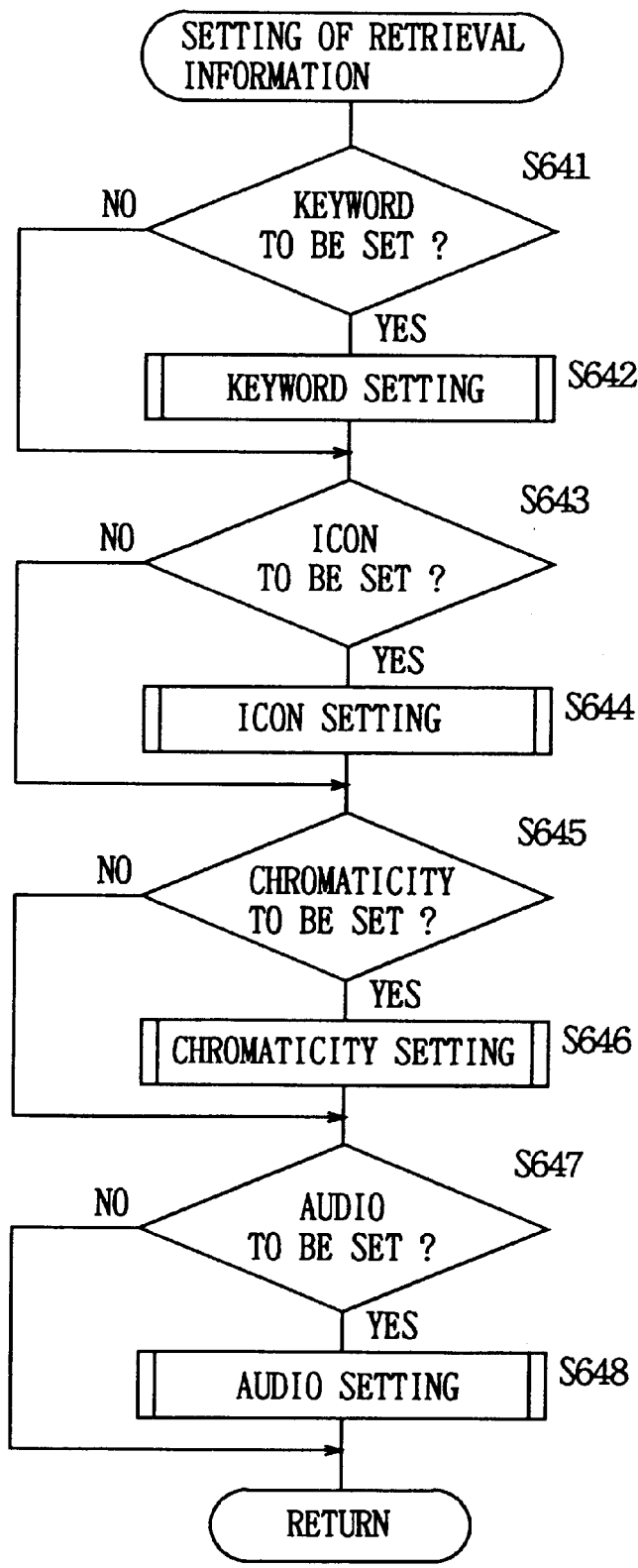
FIG. 37 is a flow chart showing a set up process of retrieval information.

FIG. 37 is a flow chart showing the details of the setting process of retrieval information of FIG. 27. First, determination is made whether a keyword is to be set as the retrieval information (S641). When a keyword is to be set (YES at S641), a keyword setting process is carried out (S642). Then, determination is made whether an icon is set as retrieval information (S643). If YES, an icon setting process is carried out (S644). Then, determination is made whether chromaticity is to be set as retrieval information (S645). If YES, a chromaticity setting process is carried out (S646). Then, determination is made whether audio is to be set as retrieval information (S647). If YES, an audio setting process is carried out (S648). When a retrieval key is already set according to automatic setting or the like in the setting stage of the above-described retrieval information, resetting of the retrieval information is effected. Following completion of a retrieval information setting, the program proceeds to RETURN.

Figure 38:
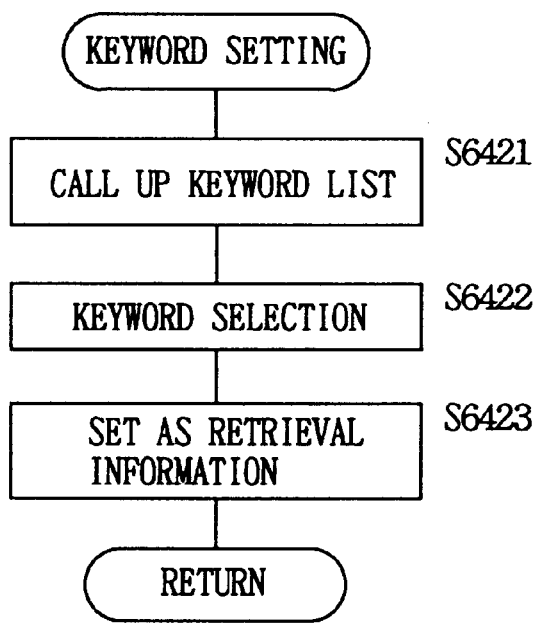
FIG. 38 is a flow chart showing a keyword set up process.

FIG. 38 is a flow chart showing the details of the keyword setting process of FIG. 37. First, a keyword list is called up (S6421). Then, one or a plurality of keywords are selected from the keyword list (S6422). The selected keyword is set as retrieval information (S6423). Following completion of the setting, the program proceeds to RETURN.

Figure 39:
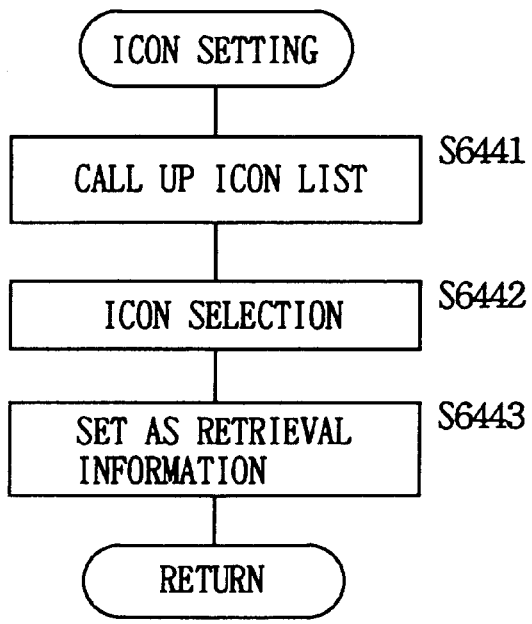
FIG. 39 is a flow chart showing an icon set up process.

FIG. 39 is a flow chart showing the details of the icon setting process of FIG. 37. First, an icon list is called up (S6441). Then, one or a plurality of keywords are selected from the icon list (S6442). The selected icon is set as the retrieval information (S6443). When the setting is completed, the program proceeds to RETURN.

Figure 40:
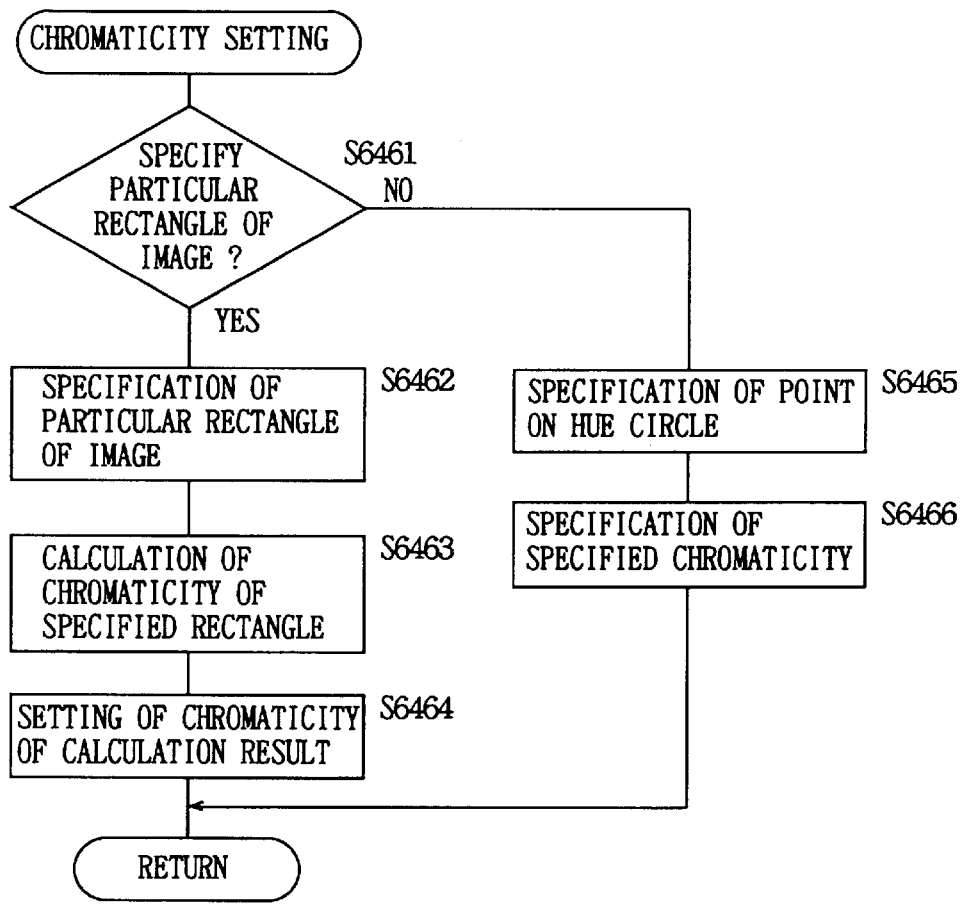
FIG. 40 is a flow chart showing a chromaticity set up process.

FIG. 40 is a flow chart showing the details of the chromaticity setting process of FIG. 37. First, determination is made whether a particular rectangle is to be specified in the image of the image data (S6461). When a particular rectangle is specified (YES at S6461), the chromaticity of the specified rectangle is calculated (S6462, S6463). This calculation of chromaticity can be carried out by weighted average of color for each bit in the rectangle, or the most frequently used color can be taken. The obtained chromaticity as a result of the calculation is set as the retrieval information (S6464). When a particular rectangle is not specified (NO at S6461), a particular point on the hue circle is specified (S6465). The specified chromaticity is set as the retrieval information (S6466). Following completion of the setting, the program proceeds to RETURN.

Figure 41:
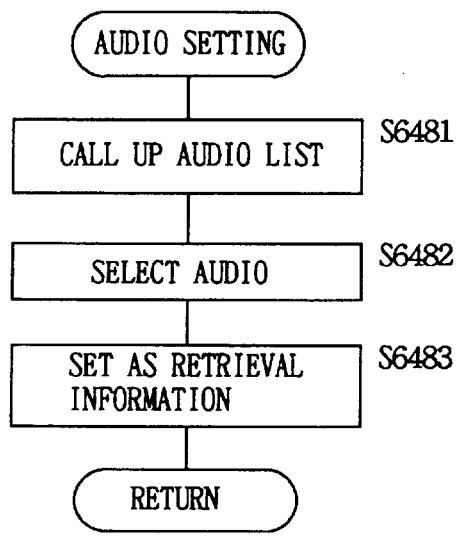
FIG. 41 is a flow chart showing an audio set up process.

FIG. 41 is a flow chart showing the details of the audio setting process of FIG. 37. First, an audio list is called up (S6481). Then, one or a plurality of keywords are selected from the audio list (S6482). The selected audio is-set as the retrieval information (S6483). When the setting is completed, the program proceeds to RETURN.

Figure 42:
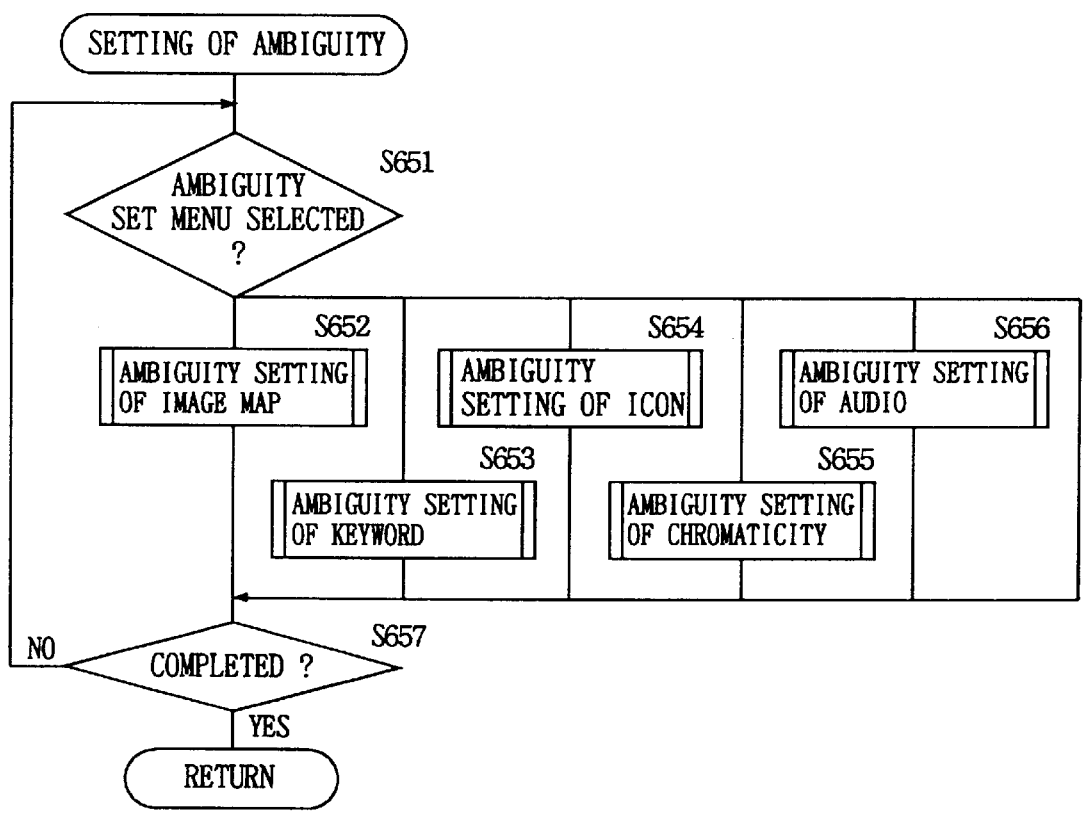
FIG. 42 is a flow chart showing a set up process of ambiguity.

FIG. 42 is a flow chart showing the details of the chromaticity setting process of FIG. 27. First, determination is made whether a chromaticity setting menu is selected or not (S651). Respective setting processes (S652–S656) are carried out according to the determination result. Following the setting process, and if the setting of chromaticity is to be completed (YES at S657), the program proceeds to RETURN. IF NO at S657, the program returns to the process of S651 to repeat the process.

Figure 43:
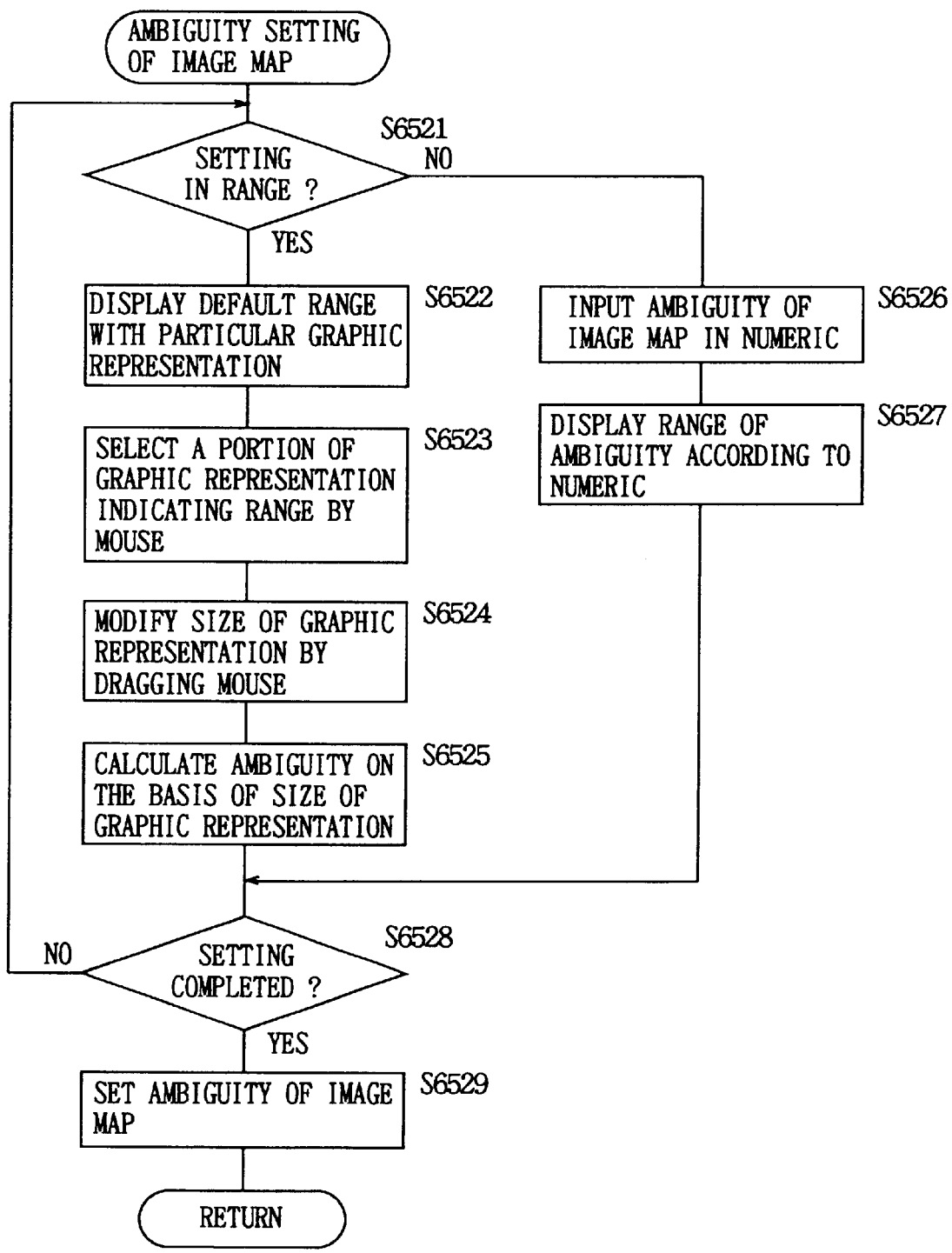
FIG. 43 is a flow chart showing an ambiguity set up process of an image map.

FIG. 43 is a flow chart showing the details of the chromaticity setting process of an image map of FIG. 42. First, determination is made whether the level of chromaticity of the image map is to be set in a range or in a numeric value (S6521). When chromaticity is set by a range (YES at S5651), a graphic representation such as a circle is displayed centered about the image of the image data which becomes the basis of retrieval on the image map to show the range of retrieval (S6522). The position of the graphic representation is selected via a mouse (S6523). The size of the graphic representation is modified by dragging the mouse (S6524). The level of ambiguity is calculated on the basis of the size of the graphic representation (S6525).

When the range is set in numerics (NO at S6521), a numeric value of the level of chromaticity is input (S6526). A graphic representation such as a circle representing the range of chromaticity according to the numeric value is displayed (S6527). This allows confirmation of the range of ambiguity of the input numeric.

Then, determination is made whether the setting of ambiguity is to be ended or not (S6528). If NO at S6528, the program returns to S6521 to continue the process. If YES at S6528, the value obtained at S6525, or the value input at S6526, is set as the level of ambiguity of the image map (S6529). Then, the program proceeds to RETURN.

Figure 44:
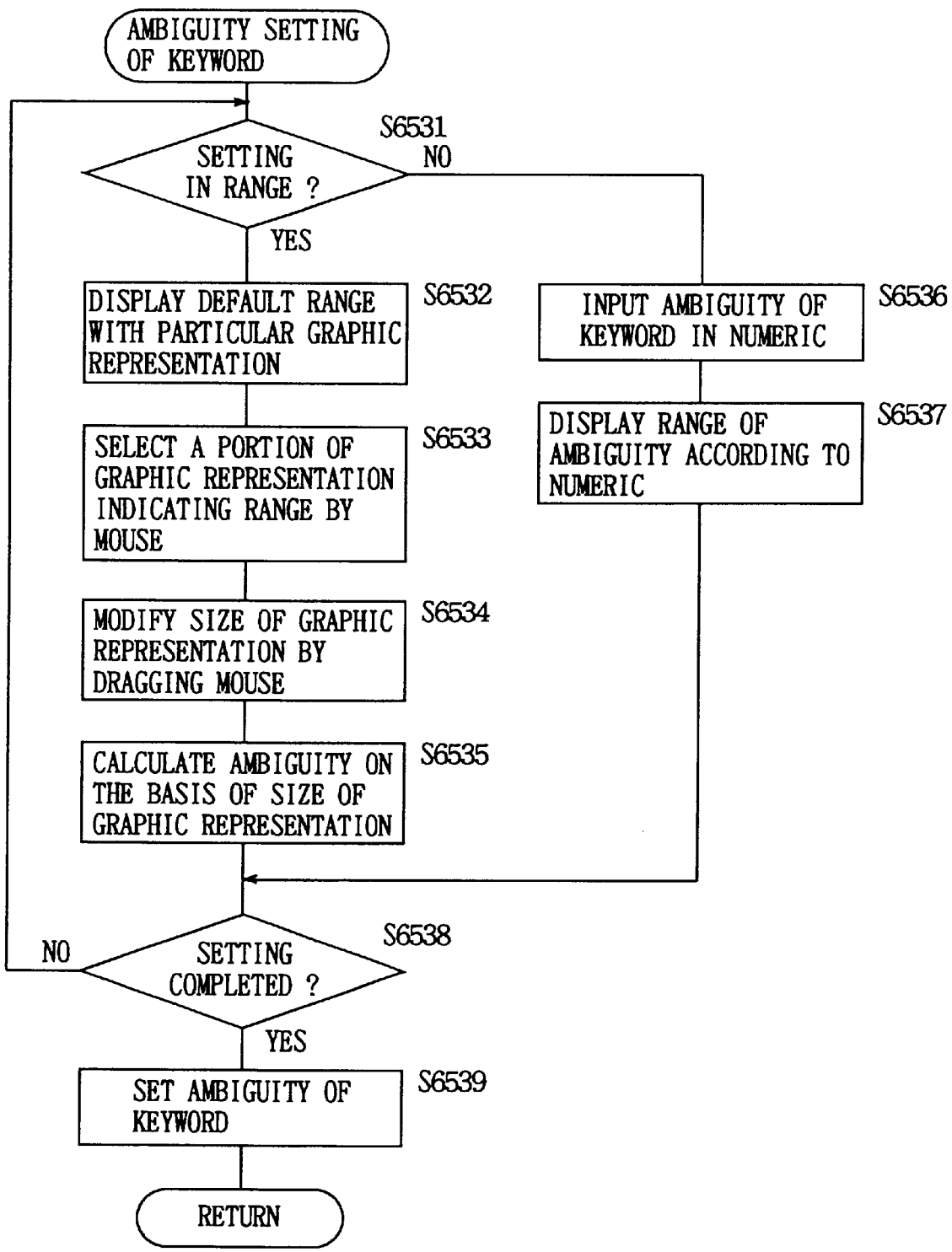
FIG. 44 is a flow chart showing an ambiguity set up process of a keyword.

FIG. 44 is a flow chart showing the details of the keyword ambiguity setting process of FIG. 42. First, determination is made whether the keyword ambiguity is to be set in a range or in a numeric value (S6531). When the keyword ambiguity is to be specified by a range (YES at S6531), a graphic representation such as a circle is displayed centered about the keyword which becomes the basis of the retrieval on the keyword map to indicate the range of retrieval (S6532). A portion of the graphic representation is selected by a mouse (S6533), and the size of the graphic representation is modified by dragging the mouse (S6534). The level of ambiguity is calculated on the basis of the size of the graphic representation (S6535).

When the key ambiguity is to be set in numeric values (NO at S6531), a numeric value of the ambiguity is input (S6536). A graphic representation such as a circle indicating the range of ambiguity according to the input numeric is displayed (S6537). Then, determination is made whether the ambiguity setting process is to be ended or not (S6538). When the ambiguity setting is not completed (NO at S6538), the program returns to S6531 to continue the process. When YES at S6538, the value obtained at S6535, or the value input at S6536, is set as the keyword ambiguity level (S6539).

Figure 45:
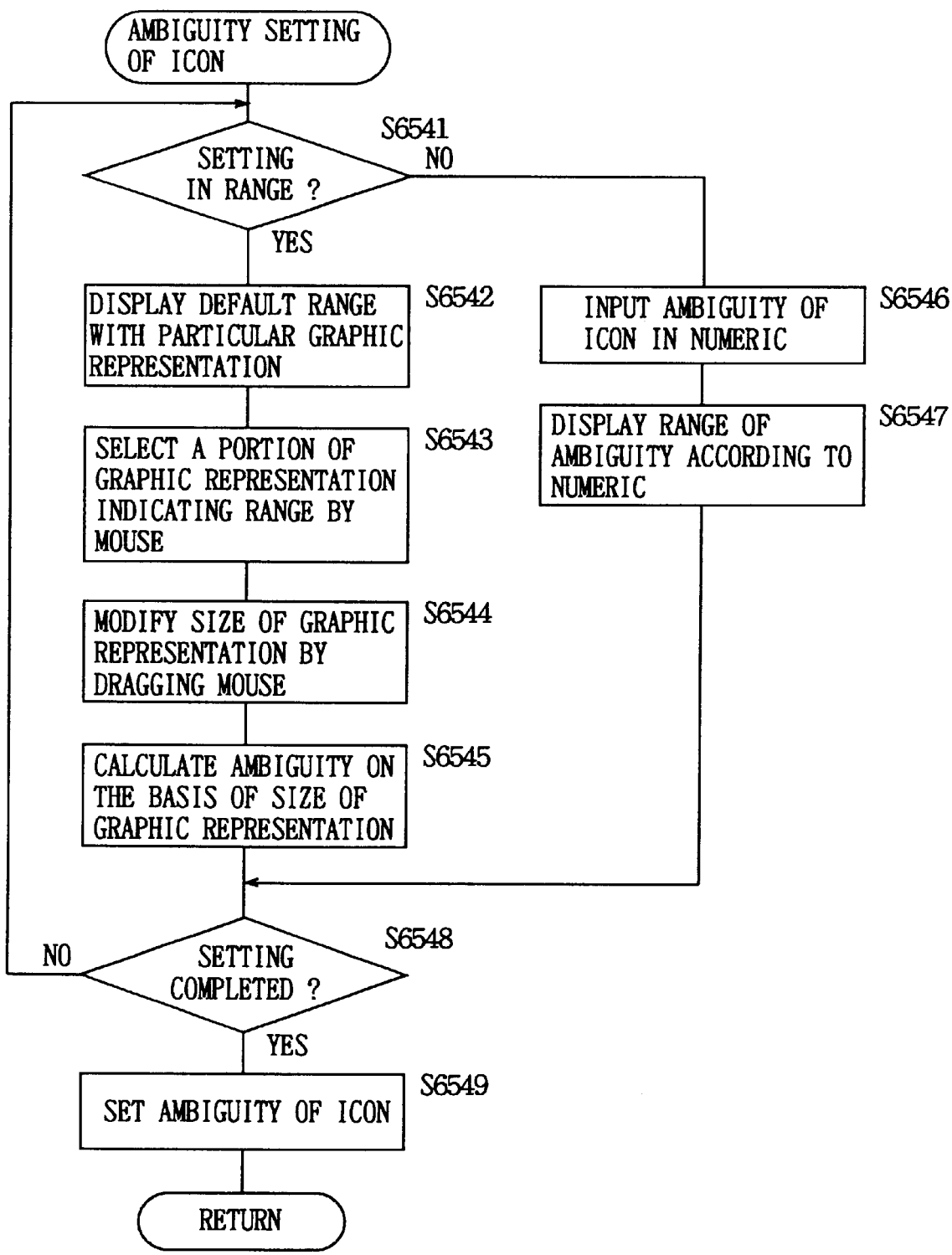
FIG. 45 is a flow chart showing an ambiguity set up process of an icon.

FIG. 45 is a flow chart showing the details of the icon and ambiguity setting process of FIG. 42. First, determination is made whether the icon ambiguity is to be set in a range or in a numeric value (S6541). If the ambiguity is to be set by a range (YES in S6541), a graphic representation such as a circle is displayed centered about the icon that becomes the basis of the retrieval on the icon map to indicate the range of retrieval (S6542). A portion of that graphic representation is selected by a mouse (S6543), and the size of the graphic representation is modified by dragging the mouse (S6544). The level of ambiguity is calculated on the basis of the size of the graphic representation (S6545).

When the icon ambiguity is to be set in numeric (NO at S6541), the level of ambiguity is input by a numeric value (S6546). A graphic representation such as a circle representing the range of ambiguity according to the input numeric is displayed (S6547). Then, determination is made whether the ambiguity setting is completed or not (S6548). When NO at S6548, the program returns to S6541 to continue the process. If YES at S6548, the value obtained at S6545, or the value input at S6546 is set as the level of ambiguity of the icon (S6549).

Figure 46:
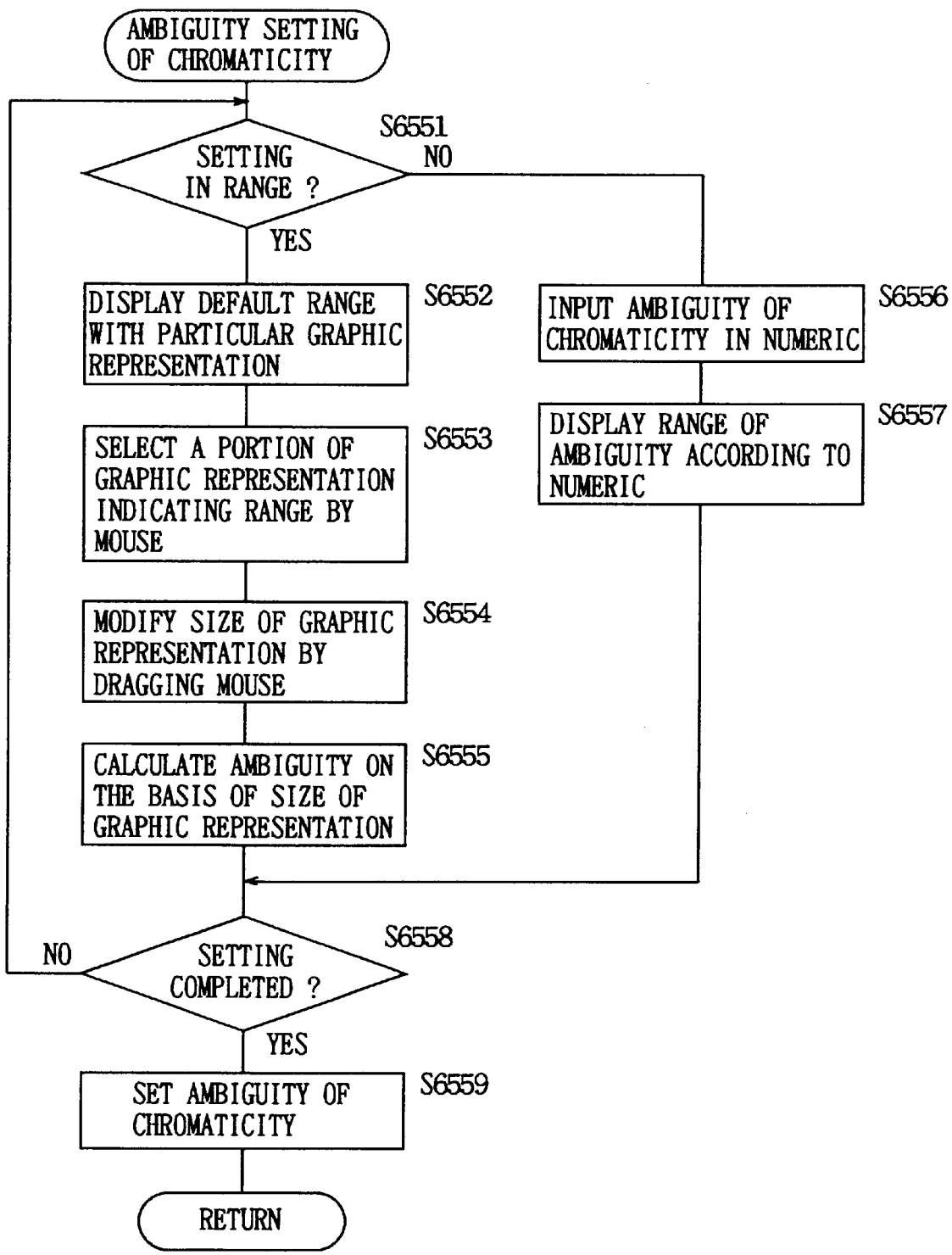
FIG. 46 is a flow chart of an ambiguity set up process of chromaticity.

FIG. 46 is a flow chart showing details of the chromaticity ambiguousness setting process of FIG. 42. First, determination is made whether the chromaticity ambiguity is set in a range or in a numeric value (S6551). When the chromaticity ambiguity is set in a range (YES at S6551), a graphic representation such as a circle is displayed centered about the chromaticity which becomes the basis of the retrieval on the hue circle to indicate the range of retrieval (S6552). A portion of the graphic representation is selected via a mouse (S6553), and the size of the graphic representation is modified by dragging the mouse (S6554). The level of ambiguity is calculated on the basis of the size of the graphic representation (S6555).

When the chromaticity ambiguity is to be set by a numeric (NO at S6551), a numeric value is input (S6556). A graphic representation such as a circle representing the range of ambiguity according to the numeric value is displayed (S6557). Then, determination is made whether the ambiguity setting process is completed or not (S6558). If NO at S6558, the program returns to S6551 to continue the process. When the setting is to be completed, the value obtained at S655, or the value input at S6556 is set as the ambiguity of chromaticity (S6559).

Figure 47:
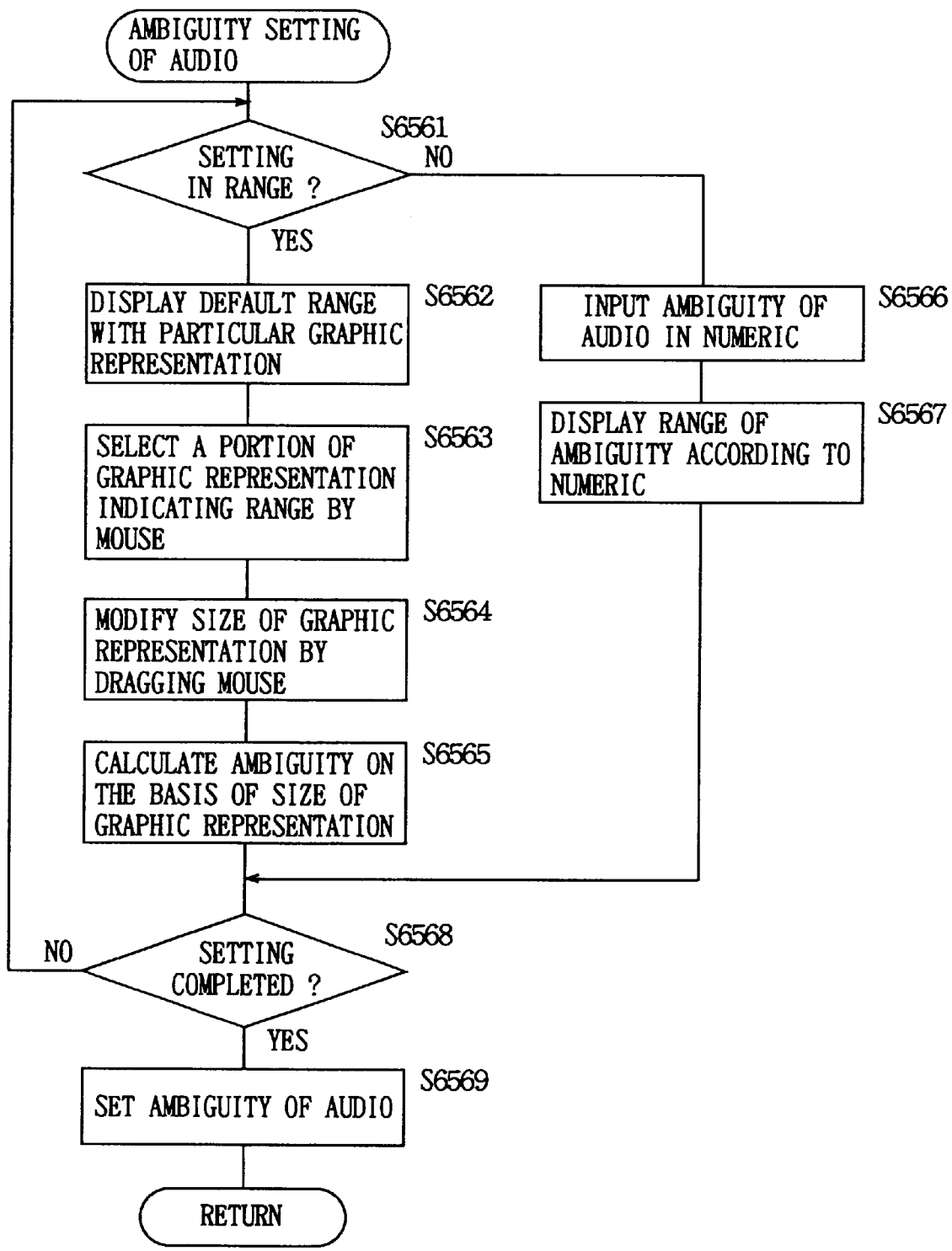
FIG. 47 is a flow chart showing an ambiguity set up process of audio.

FIG. 47 is a flow chart showing the details of the audio ambiguity setting process of FIG. 42. First, determination is made whether the level of ambiguity of audio is to be set in a range or in a numeric value (S6561). When the audio ambiguity is to be in a range (YES at S6561), a graphic representation such as a circle is displayed centered about the audio that becomes the basis of retrieval on the audio map to indicate the range of retrieval (S6562). A portion of the graphic representation is selected via a mouse (S6563), and the size of the graphic representation is modified by dragging the mouse (S6564). The level of ambiguity is calculated based on the size of the graphic representation (S6565).

When the audio ambiguity is to be set by a numeric (NO at S6561), a numeric value of the ambiguity is input (S6566). A graphic representation such as a circle representing the range of ambiguity according to the input numeric value is displayed (S6567). Then, determination is made whether setting is completed or not (S6568). When the setting is not yet completed (NO at S6568), the program returns to S6561 to continue the process. If YES at S6568, the value obtained at S6565 or the value input at S6566 is set as the level of ambiguity of audio (S6569).

The graphic representation for displaying the level of ambiguity is not limited to a circle, and may be other graphic representations such as a rectangle.

Since retrieval of image data is enabled by setting the level of ambiguity for each additional information, retrieval is possible by virtue of the association with an ambiguous image even when the object of search is not definite. This association with an ambiguous image allows retrieval beyond one's imagination since stimulus of conception can be obtained even when the object of search is not determined. Furthermore, setting the level of ambiguity provides margin in the retrieval condition to allow data retrieval of various levels of correlation.

Figure 48:
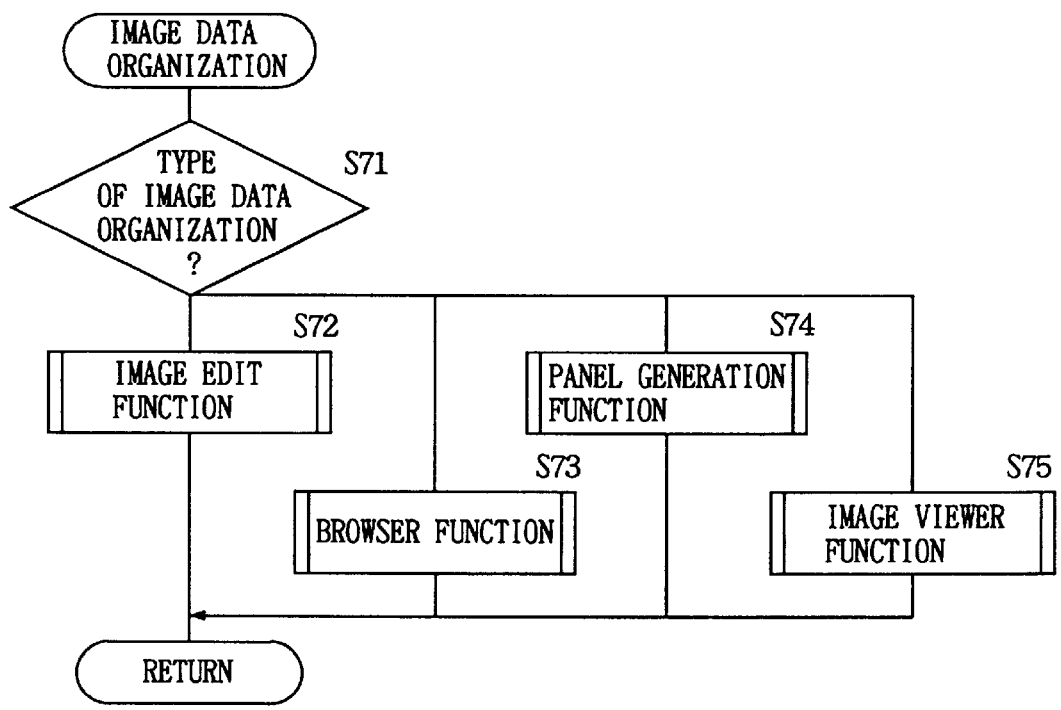
FIG. 48 is a flow chart showing an image data organization process.

FIG. 48 is a flow chart showing the details of the image data organization process (S7) of FIG. 3. The image organization includes various functions such as image editing, browser, panel generation, and image viewer. First, the type of image data organization is selected (S71). The process proceeds according to the selected type. The process proceeds to S72 in the case of image edit function, to S73 in the case of a browsing function, to S74 in the case of a panel generation function, and to S75 in the case of an image viewer function. Each process will be described afterwards.

Figure 49:
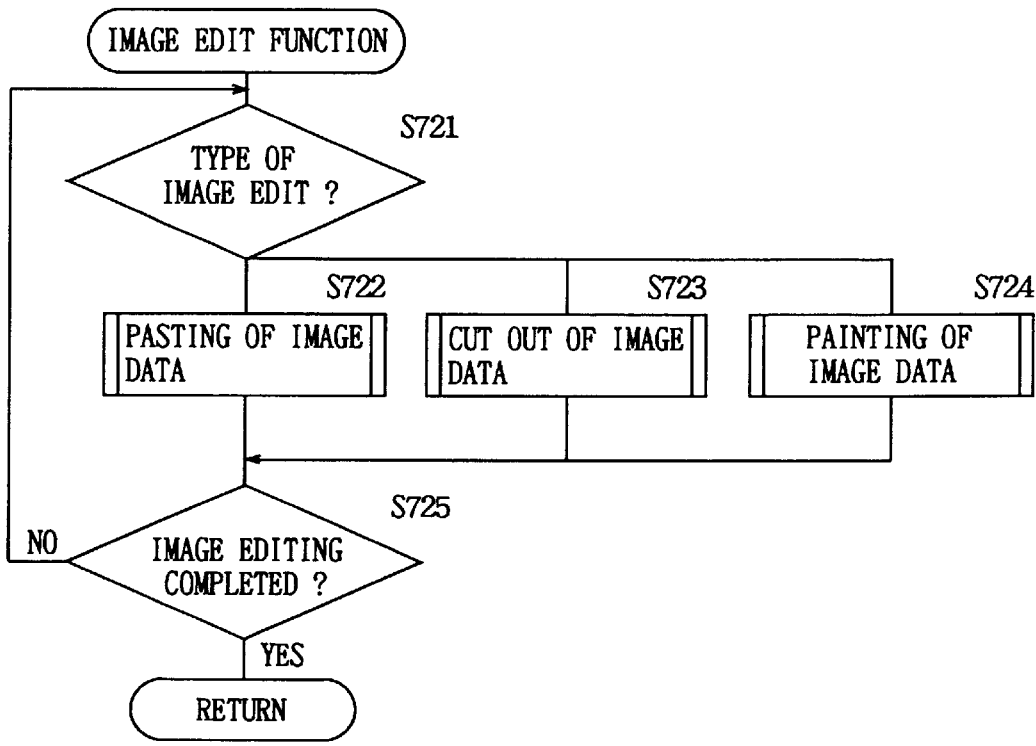
FIG. 49 is a flow chart showing an image edit function process.

FIG. 49 is a flow chart showing the details of the image edit function (S72) of FIG. 48. Image editing is the function to carry out image data pasting, cut out, and painting (drawing). The type of image editing is selected (S721). The process proceeds to S722 in the case of image data pasting, to S723 in the case of image data cut out, and to S724 in the case of image data painting. The details will be described afterwards. Then, determination is made whether the image editing process is completed or not (S725). When IS at S725, the program proceeds to RETURN. If NO at S725, the process returns to the step of selecting the type of image edit at S721.

Figure 50:
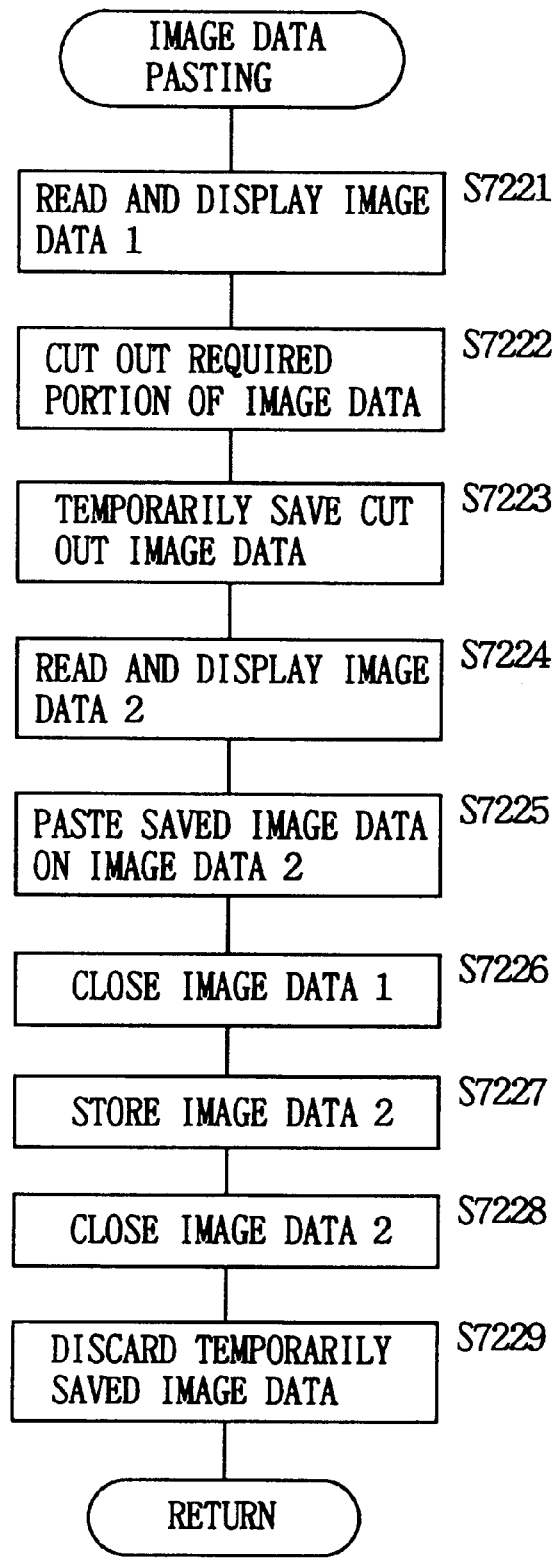
FIG. 50 is a flow chart showing a pasting process of image data.

FIG. 50 is a flow chart showing the details of a paste process (S722) of Pig. 49. Here, an example of pasting image data 1 on image data 2 will be described. First, image data 1 is read in and displayed on display 2 (S7221). A required portion of the image data is cut out (S7222). The cut out image data is temporarily saved (S7223). Next, image data 2 is read in and displayed on display 2 (S7224). The cut out image data that was temporarily saved is pasted on image data 2 (S7225). Then, image data 1 is closed (S7226), and image data 2 is saved (S7227), and closed (S7228). The temporarily saved image data 1 is discarded (S7229).

Figure 51:
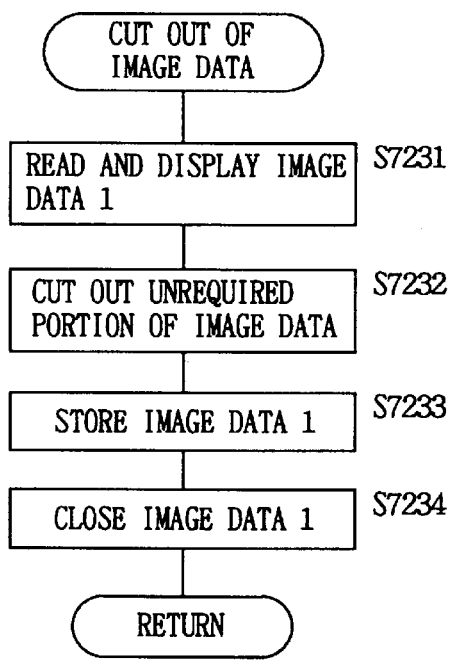
FIG. 51 is a flow chart showing a cut out process of image data.

FIG. 51 is a flow chart showing the details of the cut out process of image data (S723) of FIG. 49. Here, a process of cutting out an unrequired portion from image data 1 will be described. First, image data 1 is read in and displayed on display 2 (S7231). The unrequired portion of image data 1 is cut out (S7232). Image data 1 from which a portion was cut off is saved (S7233), and closed (S7234).

Figure 52:
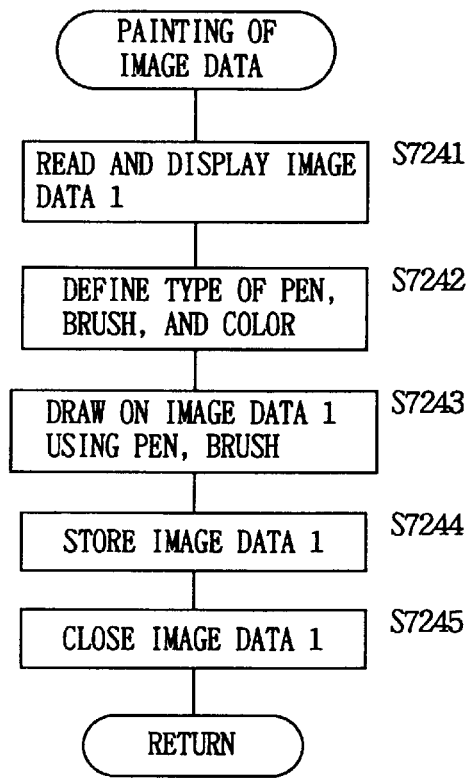
FIG. 52 is a flow chart showing a paint process of image data.

FIG. 52 is a flow chart of a paint process of image data (S724) of FIG. 49. First, image data 1 is read in and displayed on display 2 (S7241). The type used for painting such as a pen or brush is defined (S7242), and painting is provided on image data 1 using a pen or brush (S7243). Then, image data 1 is saved (S7244) and closed (S7245).

Figure 53:
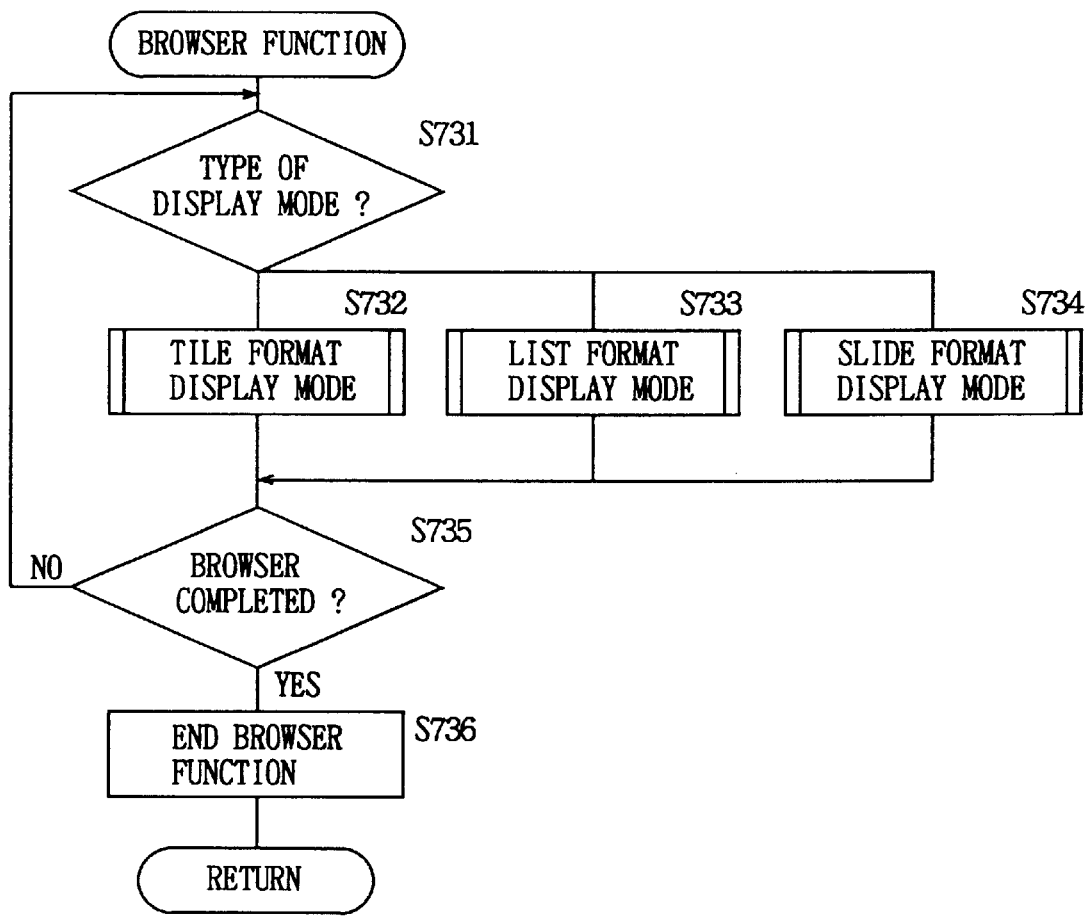
FIG. 53 is a flow chart showing a browser function process.

FIG. 53 is a flow chart showing the details of the process of a browser function (S73) of FIG. 48. A browser function is to scroll or browse through image data. First, a display mode is set (S731). The process proceeds to S732 in the case of a tile format display mode, to S733 in the case of a list format display mode, and to S734 in the case of a slide format display mode. Each of these processes will be described afterwards. Then, determination is made whether the browser function is to be ended (S735). If YES at S735, the browser function is completed (S737), otherwise proceeds to the display mode setting of S731.

Figure 54:
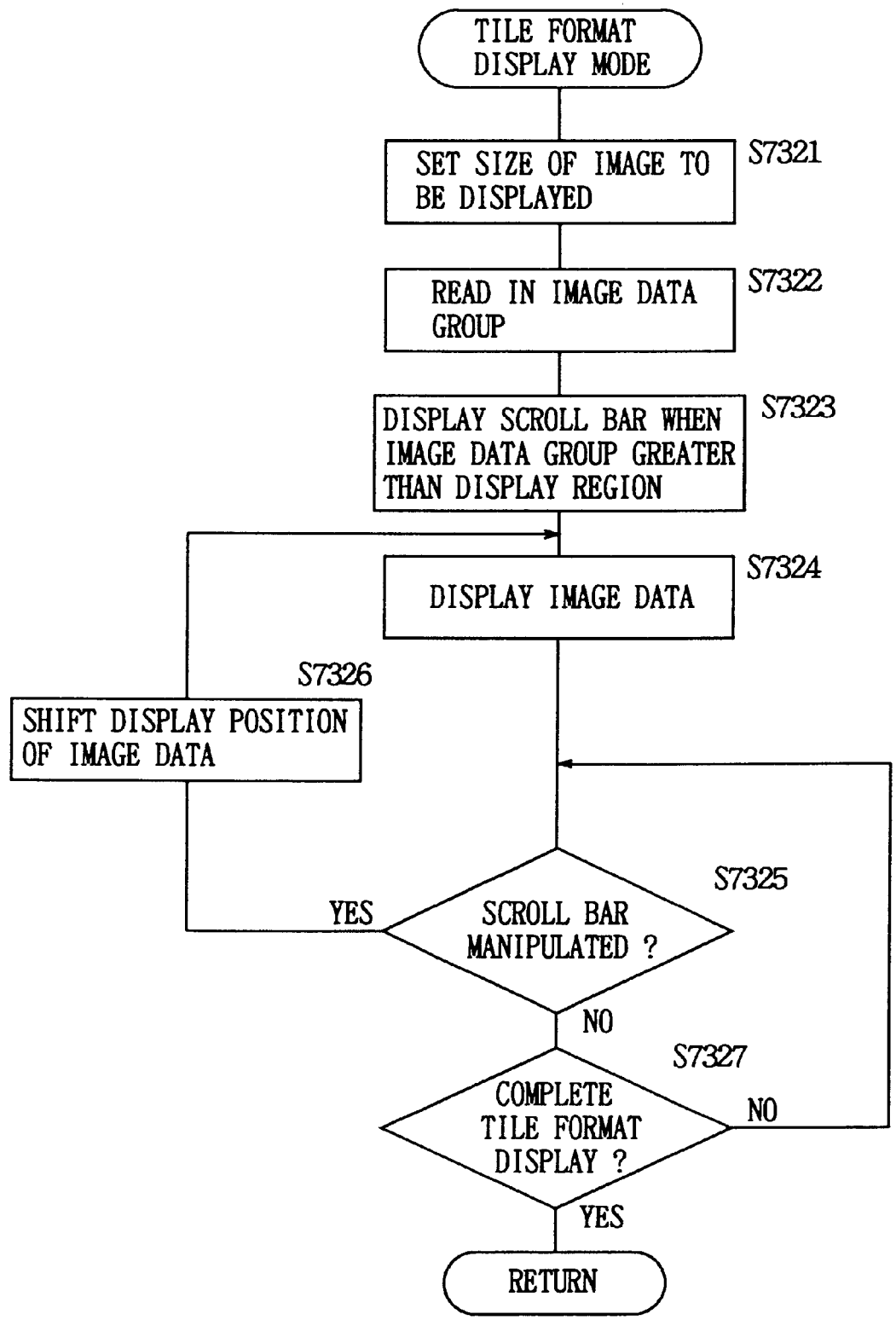
FIG. 54 is a flow chart showing a tile format display mode process.

FIG. 54 is a flow chart showing the details of a tile format display mode process (S732) of FIG. 53. In a tile format display mode, image data is provided in a tile format at a specified size, so that a plurality of image data can be viewed at a glance. In this mode, the size of the image to be displayed is set (S7321). The image display size includes two types, i.e. "80×60" pixels and "120×90" pixels. Then, the image data group is read in (S7322). When the image data group read in is greater than the display region, a scroll bar is displayed (S7323), and the image data display is provided (S7324). Then, determination is made whether the scroll bar is manipulated or not (S7325). When the scroll bar is not operated (NO at S7325), the program proceeds to S7327. When the scroll bar is operated (YES at S7325), the display position of the image data is shifted (S7326), and an image data display is provided (S7324). Finally, determination is made whether the tile format display is to be terminated or not (S7327). When the mode is to be terminated (YES at S7327), the program proceeds to RETURN, otherwise, proceeds to the determination of a scroll bar operation at S7325.

Figure 55:
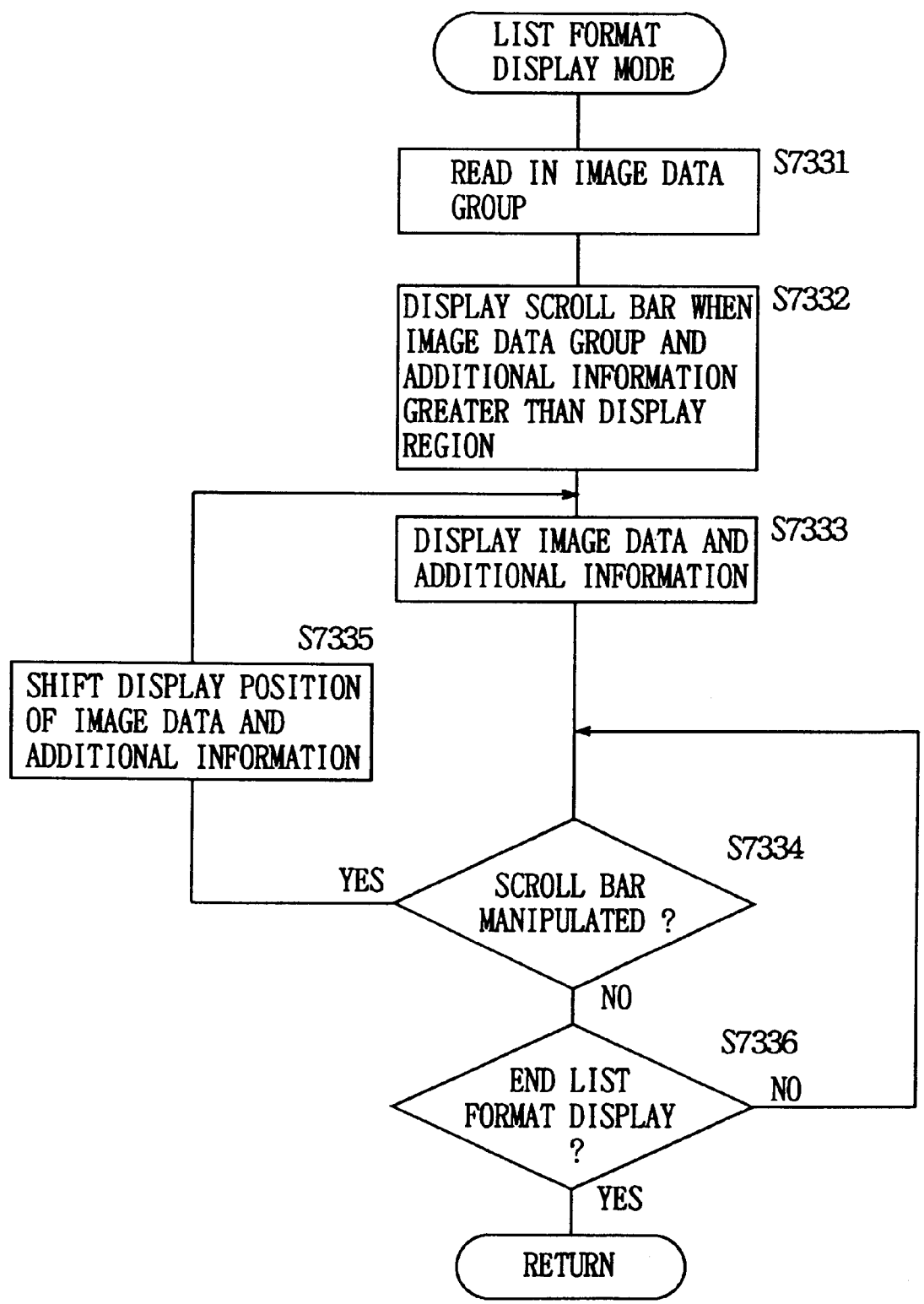
FIG. 55 is a flow chart showing a list format display mode process.

FIG. 55 is a flow chart showing the details of a list format display mode process (S733) of FIG. 53. In a list format display mode, image data together with additional information are provided. First, an image data group is read in (S7331). When the image data group read in is greater than the display region, a scroll bar is displayed (S7332), and image data and additional information are displayed (S7333). Then, determination is made whether the scroll bar is manipulated or not (S7334). When a scroll bar is not operated (NO at S7334), the process proceeds to S7336. When a scroll bar is operated (YES at S7334), the display position of the image data and additional information is shifted (S7335), and then displayed (S7333). Finally, determination is made whether the list format display is to be terminated or not (S7336). If YES at S7336, the program proceeds to RETURN, otherwise proceeds to the determination of the scroll bar operation at S7334.

Figure 56:
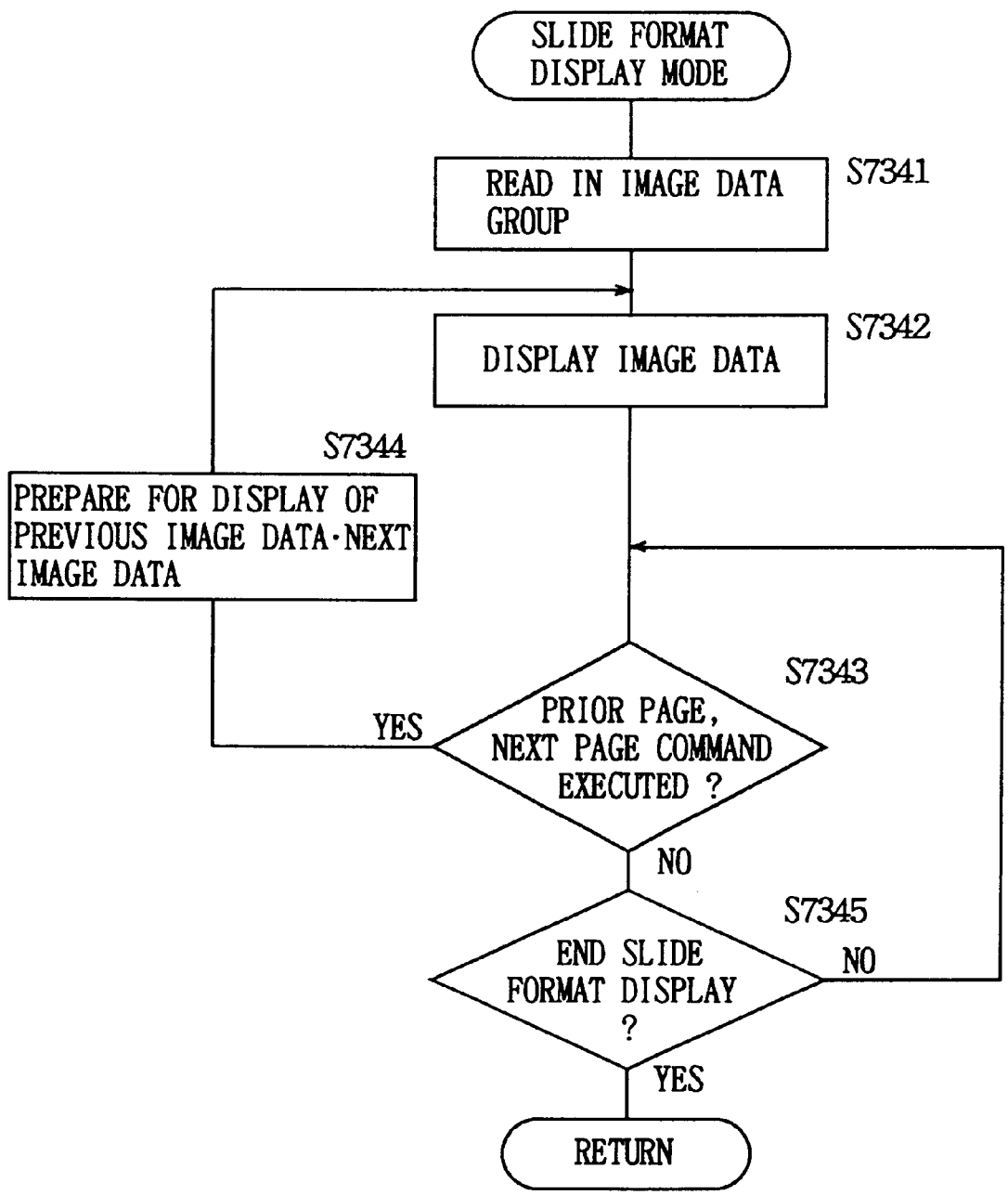
FIG. 56 is a flow chart showing a slide format display mode process.

FIG. 56 is a flow chart showing the details of a slide format display mode process (S734) of FIG. 53. In a slide format display mode, each image data is displayed one by one in a sequential manner under the viewer size of "640× 680" pixels. A figure of a viewer is as shown in FIG. 23. First, an image data group is read in (S7341). One image data is displayed (S7342). Determination is made whether a command of a previous page or a subsequent page is operated or not (S7343). If NO at S7343, the program proceeds to S7345. When YES at S7343, preparation of display of prior image data or subsequent image data display is carried out (S7344), and the image data is displayed (S7342). Finally, determination is made whether the slide format display is to be terminated or not (S7345). When the display is to be terminated (YES at S7345), the program proceeds to RETURN, otherwise to the determination of the scroll bar operation of S7343.

Figure 57:
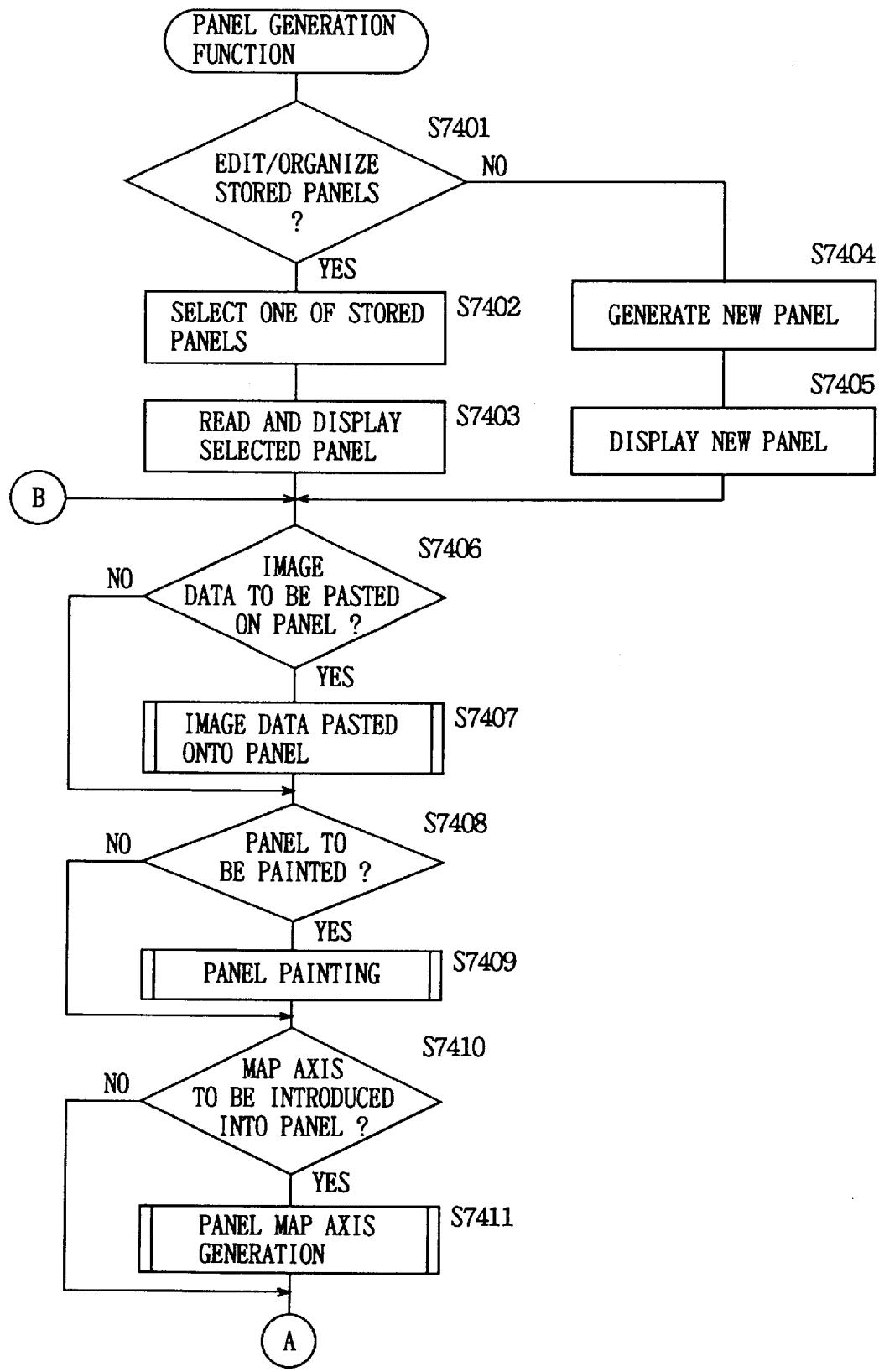
FIG. 57 is a flow chart showing a panel generation function process.

FIG. 57 is a flow chart showing the details of a panel generation function process (S74) of FIG. 48. Panel generation is the function to arrange image data and items (graphics generated with paint function) for producing and editing panel data. This panel is used as a paste graphic in which map generation, grouping, and design concept are gathered.

First, determination is made whether a stored panel is edited/organized or not (S7401). In the case of YES at S7401, one of the stored panel is selected (S7402). The selected panel is read in and provided on display 2 (S7403). With NO at S7401, a panel is newly generated (S7404) and provided on display 2 (S7405).

Then, determination is made whether an image is to be pasted on the panel (S7406). If YES at S7406, an image is pasted on the panel (S7407). The details will be described afterwards. If NO at S7406, this process is skipped. Then, determination is made whether the panel is to be painted or not (S7408). If YES at S7408, panel painting is carried out (S7409). If NO at S7408, this process is skipped. The details of these processes will be described afterwards. Then, determination is made whether a map axis is to be introduced into the panel (S7410). If YES at S7410, a map axis is generated (S7411). If NO at S7410, this process is skipped. Details of this panel map axis generation will be described afterwards.

Figure 58:
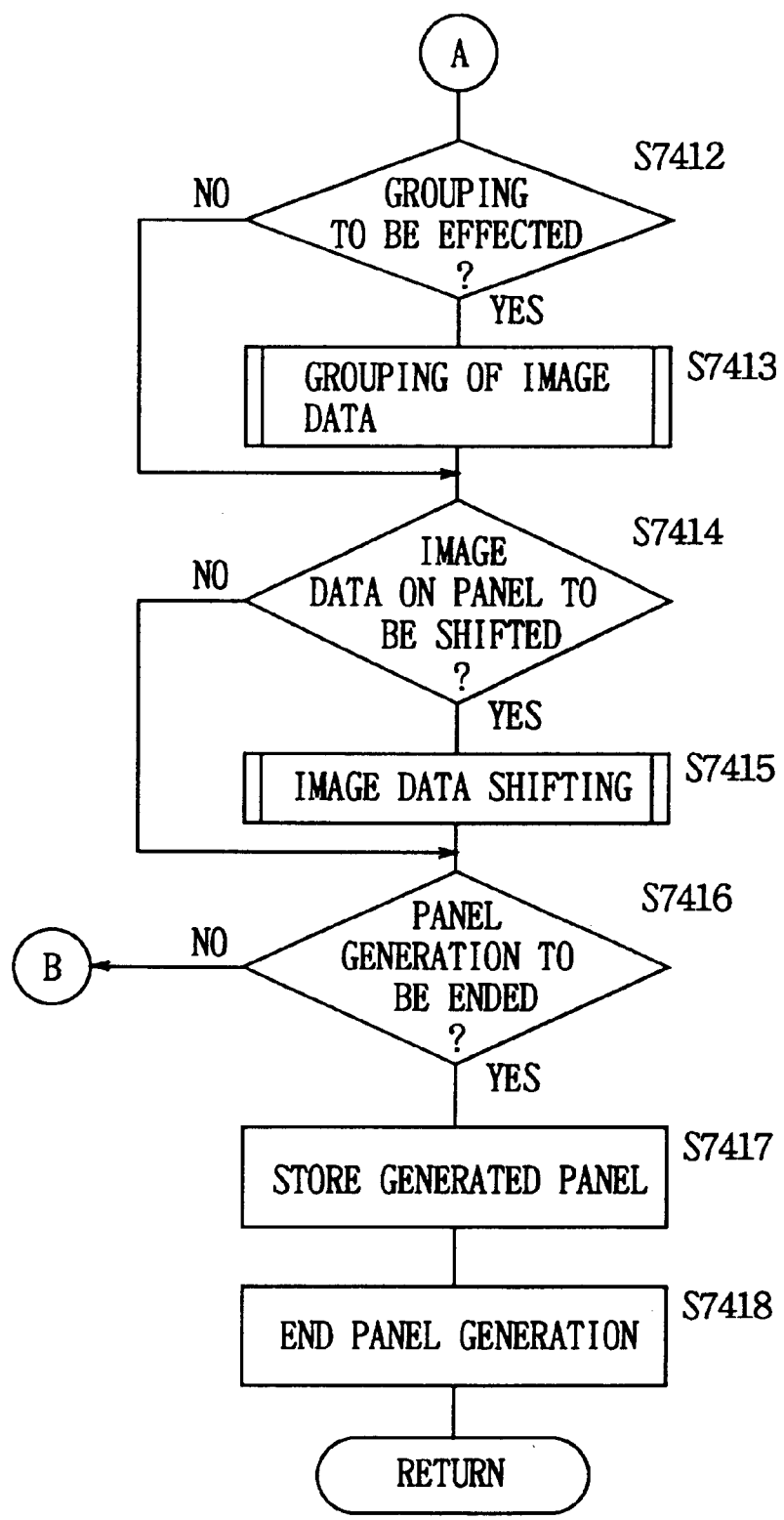
FIG. 58 is a flow chart showing a panel function process.
Figure 59:
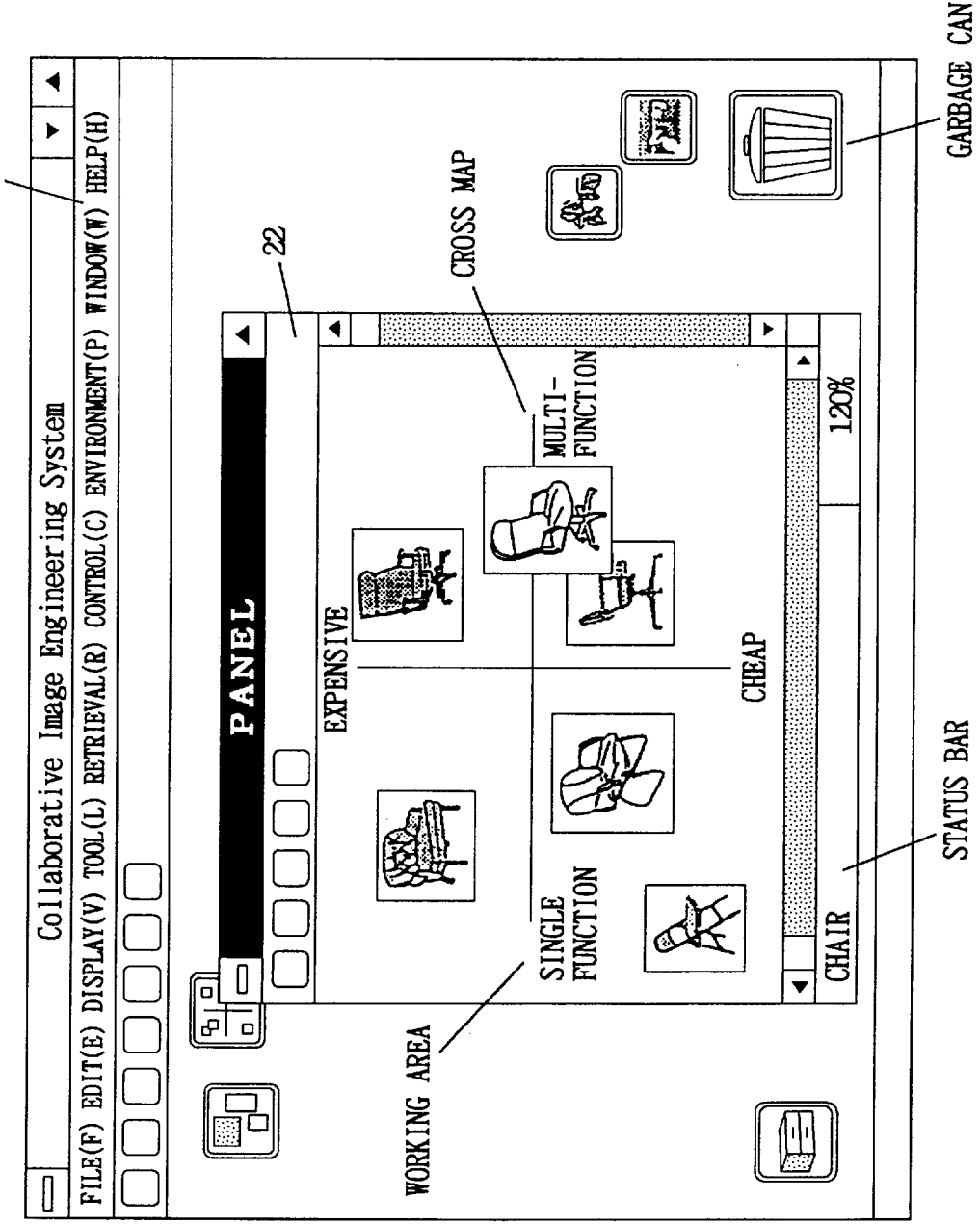
FIG. 59 shows an example of a panel.

Referring to FIG. 58, determination is made whether grouping is effected or not (S7412). If YES at S7412, images are grouped (S7413). If NO at S7412, this process is skipped. Details of grouping image data will be described afterwards. Then, determination is made whether the image data on the panel is to be shifted or not (S7414). When the image data is to be shifted (YES at S7414), image data shifting is effected (S7415). If NO at S7414, this process is skipped. The details of this image data shifting will be described afterwards. Then, determination is made whether panel generation is terminated or not (S7416). If YES at S7416, the generated panel is saved in a storage device such as hard disk 6 (S7417), and the panel generation function process is terminated (S7418). If NO at S7416, the program returns to S7406. A specific example of a panel provided on display 2 is shown in FIG. 59.

Figure 60:
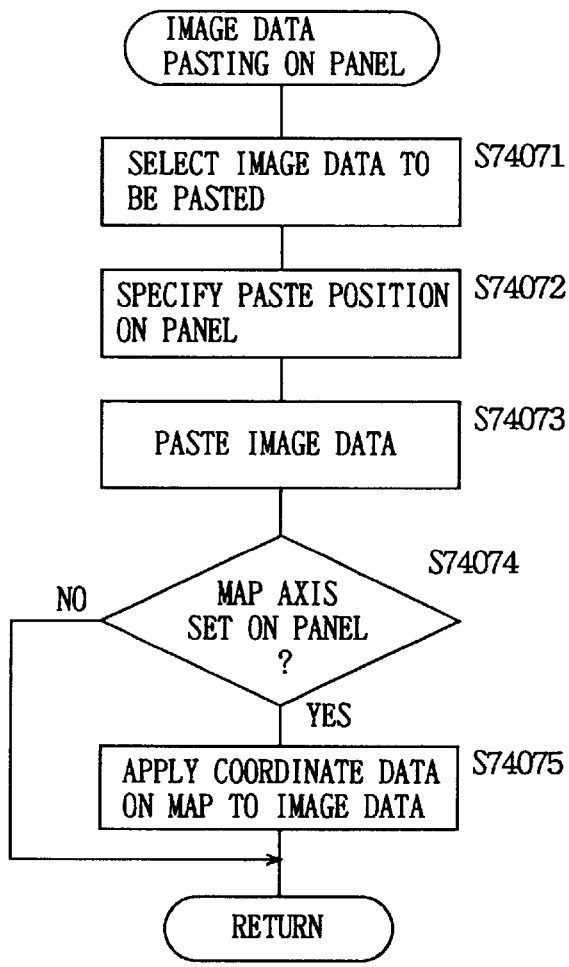
FIG. 60 is a flow chart showing a process of pasting image data onto a panel.

FIG. 60 is a flow chart showing the details of a process of pasting image data onto a panel of FIG. 57 (S7407). The image data to be pasted is selected (S74071). The position for pasting on the panel is specified (S74072), and the image data is pasted (S74073). Then, determination is made whether a map axis is set on the panel (S74074). If YES, the coordinate data on the map is applied to the image data (S74075). If NO at S74074, this process is skipped and proceeds to RETURN.

Figure 61:
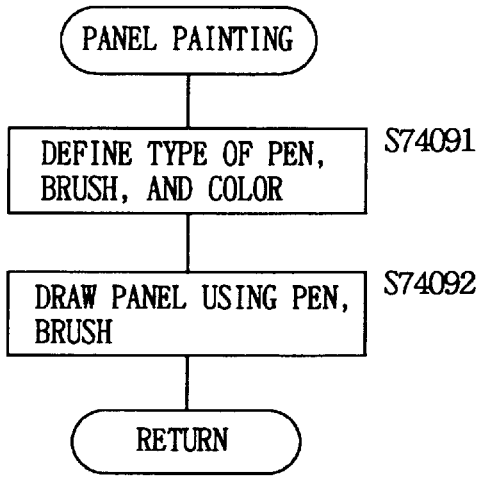
FIG. 61 is a flow chart showing a panel paint process.

FIG. 61 is a flow chart showing the details of a panel paint process (S7409) of FIG. 53. The type of pen or brush, the color, and the like are defined (S74091). Drawing is provided on the panel using a pen or brush (S74092).

Figure 62:
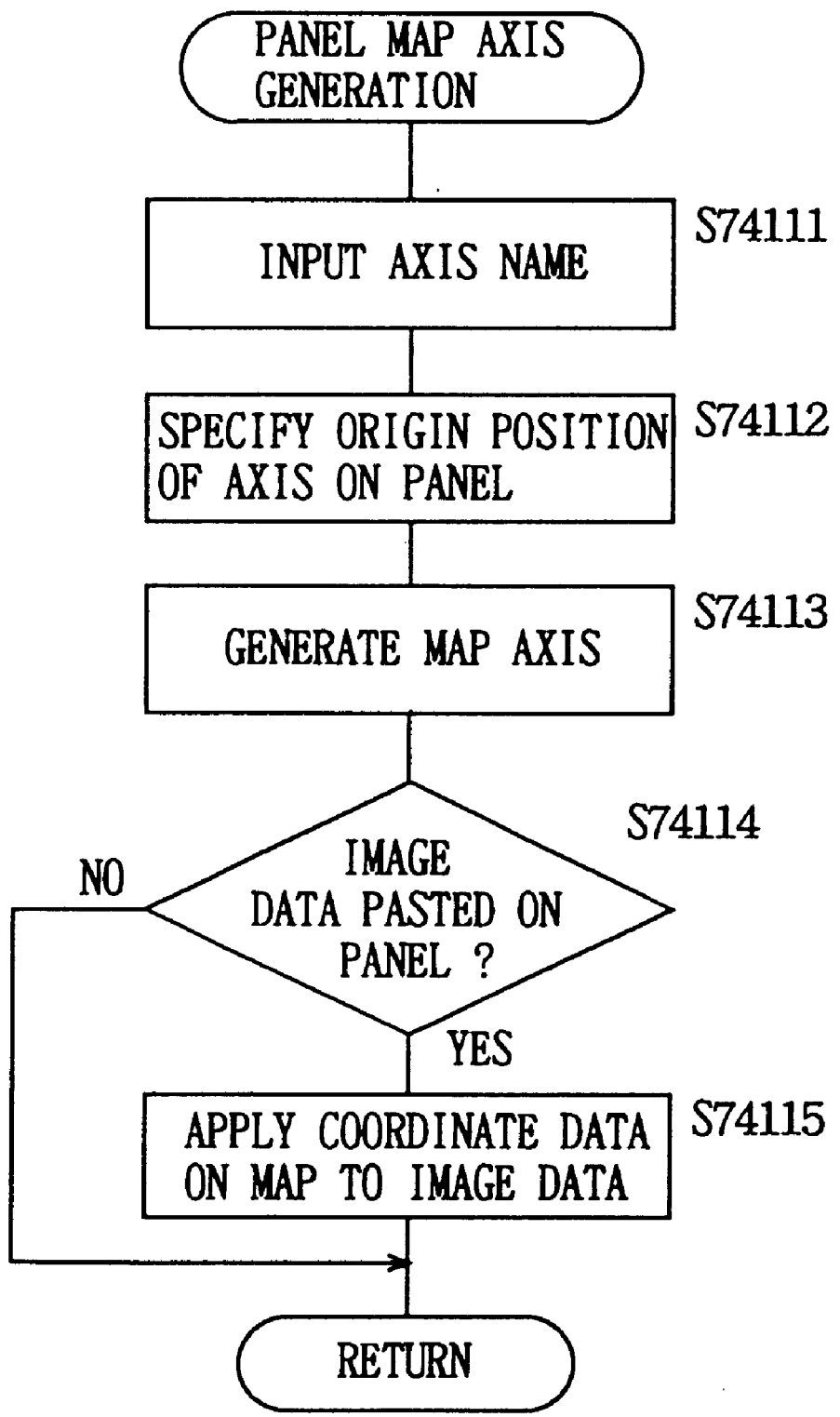
FIG. 62 is a flow chart showing a panel map axis generation process.

FIG. 62 is a flow chart showing the details of a map axis generation process (S7411) of FIG. 57. An axis name is input (S74111), and the position of origin of the axis is specified on the panel (S74112). Then a map axis is generated (S74113).

Next, determination is made whether image data is pasted on the panel or not (S74114). If YES, coordinate data of the map is applied to the image data (S74115). If NO at S74114, this process is skipped to proceed to RETURN.

Figure 63:
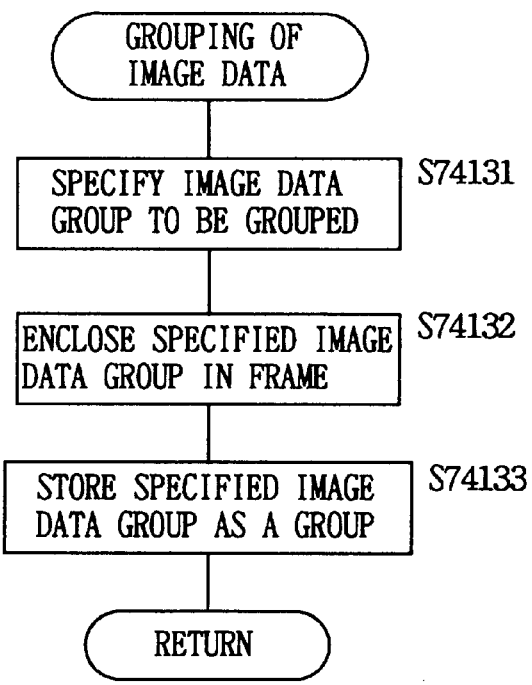
FIG. 63 is a flow chart showing an image data grouping process.

FIG. 63 is a flow chart showing the details of the of grouping image data (S7413) of FIG. 59. The image data group to be grouped is specified (S74131). The specified image data group is enclosed with a frame (S74132). The specified image data group is saved as a group (S74133).

Figure 64:
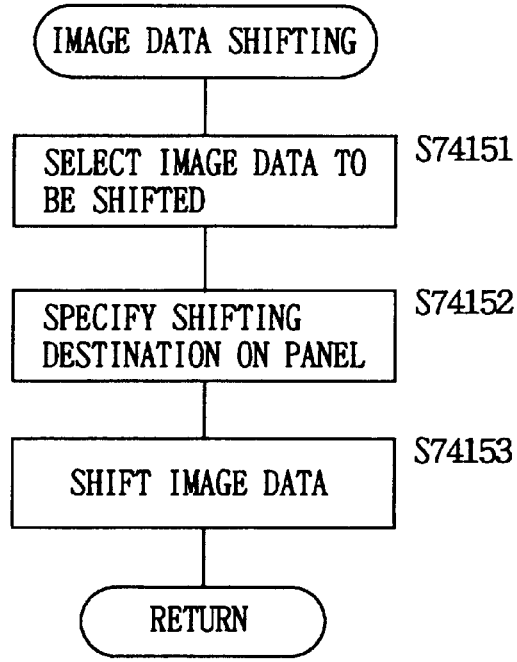
FIG. 64 is a flow chart showing an image data shift process.

FIG. 64 is a flow chart showing the details of an image data shift process (S7415) of FIG. 59. The image data to be shifted is selected (S74151). The destination to which the image data is to be shifted is specified (S74152). Then, the image data is shifted (S74153).

In a creative task such as designing, unrestricted shifting of the process during operation is important. The design process is a circulation process in which functions required for each process must be combined organically. Consider, for example, a case of producing a collage image in which the design concept is incorporated from an image extracted by retrieval. In this case, a one-way task of sequentially creating a collage of the extracted image is not practical. Various evaluation is carried out during the collage process to eventually return to a retrieval operation. There is also a case where the collage result is presented to several people to be reworked and reproduced incorporating their opinions. The operation returns to the retrieval process to extract another image. There is also a case of storing produced drawings for the purpose of reference in a subsequent design work. In order to determine the design concept, a task must be repeated such as grouping using a KJ method, reorganizing the concept using a map, or carrying out a presentation to obtain opinions for retrieving and extracting another image.

In the present invention, an image is retrieved to be edited, and a panel which becomes a collage image is generated according to the edited image for display. By virtue of allowing repetition of such various operations, the present invention becomes an aid for design tasks and creation.

Figure 65:
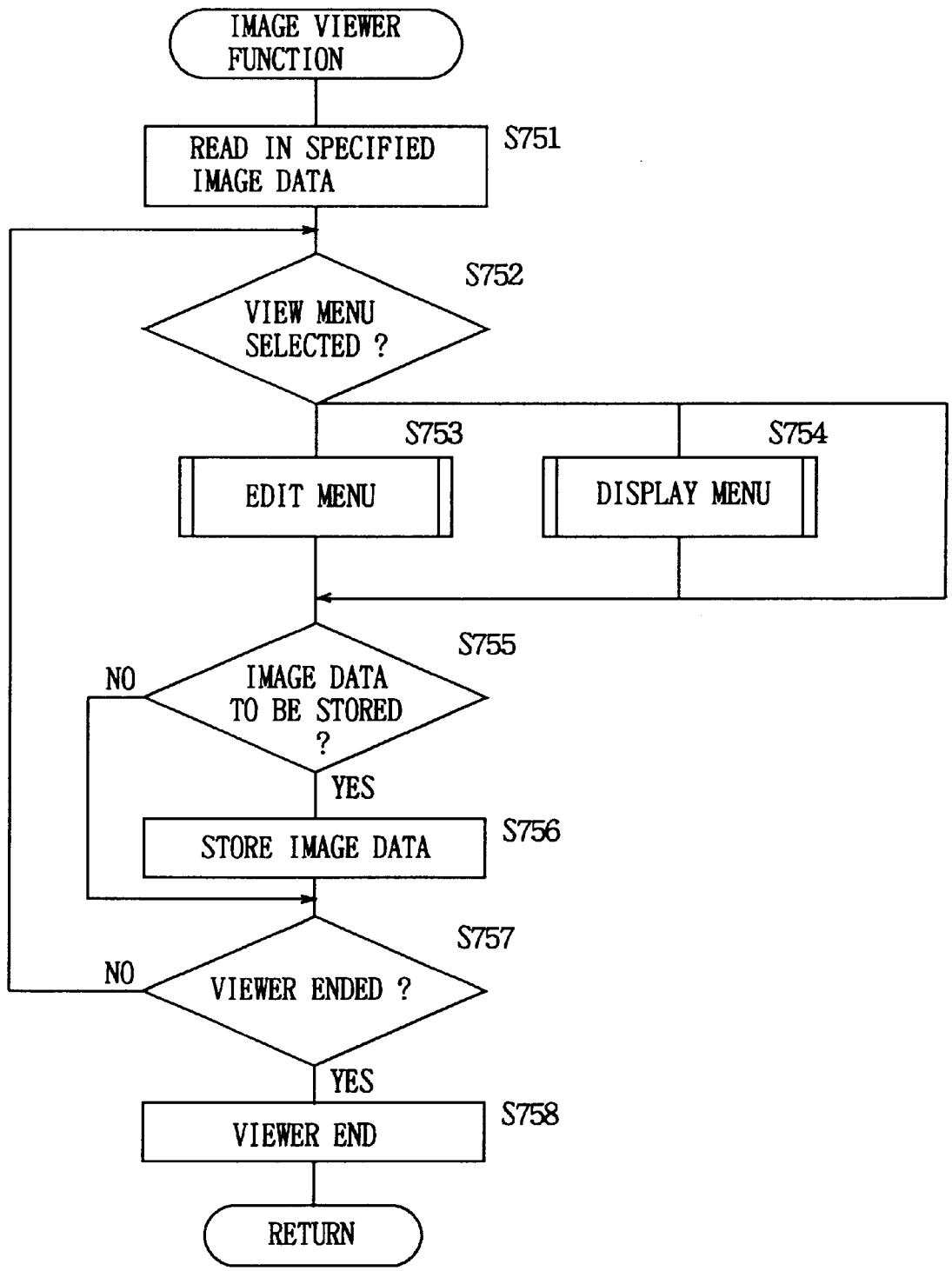
FIG. 65 is a flow chart showing an image viewer function process.

FIG. 65 is a flow chart showing the details of an image viewer function process (S75) of FIG. 48. Image viewer is a function to display a specified image data in an arbitrary size, and adding items and mask information to the image data. Here, "item" refers to text and vector graphics, and "mask" refers to masking a portion of an image to be displayed.

Referring to FIG. 65, a specified image data is read in (S751). Then, a desired menu is selected from the viewer menu provided on display 2 (S752). The program proceeds to S753 in the case of an editing menu, and to S754 in the case of a display menu. Details of the menu contents will be described afterwards. When no action is taken, the program proceeds to S755. Then, determination is made whether the image data is to be saved or not (S755). If YES at S755, the image data is saved (S756). If NO at S755, this process is skipped. Then, determination is made of a viewer end (S757). If YES at S757, the viewer function is terminated (S758). If NO at S757, the program returns to selection of a viewer menu at S752.

Figure 66:
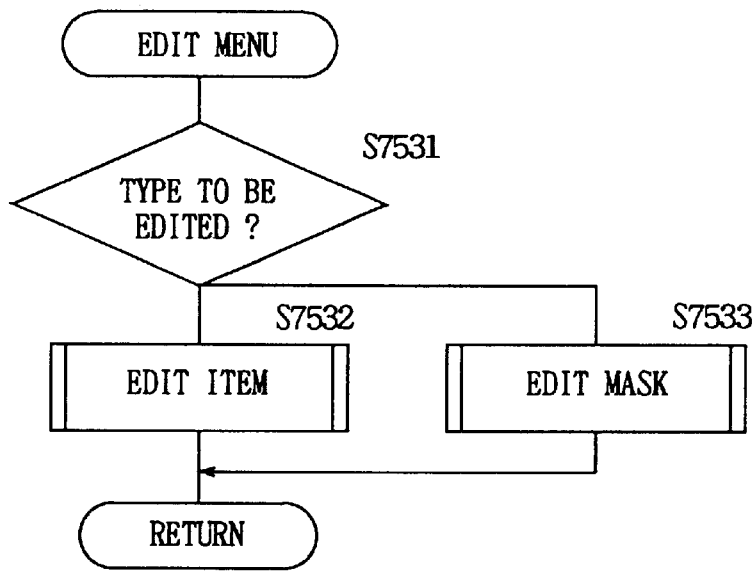
FIG. 66 is a flow chart showing an edit menu process.

FIG. 66 is a flow chart showing the details of an editing menu process (S753) of FIG. 64. Here, the object to be edited is selected (S7531). When an item is to be edited according to the object, the program proceeds to S7532. When a mask is to be edited, the program proceeds to S7533. The details of these processes will be described afterwards.

Figure 67:
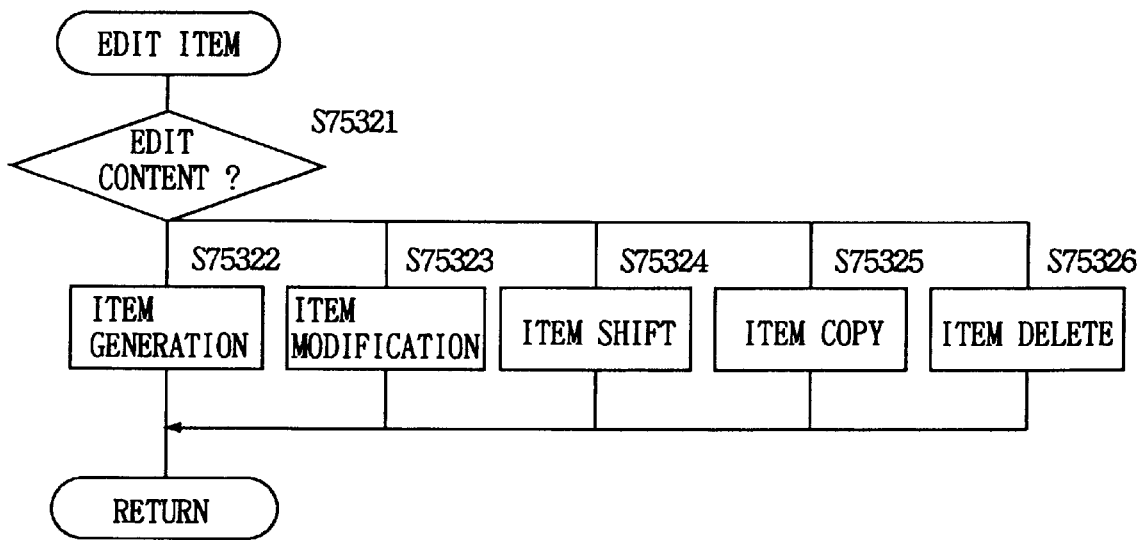
FIG. 67 is a flow chart showing a process for editing items.

FIG. 67 is a flow chart showing the details of the process to edit an item indicated at S7532 of FIG. 66. First, an edit content is selected (S75321). An item is generated according to the edit content (S75322). The process of modification (S75323), shifting (S75324), copying (S75325), and deleting (S75326) an item are carried out.

Figure 68:
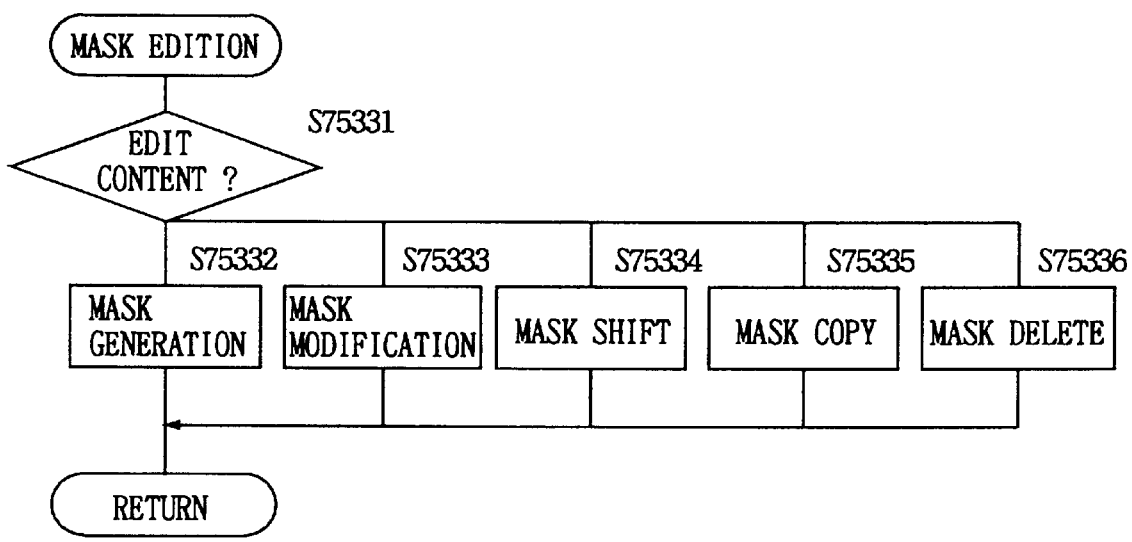
FIG. 68 is a flow chart showing a process for editing a mask.

FIG. 68 is a flow chart showing the details of a process for editing a mask of FIG. 66 (S7533). Here, an edit content is selected (S75331). According to the edit content, generation (S75332), modification (S75333), shifting (S75334), copying (S75335), and deleting (S7536) a mask are carried out.

Figure 69:
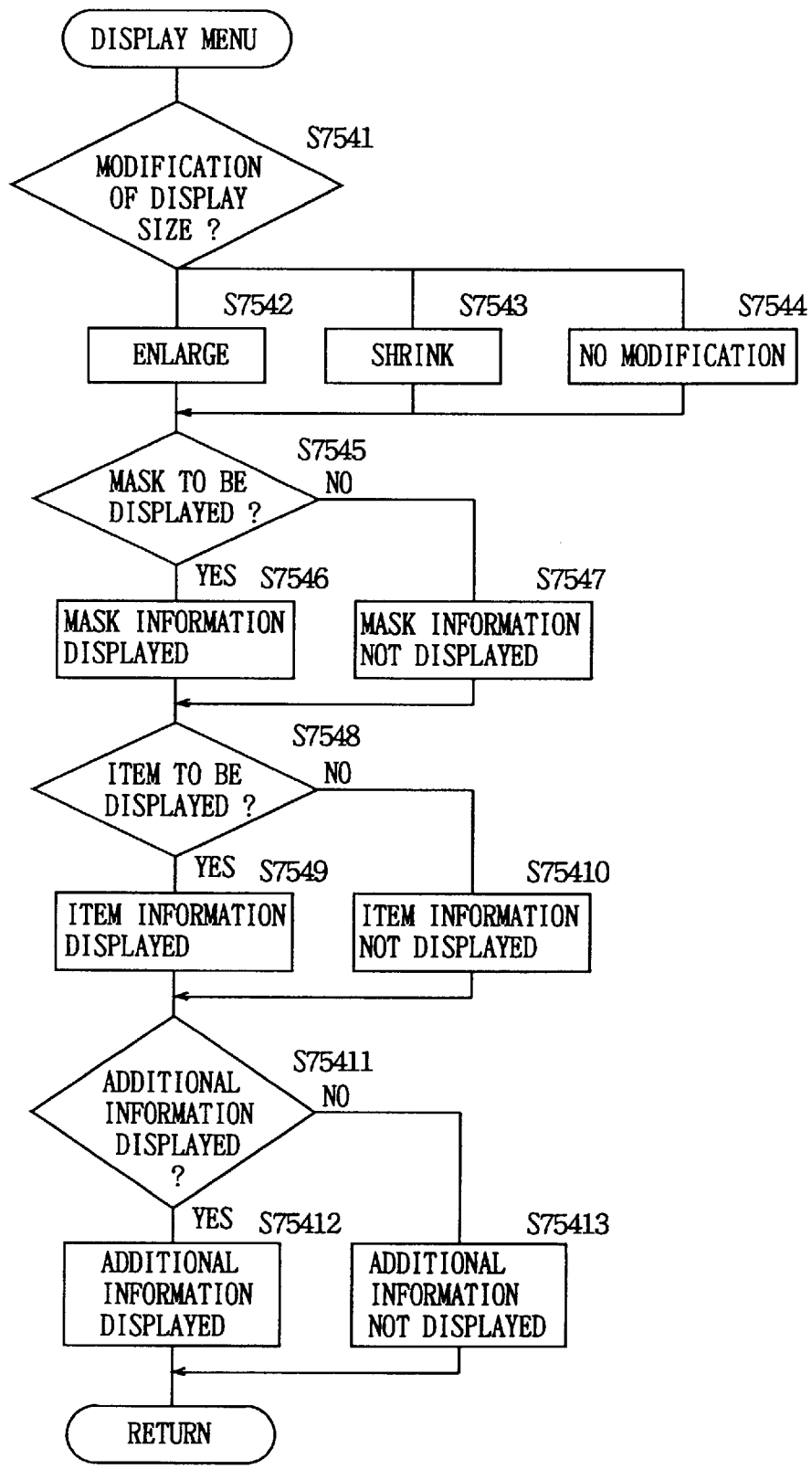
FIG. 69 is a flow chart showing a display menu process.

FIG. 69 is a flow chart showing the details of a display menu process (S754) of FIG. 65. First, modification of a display size is selected (S7541). Size modification includes the operations of enlarging (S7542), shrinking (S7543), and no modification (S7544). Then, determination is made whether display of the mask is to be provided or not (S7545). When a display is to be provided (YES at S7545), mask information is provided (S7546). If NO at S7545, the mask information is not displayed (S7547). Then, determination is made whether an item display is to be provided or not (S7548). When YES at S7548, item information is displayed (S7549). If NO at S7548, the item information is not displayed (S75410). Then, determination is made whether additional information display is to be provided or not (S75411). If YES at S75411, the additional information is displayed (S75412). If NO at S75411, the additional information is not displayed (S75413).

Figure 70:
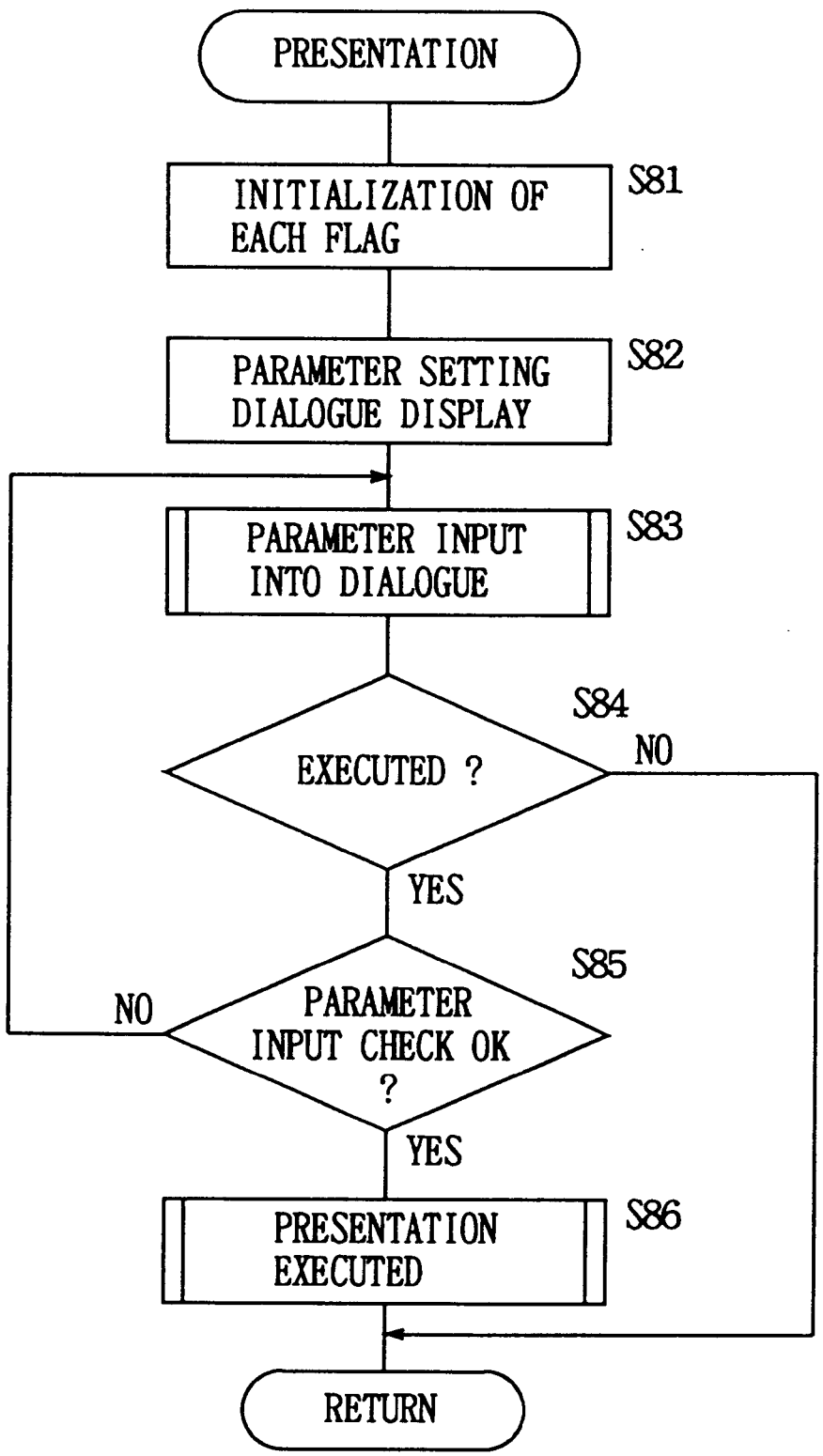
FIG. 70 is a flow chart showing a presentation process.

FIG. 70 is a flow chart showing the details of a presentation process (S8) shown in FIG. 3. "Presentation" is a function to display image data in a page scroll for each data. Upon entering a presentation process, various flags (automatic display flag, item display flag, mask display flag, continuous display mode flag) are initialized (S81).

Here, an automatic display flag indicates automatic display of a plurality of image data switched at a predetermined time interval. An item display flag indicates display of an item such as text and vector graphics. A mask display flag indicates display with a portion of an image masked. A continuous display mode flag indicates continuous display of image data until the user explicitly expresses his or her decision. Each of these flags is set on a screen not shown.

Then, a dialogue box for setting a parameter to execute a presentation process is displayed (S82). Parameters are input in the dialogue box (S83). Details of the parameter input process towards the dialogue box of S83 will be described afterwards.

Determination is made whether execution is to be carried out or not (S84). If YES at S84, the program proceeds to a parameter input check step (S85). If NO at S84, the program proceeds to RETURN. When the result of the parameter input checking is OK (YES at S85), the program proceeds to a presentation execution process (S86). If NO at S85, the program returns to S83 for input of a parameter into the dialogue box. Details of the presentation execution process of S86 will be described afterwards.

Figure 71:
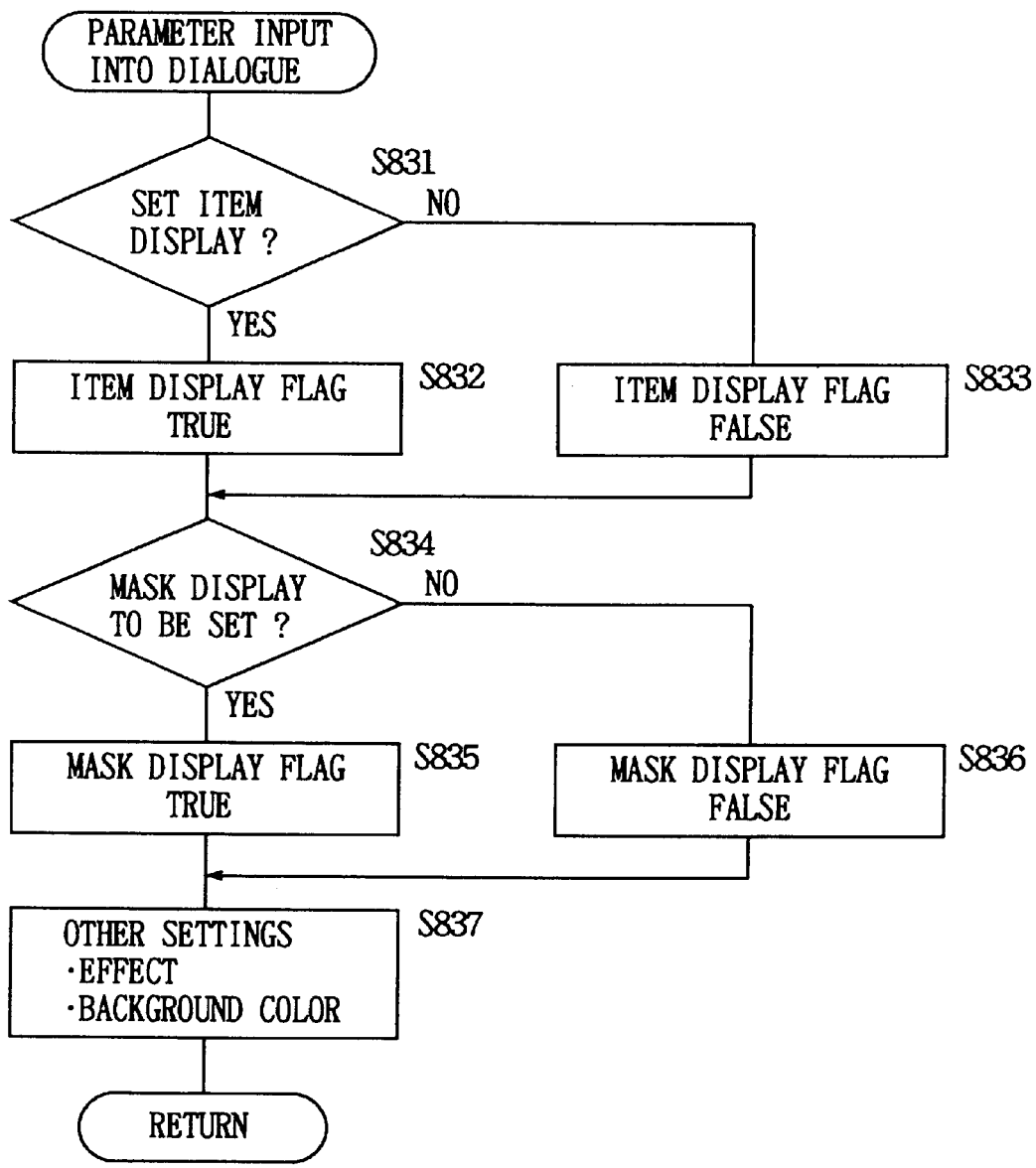
FIG. 71 is a flow chart showing a parameter input process into a dialogue box.

FIG. 71 is a flow chart showing the details of a parameter input process into the dialogue of FIG. 70. First, determination is made whether an item display is to be provided or not (S831). If YES at S831, the item display flag is set to "TRUE" (S832). If an item display is not to be provided (NO at S831), the item display flag is set to "FALSE" (S833). Then, determination is made whether a mask display is to be provided (S834). If YES at S834, the mask display flag is set to "TRUE" (S835). If the mask display is not to be provided (NO at S834), the mask display flag is set to "FALSE" (S836). Then, other parameters such as the background color and effect are set (S837). Here, "effect" refers to display effects such as bringing forth the next image from the right side of the screen.

Figure 72:
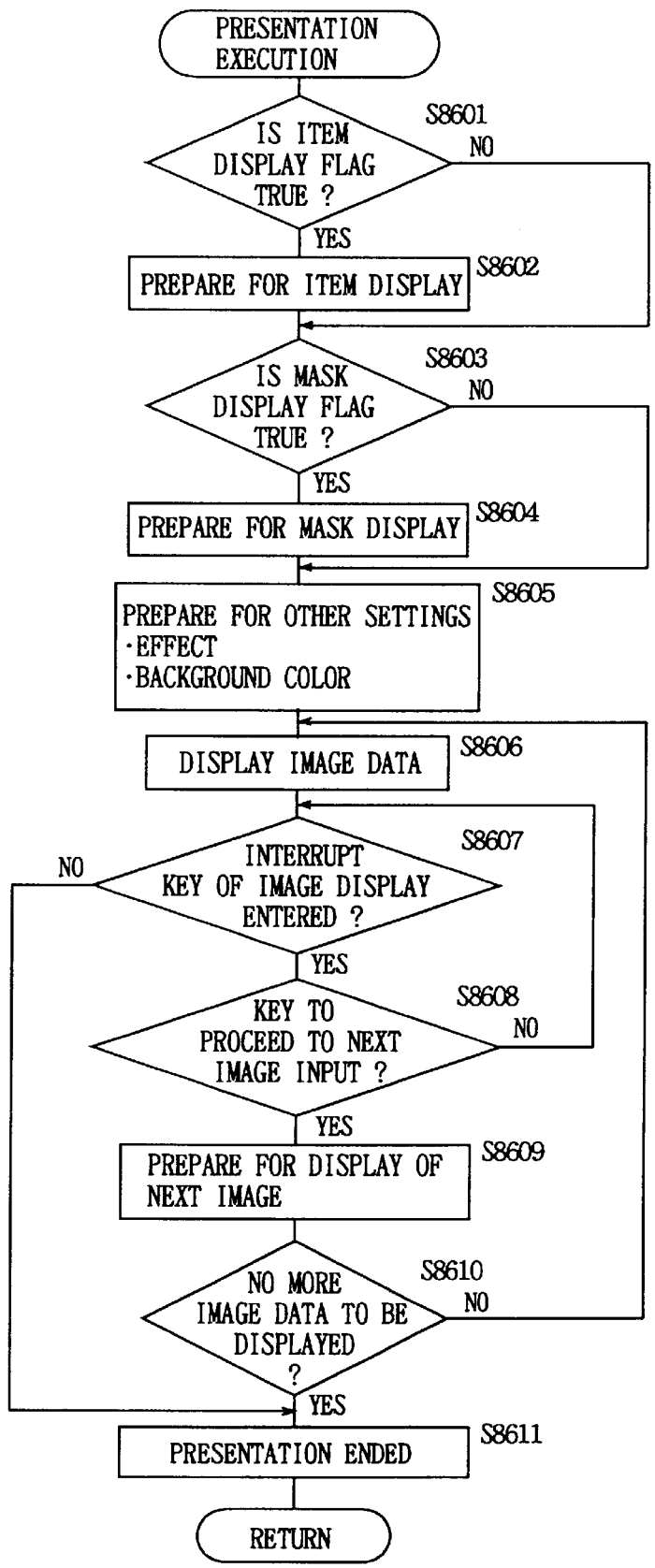
FIG. 72 is a flow chart showing a presentation execution process.

FIG. 72 is a flow chart showing the details of a presentation execution process (S86) of FIG. 70. The item display flag is identified (S8601). If the item display flag is "TRUE" (YES at S8601, an item display is prepared (ensuring memory for item display and the like) (S8602). When the item display flag is "FALSE" (NO at S8601), the program proceeds to the identification of the mask display flag (S8603). When the mask display flag is "TRUE" (YES at S8603), a mask display is prepared (ensure memory for mask display) (S8604). If the mask display flag is "FALSE" (NO at S8603), the preparation step of a mask display (S8604) is skipped.

Next, a preparation process for other settings (background, effect, and the like) is carried out (S8605), and an image data display is provided (S8606). Then, determination is made whether an interrupt key of the image display is input or not (S8607). If YES at S8607, the program proceeds to S8608 to determine whether a key to proceed to the next image is input or not. If an interrupt key is input (NO at S8607), the program proceeds to S8611 to end the presentation.

When determination is made that a key to proceed to the next image is input at S8608, the program proceeds to S8609 to prepare for display of the next image. If NO at S8608, the program proceeds to S8607. Waiting is conducted until a key to proceed to the next image is input. At S8609, preparation for display of the next image (read in next image data and the like) is carried out. Determination is made whether there are no more images to be displayed (S8610). When there are no images (YES at S8601), the presentation process ends (S8611). When there are images left (NO at S8610), the program returns to S8606 for display of the next data. In the step of S8611, the presentation process is ended, whereby the memory is released.

Figure 73:
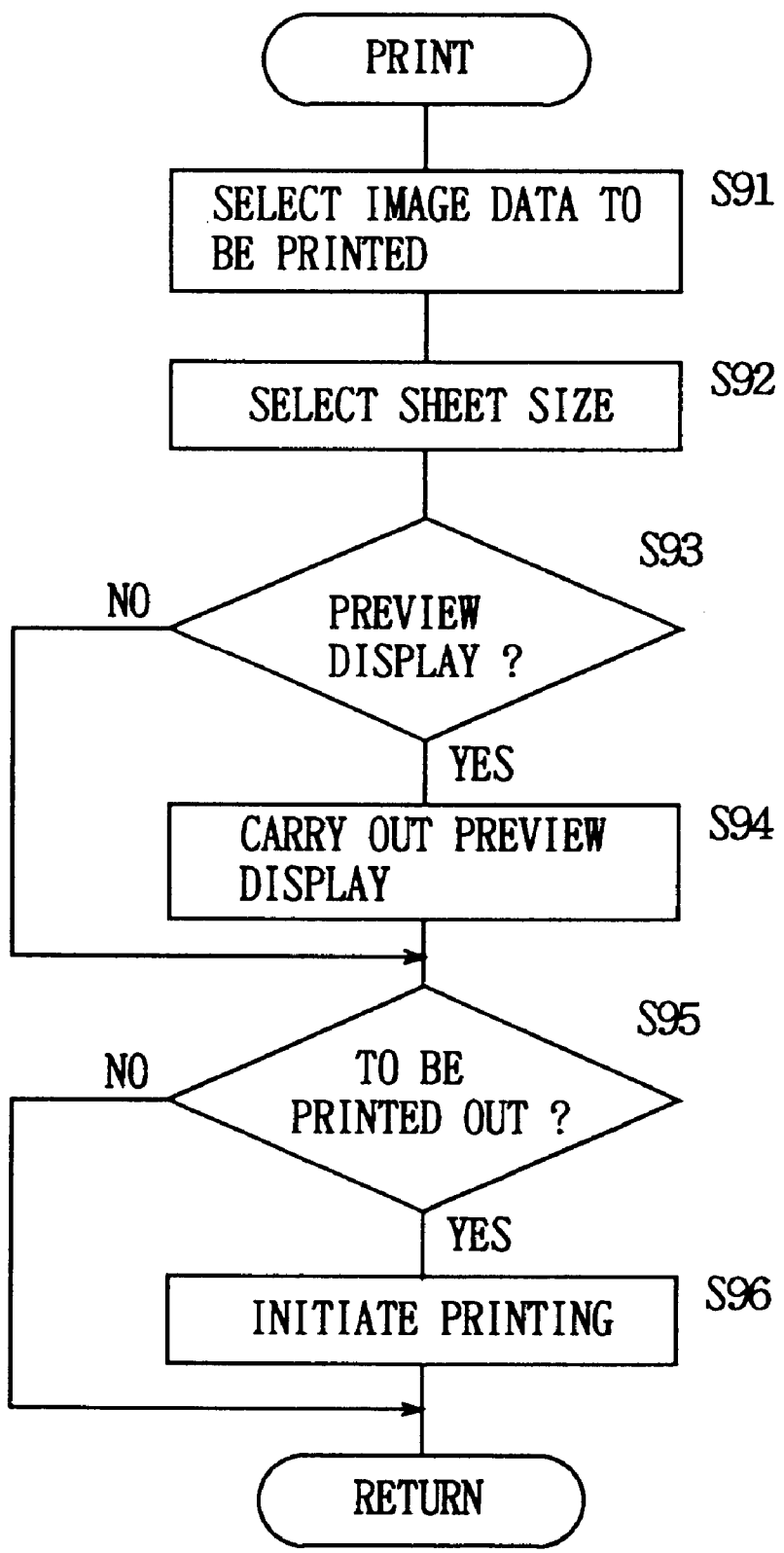
FIG. 73 is a flow chart showing a printing process.

FIG. 73 is a flow chart showing the details of the printing process (S9) of FIG. 3). Here, image data to be printed and the sheet size are selected, and then printed out. A preview display can be provided. Preview display and printing do not necessarily have to be carried out. Referring to FIG. 67, image data to be printed is selected (S91). The size of the sheet on which the image data is to be printed is selected (S92). Then, determination is made whether a preview display is to be provided or not (S93). If YES at S93, a preview display is provided (S94). If NO at S93, this process is skipped. Then, determination is made whether printing is to be effected or not (S95). When the image data is to be printed out (YES at S95), printing is initiated (S96). If NO at S95, this process is skipped to proceed to RETURN.

In the above-described embodiment, the various maps are two-dimensional maps. The present invention is not limited to a two-dimensional map, and can be one-dimensional or three-dimensional maps.

The embodiment of the present invention was described according to still image data. The present invention can similarly be realized with motionary image data, text data, audio data, or multimedia data which is a combination thereof.

Although particular details of retrieval means are not described in the embodiment, AND, OR of each retrieval means or a combination thereof can be employed in addition to the single search by each retrieval means.

In the image data retrieval apparatus of the present invention, additional information of a plurality of image data can be designated to various types of additional information maps according to the additional information of image data. Therefore, the map per se can be used as a diagram for image classification. Furthermore, by arranging image data that cannot easily be classified just by simple keywords or a title onto a multi-dimensional map, versatile classification is enabled to allow grouping by images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus connected to a data storage, comprising:
   first means for identifying data to be stored in said data storage;
   second means for generating a map having an axis which represents a defined range of at least one criterion;
   third means for registering an item in said generated map, said item being used for searching said data storage for specific data, and said item being registered by linking the item to a position specified by coordinates within said map; and fourth means for correlating said identified data with said identified item.

2. The apparatus according to claim 1, wherein said data is image data.

3. The apparatus according to claim 2, wherein said item is defined as at least one of keyword, audio, icon, and color which is associated with said image data.

4. The apparatus according to claim 1, wherein said coordinates are two-dimensional coordinates.

5. The apparatus according to claim 1, wherein said at least one criterion comprises a first criterion and a second criterion, and wherein said map has a first axis which represents a range of said first criterion, and said map has a second axis which represents a range of said second criterion.

6. The apparatus of claim 1, wherein said second means comprises a means for designating an axis name which specifies said range.

7. The apparatus of claim 1, wherein said third means for registering said item comprises means for manually specifying the position of said item on said map.

8. The apparatus of claim 1, wherein said third means for registering said item comprises means for automatically specifying the position of said item on said map when said item comprises subparts which are themselves subpart items which have already been registered on said map.

9. The apparatus of claim 8, wherein said means for registering said item comprises computing the center of the positions of the subpart items.

10. An apparatus connected to a data storage and a display, comprising:

first means for displaying a map having coordinates on said display;

second means for identifying data to be stored in said data storage;

third means for designating a position on the displayed map, as specified by coordinates on said map, said third means comprising one of;
  (a) a manual means for manually specifying the position on the displayed map; or
  (b) an automatic means for automatically specifying the position on the displayed map based on the positions of previously registered entries on the displayed map; and fourth means for correlating said identified data with the designated position specified by the coordinates, wherein said position is based on a range of at least one criterion.

11. The apparatus according to claim 10, wherein said data is image data are two-dimensional coordinates 12. A apparatus according to claim 10, wherein said coordinates are two-dimensional coordinates.

13. The apparatus according to claim 10, wherein said at least one criterion comprises a first criterion and a second criterion, and wherein said map has a first axis which represents a range of said first criterion, and said map has a second axis which represents a range of said second criterion.

14. An apparatus connected to a data storage and a display, comprising:

first means for displaying a map having coordinates on said display;

second means for designating a position on said displayed map; and third means for searching said data storage for data correlated with said designated position specified by coordinates, wherein said position is based on a range of at least one criterion;

wherein said second means designates a range of ambiguity as the position by indicating an area on said map, and said third means searches said data storage for data located with said range of ambiguity.

15. The apparatus according to claim 14, further comprising:

fourth means for displaying retrieved data on said display.

16. The apparatus according to claim 14, wherein said data is image data.

17. The apparatus according to claim 14, wherein said coordinates are two-dimensional coordinates.

18. The apparatus according to claim 14, wherein said at least one criterion comprises a first criterion and a second criterion, and wherein said map has a first axis which represents a range of said first criterion, and said map has a second axis which represents a range of said second criterion.

19. The apparatus of claim 14, wherein said range of ambiguity is selected by modifying the spatial extent of a graphical representation on said map which represents said range of ambiguity.

20. An apparatus connected to a data storage, comprising:

first means for identifying data to be stored in said data storage, said data being correlated with an item, wherein said item is linked to a first position specified by coordinates on a map; and second means for searching said data storage for another data which is also correlated with said item;

wherein said second means searches said data storage for said other data which is correlated with another item linked on a second position specified by coordinates on said map, said second position being correlated with said first position through the specification of a range of ambiguity;

wherein the specification of the range of ambiguity is made by selecting a graphical representation on the map which represents the range.

21. The apparatus according to claim 20, wherein said coordinates are two-dimensional coordinates.

22. The apparatus according to claim 20, wherein said data is image data.

23. The apparatus according to claim 20, wherein said specification of said range of ambiguity is made by drawing a circle on said map which encompasses said at least first position and said second position.

24. An apparatus connected to a data storage which includes a plurality of items, each item being linked to a position of coordinates, said apparatus comprising:

first means for entering an item which is combined with two items previously stored in said data storage; and second means for linking said entered item to a new position specified by coordinates, said new position being calculated based on the positions linked to said previously stored items.

25. The apparatus according to claim 24, wherein said new position is a midpoint of the positions linked to said previously stored items.

26. The apparatus according to claim 24, wherein said coordinates are two-dimensional coordinates.

27. The apparatus according to claim 26, wherein said new position is a barycenter of an origin of the coordinates and the positions linked to the previously stored items.

28. The apparatus according to claim 24, wherein said positions of said items are specified within a map, wherein said positions of said items within said map are based on a range of at least one criterion.

29. The apparatus of claim 24, wherein said entered item is a combination of two words which were previously registered, and the position of said entered item is based on the positions of said previously registered words.

30. An apparatus connected to a data storage, comprising:

first means for identifying data to be stored in said data storage;

second means for identifying an item, said item being linked to a first position on a first map;

third means for correlating said identified data with said identified item; and fourth means for linking said identified data to a second position of second coordinates of a second map based on said first position linked to said identified item.

31. An apparatus according to claim 30, wherein said first position and said second position are identical if the first and second maps have the same coordinate system.

32. An apparatus connected to a data storage, comprising:

first means for identifying an item to be stored in said data storage;

second means for identifying data, said data being linked to a first position specified on a first map;

third means for correlating said identified item with said identified data; and fourth means for linking said identified item to a second position of second coordinates specified on a second map based on said first position linked to said identified data.

33. The apparatus according to claim 18, wherein said first position and said second position are identical if the first and second coordinates have the same coordinate system.

34. A data searching apparatus which searchers stored data for a specific datum, comprising:

first means for setting a searching condition;

second means for searching stored data for a specific datum based on the set condition;

third means for storing each search condition;

fourth means for graphically displaying stored conditions that show a course of searching using a tree structure; and fifth means for graphically designating a previous search operation which is part of said stored conditions, wherein the second means performs a search on the basis of said previous search operation designated by said fifth means.

35. The data searching apparatus as claimed in claim 34, wherein the second means searches a part of stored data for a specific datum.

36. The apparatus of claim 34, wherein retrievals in said tree are indicated by nodes in said tree, and wherein a range of retrieval is indicated by the size of said node.

* * * * *